(12) United States Patent
Turse et al.

(10) Patent No.: US 11,047,132 B2
(45) Date of Patent: Jun. 29, 2021

(54) BOOM DEPLOYER DEVICES, SYSTEMS, AND METHODS

(71) Applicant: Roccor, LLC, Longmont, CO (US)

(72) Inventors: Dana Turse, Broomfield, CO (US); Larry Adams, Thornton, CO (US); William Francis, Lyons, CO (US)

(73) Assignee: Roccor, LLC, Longmont, CO (US)

( * ) Notice: Subject to any disclaimer, the term of this patent is extended or adjusted under 35 U.S.C. 154(b) by 0 days.

(21) Appl. No.: 16/424,130

(22) Filed: May 28, 2019

(65) Prior Publication Data
US 2019/0383014 A1 Dec. 19, 2019

Related U.S. Application Data

(60) Provisional application No. 62/677,036, filed on May 27, 2018.

(51) Int. Cl.
*B64G 1/22* (2006.01)
*E04C 3/00* (2006.01)

(52) U.S. Cl.
CPC .............. *E04C 3/005* (2013.01); *B64G 1/222* (2013.01)

(58) Field of Classification Search
CPC ........... E02B 15/0842; B63G 2008/008; E04C 3/005; B64G 1/222
USPC ......................................................... 52/212
See application file for complete search history.

(56) References Cited

U.S. PATENT DOCUMENTS

| | | | |
|---|---|---|---|
| 3,357,457 A | 12/1967 | Myer | |
| 3,499,610 A | 3/1970 | Leonard | |
| 3,589,632 A * | 6/1971 | Rew | B21C 47/003 436/509 |
| 3,735,943 A * | 5/1973 | Fayet | B64G 1/222 244/172.7 |
| 4,961,370 A * | 10/1990 | Sawyer | F16H 19/064 52/108 |
| 4,991,784 A * | 2/1991 | Schmid | B64G 9/00 242/390.3 |
| 8,863,369 B2 | 10/2014 | Taylor | |
| 9,593,485 B2 * | 3/2017 | Freebury | B32B 5/12 |
| 10,160,555 B2 * | 12/2018 | Turse | B64G 1/222 |
| 10,196,817 B2 | 2/2019 | Rakow | |
| 2014/0230949 A1* | 8/2014 | Daton-Lovett | F16L 9/02 138/177 |
| 2015/0259911 A1* | 9/2015 | Freebury | B29C 70/30 52/108 |
| 2016/0032609 A1 | 2/2016 | Kucinski | |
| 2016/0177567 A1* | 6/2016 | Gandhi | E04C 3/005 52/108 |

(Continued)

*Primary Examiner* — Paola Agudelo
(74) *Attorney, Agent, or Firm* — Wilson Patent Law, LLC

(57) ABSTRACT

Device, systems, and methods for boom deployment and/or boom stowage are provided in accordance with various embodiments. Some embodiments may facilitate root control of a boom utilizing a variety of tools and techniques. Some embodiments may facilitate boom tip control. Some embodiments may include a boom and a boom spool. Some embodiments include one or more devices that may include: one or more compliant components, one or more boom spreaders, one or more stabilizing tabs, one or more spool locks, one or more boom tip guides, one or more root clamps, and/or a single consolidation roller. Some embodiments include methods that may utilize one or more of the noted devices.

19 Claims, 33 Drawing Sheets

(56) References Cited

U.S. PATENT DOCUMENTS

2016/0223131 A1* 8/2016 Daton-Lovett ......... E04H 12/34
2017/0298628 A1* 10/2017 Rakow .................... E04C 3/005
2018/0111703 A1* 4/2018 Hensley ............... H01Q 1/1235
2018/0313083 A1* 11/2018 Murphey .................. E04C 3/28

* cited by examiner 100-a

Compliant Component(s) 110-a

Boom 101-a

Boom Spool 102-a

Single Consolidation Roller 170-a

```
┌─────────────────────────────────────┐
│ Clamp a portion of a furlable boom  │
│ against a root plug in a deployed   │──── 770
│ state of the furlable boom          │
└─────────────────────────────────────┘
```

```
┌─────────────────────────────────────┐
│ Engage one or more stabilizing tabs │
│ coupled with a furlable boom with   │──── 780
│ one or more features of a root plug │
└─────────────────────────────────────┘
```

FIG. 7F

BOOM DEPLOYER DEVICES, SYSTEMS, AND METHODS

CROSS-REFERENCES TO RELATED APPLICATIONS

This application is a non-provisional patent application claiming priority benefit of U.S. provisional patent application Ser. No. 62/677,036, filed on May 27, 2018 and entitled "BOOM DEPLOYER DEVICES, SYSTEMS, AND METHODS," the entire disclosure of which is herein incorporated by reference for all purposes.

GOVERNMENT LICENSE RIGHTS

This invention was made with Government support under Contract 80NSSC18C0123 awarded by the National Aeronautics and Space Administration. The Government has certain rights in the invention.

BACKGROUND

Different boom stowage and deployment tools and techniques have been utilized for space and/or terrestrial applications. These tools and techniques may face different control issues. There may be a need for new tools and techniques to control stowage and/or deployment of booms or other issues with respect to boom stowage and/or deployment.

SUMMARY

Device, systems, and methods for boom deployment and/or boom stowage are provided in accordance with various embodiments. Some embodiments facilitate root control of a boom utilizing a variety of tools and techniques. Some embodiments facilitate boom tip control. Some embodiments include a furlable boom and a boom spool. Some embodiments include one or more devices that may include: one or more compliant components, one or more boom spreaders, one or more stabilizing tabs, one or more spool locks, one or more boom tip guides, one or more root clamping mechanisms, and/or a single consolidation roller. Various methods may be utilized with respect to the one or more devices in accordance with various embodiments.

For example, some embodiments include a boom deployment system and/or device that may include: a boom spool; one or more compliant components coupled with one or more lateral end portions of the boom spool; and/or a furlable boom coupled with the boom spool such that one or more edges of the furlable boom engage the one or more compliant components. The use of the one or more compliant components may facilitate bloom control of the furlable boom. The furlable boom may include a slit-tube boom, though other furlable booms may be utilized such as triangular rollable and collapsible booms and/or tape spring booms.

In some embodiments, the one or more compliant components include an elastomeric material. The elastomeric material may include silicone. In some embodiments, the one or more compliant components include one or more flat surfaces that the one or more edges of the furlable boom engage. In some embodiments, the one or more compliant components include at least one or more textured surfaces, one or more roughened surfaces, or one or more grooved surfaces that the one or more edges of the furlable boom engage. In some embodiments, the one or more compliant components are formed as one or more ring shapes and the one or more end portions of the boom spool include one or more end caps.

In some embodiments, the one or more edges of the furlable boom engage the compliant components through friction. In some embodiments, the furlable boom includes at least one or more textured edges or one or more roughened edges. Some embodiments include a single consolidation roller positioned such that the furlable boom flattens between the boom spool and the single consolidation roller. In some embodiments, the single consolidation roller is positioned at a boom to spool point.

Some embodiments include a method that may include engaging one or more edges of a furlable boom with one or more compliant components coupled with one or more lateral end portions of a boom spool. Engaging the one or more edges of the furlable boom with the one or more compliant components may hinder blooming of the furlable boom as the furlable boom deploys from the boom spool. Engaging the one or more edges of the furlable boom with the one or more compliant components may include engaging the one or more edges of the furlable boom with the one or more compliant components as the furlable boom is furled onto the boom spool. Some embodiments include flattening a portion of the furlable boom between the boom spool and a single consolidation roller. The single consolidation roller may be positioned at a boom to spool point. The furlable boom may include a slit-tube boom, though other furlable booms may be utilized such as triangular rollable and collapsible booms and/or tape springs. The one or more compliant components may include an elastomeric material, including, but not limited to, silicone.

Some embodiments include boom deployment system and/or device that may include: a boom spool; a furlable boom; and/or a boom spreader that spreads at least a portion of the furlable boom as the furlable boom is stowed on the boom spool. In some embodiments, the boom spreader includes a root plug. In some embodiments, the root plug includes a rotating root plug. The rotating root plug may rotate from a first orientation to a second orientation to spread at least the portion of the furlable boom. The rotating root plug may rotate back to the first orientation such that the rotating root plug matches a shape of the furlable boom in the deployed state of the furlable boom.

In some embodiments, the boom spreader includes a spreader arm mechanism that includes one or more spreader arms that spread out from a stowed state to spread a portion of the furlable boom onto the boom spool through contacting an inner surface of the furlable boom. Some embodiments include one or more paddles coupled with the one or more spreader arms. In some embodiments, at least the one or more spreader arms or the one or more paddles push the furlable boom away from a root plug.

Some embodiments include a guide rod positioned such that the furlable boom is pushed against the guide rod as the one or more spreader arms spreads the portion of the furlable boom. In some embodiments, one or more spreader arms retract to a stowed state after spreading the portion of the furlable boom onto the boom spool.

Some embodiments include a disengagement lever coupled with a spool lock and the spreader arm mechanism such that the spool lock is disengaged as the one or more spreader arms spread the portion the furlable boom.

In some embodiments, the root plug includes one or more protrusions that engage one or more apertures of the furlable boom in the deployed state of the furlable boom. In some embodiments, the furlable boom includes a slit-tube boom.

Some embodiments include a method that may include spreading a portion of a furlable boom onto a boom spool utilizing a boom spreader. In some embodiments, utilizing the boom spreader includes rotating a root plug from a first orientation where the portion of the furlable boom wraps around the root plug to a second orientation to spread the portion of the furlable boom. Some embodiments include rotating the root plug back to the first orientation such that the root plug matches a shape of the furlable boom in the deployed state of the furlable boom.

In some embodiments of the method, utilizing the boom spreader includes extending one or more spreader arms from a stowed state to spread the portion of the furlable boom onto the boom spool through contacting an inner surface of the furlable boom. Some embodiments include contacting one or more paddles coupled with the one or more spreader arms with the inner surface of the furlable boom. In some embodiments, at least one or more spreader arms or one or more paddles push the furlable boom away from a root plug.

Some embodiments of the method include pushing the portion of the furlable boom against a guide rod as the one or more spreader arms spreads the portion of the furlable boom.

Some embodiments include retracting the one or more spreader arms to the stowed state after spreading the portion of the furlable boom onto the boom spool. Some embodiments include disengaging a spool lock as the portion of the furlable boom is spread onto the boom spool utilizing the boom spreader.

Some embodiments include a boom deployment system and/or device that may include: a furlable boom; a first tip guide coupled with a first portion of a section of the furlable boom; and a second tip guide coupled with a second portion of the section of the furlable boom such that the first tip guide and the second tip guide engage each other in a deployed state of the furlable boom. In some embodiments, the section of the furlable boom includes an end section of the furlable boom. In some embodiments, the furlable boom includes a slit-tube boom. In some embodiments, the first tip guide and the second tip guide provide torsional rigidity to the furlable boom when the first tip guide and the second tip guide engage each other. In some embodiments, the first tip guide includes a first prong and the second tip guide includes a second prong and a third prong such that the first prong is guided between the second prong and the third prong to engage the first tip guide and the second tip guide with each other in the deployed state of the furlable boom. In some embodiments, the first tip guide and the second tip guide are disengaged from each other in a stowed state of the furlable boom. In some embodiments, a first slit edge of an end section of the furlable boom and a second slit edge of the end section of the furlable move towards each other as the furlable boom deploys; the furlable boom may include a slit-tube boom.

Some embodiments include a method that may include: unfurling a furlable boom from a boom spool; and engaging a first tip guide coupled with the furlable boom and a second tip guide coupled with the furlable boom. In some embodiments, engaging the first tip guide coupled with the furlable boom and the second tip guide coupled with the furlable boom includes slotting a first prong of the first tip guide between a first prong of the second tip guide and a second prong of the second tip guide. In some embodiments, a first edge of the furlable boom proximal to the first tip guide moves towards a second edge of the furlable boom proximal to the second tip guide. Some embodiments include disengaging the first tip guide from the second tip guide as the furlable boom is retracted back onto the boom spool.

Some embodiments include a boom deployment system and/or device that may include: a boom spool; a furlable boom coupled with the boom spool; and/or a spool lock that contacts a surface of the furlable boom between a stowed state of the furlable boom and a deployed state of the furlable boom and that engages a feature of the boom spool in the deployed state of the furlable boom. In some embodiments, the spool lock stops the boom spool from further rotation through the spool lock engaging the feature of the boom spool. Some embodiments include a boom spool motor coupled with the boom spool, wherein the spool lock triggers a shut off of the boom spool motor through the spool lock engaging the feature of the boom spool. In some embodiments, the spool lock triggers an engagement of a root clamp with respect to the furlable boom through the spool lock engaging the feature of the boom spool. Some embodiments include a disengagement lever coupled with the spool lock. In some embodiments, the disengagement lever is coupled with a boom spreader such that the disengagement lever disengages the spool lock from the feature of the boom spool as the boom spreader spreads at least a portion of the furlable boom onto the boom spool.

Some embodiments include a method that may include: unfurling a furlable boom from a boom spool such that a spool lock travels along a surface of the furlable boom; and/or engaging the spool lock with a feature of the boom spool when the furlable boom is deployed. In some embodiments, engaging the spool lock with the feature of the boom spool stops the boom spool from further rotation. Some embodiments include shutting off a boom spool motor coupled with the boom spool when the spool lock engages with the feature of the boom spool. Some embodiments include engaging a root clamp with respect to the furlable boom when the spool lock engages with the feature of the boom spool. Some embodiments include disengaging the spool lock such that the furlable boom furls back onto the boom spool. In some embodiments, disengaging the spool lock includes utilizing a disengagement lever coupled with a boom spreader mechanism such that the disengagement lever disengages the spool lock as the boom spreader mechanism spreads a portion of the furlable boom back onto the boom spool.

Some embodiments include a boom deployment system and/or device that may include: a furlable boom and one or more root clamps that clamp at least a portion of the furlable boom against a root component. In some embodiments, the root component includes a rotating root plug. In some embodiments, the root component includes a spreader arm mechanism. In some embodiments, the one or more root clamps include one or more locking arms. In some embodiments, the one or more root clamps include one or more spring plungers. In some embodiments, the one or more root clamps include one or more mechanical linkages. In some embodiments, one or more root clamps contact an outer surface of the furlable boom and the root component contacts an inner surface of the furlable boom. In some embodiments, the furlable boom includes a slit-tube boom.

Some embodiments include a method that may include clamping a portion of a furlable boom against a root plug in a deployed state of the furlable boom. Some embodiments include disengaging the clamping of the portion of the furlable boom against the root plug to stow the furlable boom onto a boom spool. In some embodiments, the root plug includes a rotating root plug. In some embodiments, the root plug includes a spreader arm mechanism. In some embodiments, clamping the portion of the furlable boom against the root plug in the deployed state of the furlable boom utilizes one or more locking arms. In some embodiments, clamping the portion of the furlable boom against the root plug in the deployed state of the furlable boom utilizes one or more spring plungers. In some embodiments, clamping the portion of the furlable boom against the root plug in the deployed state of the furlable boom utilizes one or more mechanical linkages. In some embodiments, clamping the portion of the furlable boom against the root plug in the deployed state of the furlable boom includes the one or more root clamps contacting an outer surface of the furlable boom and the root plug contacting an inner surface of the furlable boom. In some embodiments, the furlable boom includes a slit-tube boom.

Some embodiments include a boom deployment system and/or device that may include: a furlable boom; a root plug; and/or one of more stabilizing tabs coupled within an inner surface of the furlable boom, where the one or more stabilizing tabs engage one or more features of the root plug in a deployed state of the furlable boom. In some embodiments, the root plug includes the one or more features that engage the one or more stabilizing tabs. In some embodiments, the root plug includes one or more guiding features that guide the one or more stabilizing tabs into the one or more features of the root plug.

Some embodiments include a method that may include engaging one or more stabilizing tabs coupled with a furlable boom with one or more features of a root plug. Some embodiments include guiding the one or more stabilizing tabs into the one or more features of the root plug utilizing one or more guide features of the root plug. Some embodiments include disengaging the one or more stabilizing tabs coupled with the furlable boom from the one or more features of a root plug.

Some embodiments include a method of boom deployment that may include unfurling a furlable boom from a boom spool such that one or more edges of a portion of the furlable boom spooled around the boom spool engage with one or more compliant components coupled with one or more lateral end portions of the boom spool. In some embodiments, engaging the one or more edges of the portion of the furlable boom with the one or more compliant components hinders blooming of the furlable boom as the furlable boom deploys from the boom spool. Some embodiments include traveling a spool lock along a surface of the furlable boom as the furlable boom unfurls from the boom spool. Some embodiments include engaging the spool lock with a feature of the boom spool when the furlable boom is deployed. Some embodiments include engaging a first tip guide coupled with an end section the furlable boom and a second tip guide coupled with the end section of the furlable boom as the furlable boom reaches a deployed state. Some embodiments include clamping a portion of the furlable boom against a root plug in the deployed state of the furlable boom. Some embodiments include engaging one or more stabilizing tabs coupled with an inner surface of the furlable boom with one or more features of the root plug.

Some embodiments include a method of boom stowage that may include spreading a portion of a furlable boom onto a boom spool utilizing a boom spreader. In some embodiments, utilizing the boom spreader includes rotating a root plug from a first orientation where the portion of the furlable boom wraps around the root plug to a second orientation to spread the portion of the furlable boom. Some embodiments include rotating the root plug back to the first orientation such that the root plug matches a shape of the furlable boom in the deployed state of the furlable boom. In some embodiments, utilizing the boom spreader includes extending one or more spreader arms from a stowed state to spread the portion of the furlable boom onto the boom spool through contacting an inner surface of the furlable boom. Some embodiments include disengaging a spool lock as the portion of the furlable boom is spread onto the boom spool utilizing the boom spreader. Some embodiments include disengaging a first tip guide coupled with the furlable boom from a second tip guide coupled with the furlable boom as the furlable boom is furled onto the boom spool. Some embodiments include engaging one or more edges of the furlable boom with one or more compliant components coupled with one or more lateral end portions of the boom spool as the furlable boom is furled onto the boom spool. Some embodiments include flattening a portion of the furlable boom between the boom spool and a single consolidation roller.

Some embodiments include methods, systems, and/or devices as described in the specification and/or shown in the figures.

The foregoing has outlined rather broadly the features and technical advantages of embodiments according to the disclosure in order that the detailed description that follows may be better understood. Additional features and advantages will be described hereinafter. The conception and specific embodiments disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of different embodiments may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 2A, FIG. 2B, FIG. 2C, FIG. 2D, FIG. 2E, FIG. 2F, FIG. 2G, and FIG. 2H show systems and/or devices in accordance with various embodiments.

FIG. 7A, FIG. 7B, FIG. 7C, FIG. 7D, FIG. 7E, and FIG. 7F show flow diagrams of methods in accordance with various embodiments.

DETAILED DESCRIPTION

This description provides embodiments, and is not intended to limit the scope, applicability or configuration of the disclosure. Rather, the ensuing description will provide those skilled in the art with an enabling description for implementing embodiments of the disclosure. Various changes may be made in the function and arrangement of elements.

Thus, various embodiments may omit, substitute, or add various procedures or components as appropriate. For instance, it should be appreciated that the methods may be performed in an order different than that described, and that various stages may be added, omitted or combined. Also, aspects and elements described with respect to certain embodiments may be combined in various other embodiments. It should also be appreciated that the following systems, devices, and methods may individually or collectively be components of a larger system, wherein other procedures may take precedence over or otherwise modify their application.

Device, systems, and methods for boom deployment and/or boom stowage are provided in accordance with various embodiments. Some embodiments facilitate root control of a boom utilizing a variety of tools and techniques. Some embodiments facilitate boom tip control. Some embodiments include a furlable boom and a boom spool. Some embodiments include one or more devices that may include: one or more compliant components, one or more boom spreaders, one or more stabilizing tabs, one or more spool locks, one or more boom tip guides, one or more root clamps, and/or a single consolidation roller. Various methods may be utilized with respect to the one or more devices and/or systems in accordance with various embodiments. Some embodiments may include additional components.

Figure 1:
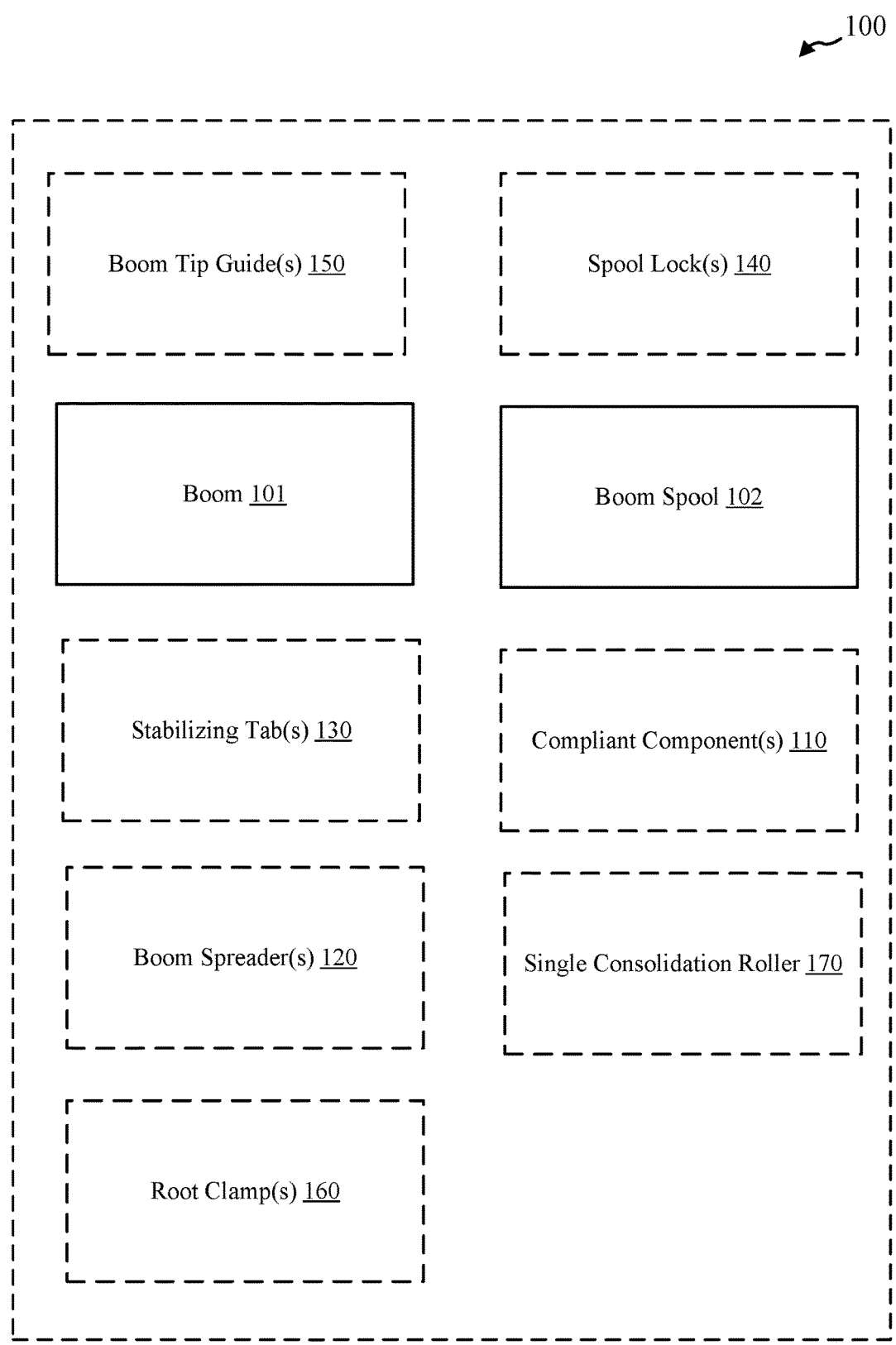
FIG. 1 shows a system and devices in accordance with various embodiments.

Turning now to FIG. 1, a boom deployer system 100 is provided in accordance with various embodiments. System 100 may include a boom 101 and a boom spool 102. System 100 may include a variety of other devices include one or more of the following: one or more compliant components 110, one or more boom spreaders 120, one or more stabilizing tabs 130, one or more spool locks 140, one or more boom tip guides 150, one or more root clamping 160, and/or a single consolidation roller 170. Some embodiments may include additional components. While system 100 shows multiple devices, some embodiments may utilize one or more of the devices alone or in combination with one or more of the other devices.

For example, some embodiments include the boom spool 102, the one or more compliant components 110 coupled with one or more lateral end portions of the boom spool 102, and the boom 101, which may be furlable, coupled with the boom spool 102 such that one or more edges of the furlable boom 101 engage the one or more compliant components 110. The use of the one or more compliant components 110 may facilitate bloom control of the furlable boom 101. The furlable boom 101 may include a slit-tube boom, though other furlable booms may be utilized such as triangular rollable and collapsible booms and/or tape springs.

In some embodiments, the one or more compliant components 110 include an elastomeric material. The elastomeric material may include silicone. In some embodiments, the one or more compliant components 110 include one or more flat surfaces that the one or more edges of the furlable boom 101 engage. In some embodiments, the one or more compliant components 110 include at least one or more textured surfaces, one or more roughened surfaces, or one or more grooved surfaces that the one or more edges of the furlable boom 101 engage. In some embodiments, the one or more compliant components 110 are formed as one or more ring shapes and the one or more end portions of the boom spool 102 include one or more end caps.

In some embodiments, the one or more edges of the furlable boom 101 engage the compliant components 110 through friction. In some embodiments, the furlable boom 101 includes at least one or more textured edges or one or more roughened edges. Some embodiments include the single consolidation roller 170 positioned such that the furlable boom 101 flattens between the boom spool 102 and the single consolidation roller 170. In some embodiments, the single consolidation roller 170 is positioned at a boom to spool point.

Some embodiments of system 100 include the one or more boom spreader 120 that spread at least a portion of the furlable boom 101 as the furlable boom 101 is stowed on the boom spool 102. In some embodiments, the boom spreader 120 includes a root plug. In some embodiments, the root plug includes a rotating root plug. The rotating root plug may rotate from a first orientation to a second orientation to spread at least the portion of the furlable boom 101. The rotating root plug may rotate back to the first orientation such that the rotating root plug matches a shape of the furlable boom 101 in the deployed state of the furlable boom 101.

In some embodiments, the boom spreader 120 includes a spreader arm mechanism that includes one or more spreader arms that spread out from a stowed state to spread a portion of the furlable boom 101 onto the boom spool 102 through contacting an inner surface of the furlable boom 101. Some embodiments include one or more paddles coupled with the one or more spreader arms. In some embodiments, at least one or more spreader arms or one or more paddles push the furlable boom 101 away from a root plug coupled with the spreader arm mechanism.

Some embodiments include a guide rod positioned such that the furlable boom 101 is pushed against the guide rod as the one or more spreader arms spreads the portion of the furlable boom 101. In some embodiments, one or more spreader arms retract to a stowed state after spreading the portion of the furlable boom 101 onto the boom spool 102.

Some embodiments include a disengagement lever coupled with the spool lock 140 and the spreader arm mechanism such that the spool lock 140 may be disengaged as the one or more spreader arms spread the portion the furlable boom 101.

In some embodiments, the root plug includes one or more protrusions that engage one or more apertures of the furlable boom 101 in the deployed state of the furlable boom 101. In some embodiments, the furlable boom 101 includes a slit-tube boom.

Some embodiments of system 100 include one or more tip guides 101, which may include first tip guide 150 coupled with a first portion of a section of the furlable boom 101 and a second tip guide 150 coupled with a second portion of the section of the furlable boom 101 such that the first tip guide 150 and the second tip guide 150 engage each other in a deployed state of the furlable boom 101. In some embodiments, the section of the furlable boom 101 includes an end section of the furlable boom 101. In some embodiments, the furlable boom 101 includes a slit-tube boom. In some embodiments, the first tip guide 150 and the second tip guide 150 provide torsional rigidity to the furlable boom 101 when the first tip guide 150 and the second tip guide 150 engage each other. In some embodiments, the first tip guide 150 includes a first prong and the second tip guide 150 includes a second prong and a third prong such that the first prong is guided between the second prong and the third prong to engage the first tip guide 150 and the second tip guide 150 with each other in the deployed state of the furlable boom 101. In some embodiments, the first tip guide 150 and the second tip guide 150 are disengaged from each other in a stowed state of the furlable boom 101. In some embodiments, a first slit edge of an end section of the furlable boom 101 and a second slit edge of the end section of the slit-tube boom move towards each other as the furlable boom 101 deploys; the furlable boom 1010 may include a slit-tube boom, for example.

Some embodiments of system 100 include the one or more spool locks 140 that contacts a surface of the furlable boom 101 between a stowed state of the furlable boom 101 and a deployed state of the furlable boom 101 and that engages a feature of the boom spool 102 in the deployed state of the furlable boom 102. In some embodiments, the spool lock 140 stops the boom spool 102 from further rotation through the spool lock 140 engaging the feature of the boom spool 102. Some embodiments include a boom spool motor coupled with the boom spool 102, where the spool lock 140 may trigger a shut off of the boom spool motor through the spool lock 140 engaging the feature of the boom spool 102. In some embodiments, the spool lock 140 triggers an engagement of the one or more root clamps 160 with respect to the furlable boom 101 through the spool lock 140 engaging the feature of the boom spool 102. Some embodiments include a disengagement lever coupled with the spool lock 140. In some embodiments, the disengagement lever is coupled with the boom spreader 120 such that the disengagement lever disengages the spool lock 140 from the feature of the boom spool 102 as the boom spreader 120 spreads at least a portion of the furlable boom 101 onto the boom spool 102.

Some embodiments of system 100 include the one or more root clamps 150 that clamp at least a portion of the furlable boom 101 against a root component, such as a root plug; the root plug may be part of the boom spreader 120. In some embodiments, the root component includes a rotating root plug. In some embodiments, the root component includes a spreader arm mechanism. In some embodiments, the one or more root clamps 160 include one or more locking arms. In some embodiments, the one or more root clamps 160 include one or more spring plungers. In some embodiments, the one or more root clamps 160 include one or more mechanical linkages. In some embodiments, one or more root clamps 160 contact an outer surface of the furlable boom 101 and the root component contacts an inner surface of the furlable boom 101. In some embodiments, the furlable boom includes a slit-tube boom.

Some embodiments of system 100 include a root plug, which may be part of or coupled with the boom spreader 120, and the one of more stabilizing tabs 130 coupled within an inner surface of the furlable boom 101, where the one or more stabilizing tabs 130 may engage one or more features of the root plug in a deployed state of the furlable boom 101. In some embodiments, the root plug includes the one or more features that engage the one or more stabilizing tabs 130. In some embodiments, the root plug includes one or more guiding features that guide the one or more stabilizing tabs 130 into the one or more features of the root plug.

FIG. 2A shows a system 100-$a$ in accordance with various embodiments. System 100-$a$ may be an example of aspects of system 100 of FIG. 1. System 100-$a$ may include a boom spool 102-$a$ and one or more compliant components 110-$a$ coupled with one or more lateral end portions of the boom spool 102-$a$ (e.g., the end caps of the boom spool 102-$a$). System 100-$a$ may include a furlable boom 101-$a$ coupled with the boom spool 102-$a$ such that one or more edges of the furlable boom 101-$a$ engage the one or more compliant components 110-$a$. The use of the one or more compliant components 110-$a$ may facilitate bloom control of the furlable boom 101-$a$, such as during deployment of the boom 101-$a$ from the boom spool 102-$a$. The compliant component(s) 110-$a$ may be referred to as boom stabilizers, retention components, and/or a bloom control components, for example. Some embodiments may be designed with a boom deployment load taken into consideration. The furlable boom 101-$a$ may include a slit-tube boom, though other furlable booms 101-$a$ may be utilized, including, but not limited to, triangular rollable and collapsible booms and/or tape springs.

The compliant component(s) 110-$a$ may be positioned such that one or more edges of the boom 101-$a$ may engage the one or more compliant components 110-$a$ during stowage and/or deployment of the boom 101-$a$. For example, with a slit tube boom, as the boom 101-$a$ may be flattened and stowed onto the boom spool 102-$a$, portions of the edges the boom 101-$a$ may be pushed into respective compliant components 110-$a$ on each lateral end of the boom spool 102-$a$. The edge(s) may be locked into position through friction, thus engaging one or more edges of the furlable boom 101-$a$ with the compliant components 110-$a$ through friction.

Some embodiments may include two compliant components 110-$a$, for example, with one compliant component 110-$a$ coupled with each of the two end caps of a boom spool 102-$a$. While slit tube booms may benefit from utilizing of the one or more compliant components 110-$a$, other boom designs may be utilized, including, but not limited to, triangular rollable and collapsible booms and/or tape springs.

The compliant component(s) 110-$a$ may facilitate bloom control through maintaining control of one or more edges of the boom 101-$a$ as the boom 101-$a$ may be deployed from the boom spool 102-$a$. In some cases, the compliant component(s) 110-$a$ may also facilitate stowage of the boom 101-$a$ onto the boom spool 102-$a$ through its control and/or engagement of one or more edges of the boom 101-$a$. The compliant component(s) 110-$a$ may also protect the edge of the boom 101-$a$ against damage. In some embodiments, the one or more compliant components 110-$a$ are formed as one or more ring shapes and the one or more end portions of the boom spool 102-$a$ include one or more end caps.

The compliant component(s) 110-$a$ may include a variety of materials, such as an elastomeric material. Some embodiments may utilize silicone. Other elastomeric materials may be utilized, including, but not limited to, FKM or Viton.

In some embodiments, the compliant component(s) 110-$a$ may be formed with a flat surface that may engage edge(s) of the boom 101-$a$, though grooves may be utilized in some embodiments to further facilitate controlling and/or guiding an edge of the boom 101-*a*. In some embodiments, the compliant component(s) 110-*a* may be roughened or textured to further facilitate frictional tie between the edge(s) of the boom 101-*a* and the compliant component(s) 110-*a*. In some embodiments, one or more edges of the boom 101-*a* may be modified or treated to further facilitate engaging with the compliant component(s) 110-*a*, such as through texturing or roughing up an edge of the boom 101-*a*. The roughness or texturing may be randomized. This may enhance the frictional tie between the edge of the boom 101-*a* and the compliant component(s) 110-*a*. The compliant component(s) 110-*a* may be configured as a ring shape in some embodiments.

Some embodiments include a single consolidation roller 170-*a* that may be positioned such that the furlable boom 101-*a* flattens between the boom spool 102-*a* and the single consolidation roller 170-*a*. In some embodiments, the single consolidation roller 170-*a* is positioned at a boom to spool point. The use of the one or more compliant components 110-*a* may allow for the use of a single consolidation roller 170-*a* rather than a more typical use of multiple consolidation rollers. The single consolidation roller 170-*a* may be configured to translate purely in a radial direction. The single consolidation roller 170-*a* may travel along the radial direction as the boom 101-*a* may be stowed or deployed from the boom spool 102-*a*.

Figure 2B:
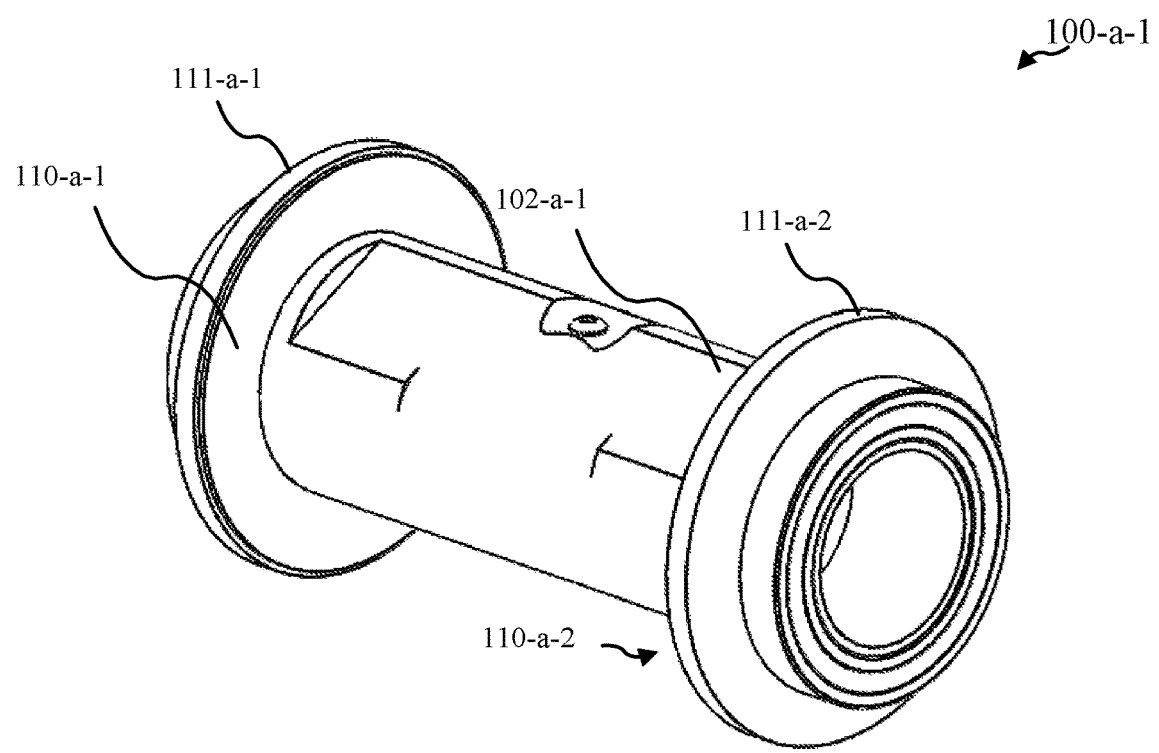
Figures 2C, 2D:
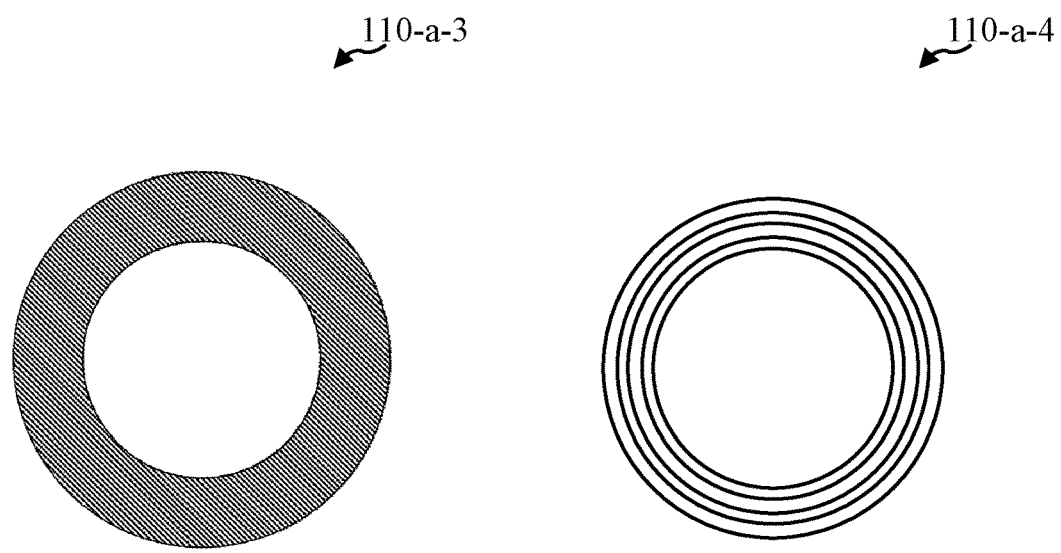

FIG. 2B shows a system 100-*a*-1 in accordance with various embodiments, which may be an example of aspects of system 100-*a* of FIG. 2A and/or system 100 of FIG. 1. System 100-*a*-1 may include a boom spool 102-*a*-1 coupled with one or more compliant components 110-*a*-1 and 110-*a*-2 (which may be obscured from view by a portion of the boom spool 102-*a*-1 and its position is merely pointed to in this figure). For example, the compliant component(s) 110-*a*-1, 110-*a*-2 may be configured as a ring of elastomeric material and coupled with lateral end portions 111-*a*-1, 111-*a*-2 of the boom spool 102-*a*-1; lateral end portions 111-*a*-1, 111-*a*-2 may be referred to as end caps. FIG. 2C and FIG. 2D show other examples of compliant components 110-*a*-3 and 110-*a*-4, respectively, in accordance with various embodiments; for example, compliant component 110-*a*-3 may show a roughened or textured surface, while compliant component 110-*a*-4 may show a grooved configuration. These configurations may further enhance the engagement between the edges of a furlable boom and the compliant components.

Figure 2E:
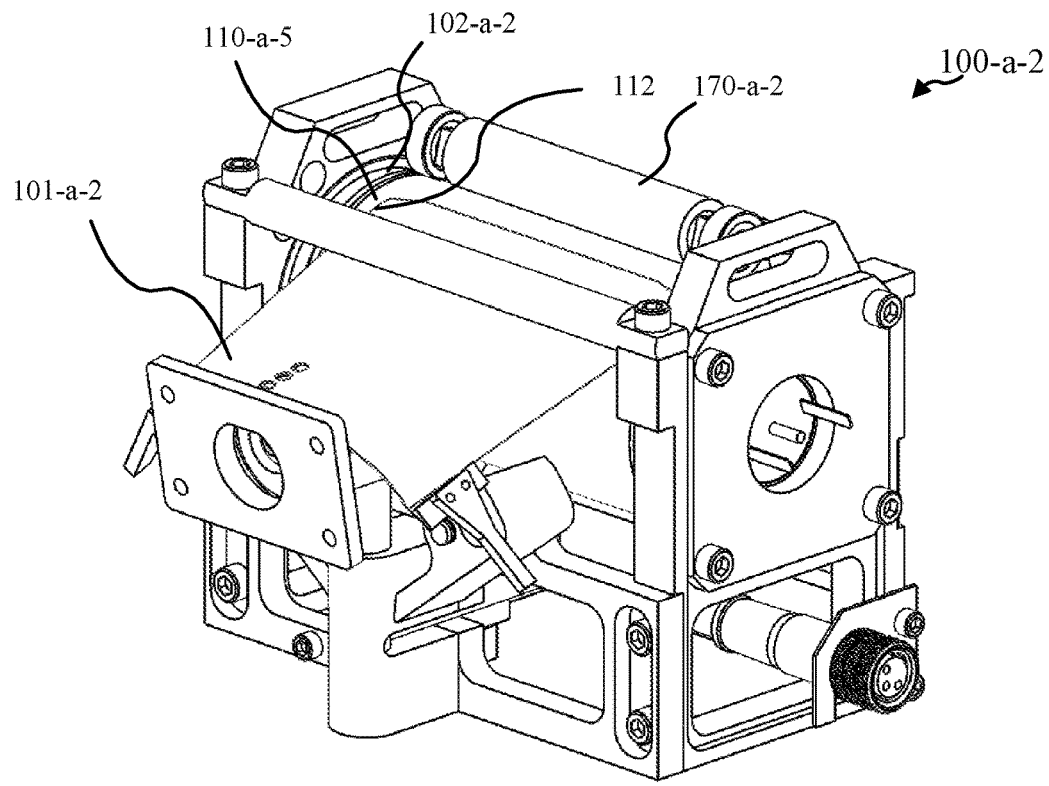
Figure 2F:
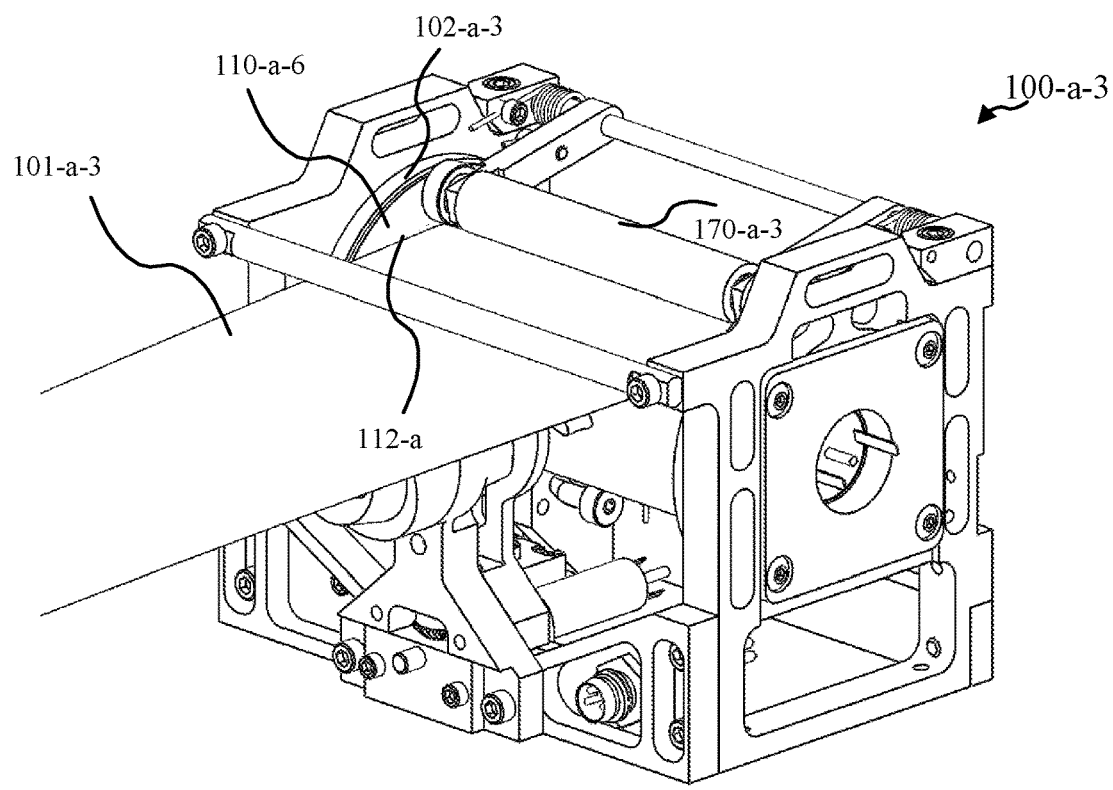

FIG. 2E and FIG. 2F show examples of boom deployment systems 100-*a*-2 and 100-*a*-3, respectively, in accordance with various embodiments. Systems 100-*a*-2 and 100-*a*-3 may be examples of aspects of system 100 of FIG. 1 and/or system 100-*a* of FIG. 2A. FIG. 2E shows furlable boom 101-*a*-2 in a stowed state in with edge 112 of the boom 101-*a*-2 engaging a compliant component 110-*a*-5 coupled with boom spool 102-*a*-2, such as the lateral end portions or end caps of the boom spool 102-*a*-2. FIG. 2F shows an example where furlable boom 101-*a*-3 may be partially deployed from boom spool 102-*a*-3, while edge 112-*a* of the boom 101-*a*-3 engage the compliant component 110-*a*-6 coupled with boom spool 102-*a*-3, such as the lateral end or end caps of the boom spool 102-*a*-3. Both system 100-*a*-2 and 100-*a*-3 also show examples of the use of a single consolidation roller 170-*a*-2 and 170-*a*-3, respectively, that may accommodate the furlable booms 101-*a*-2 and 101-*a*-3, respectively, as they either deploy or are stowed onto the boom spools 102-*a*-2 and 102-*a*-3, respectively. System 100-*a*-2 and 100-*a*-3 may include additional components and/or devices that may be described in more detail herein.

Figure 2G:
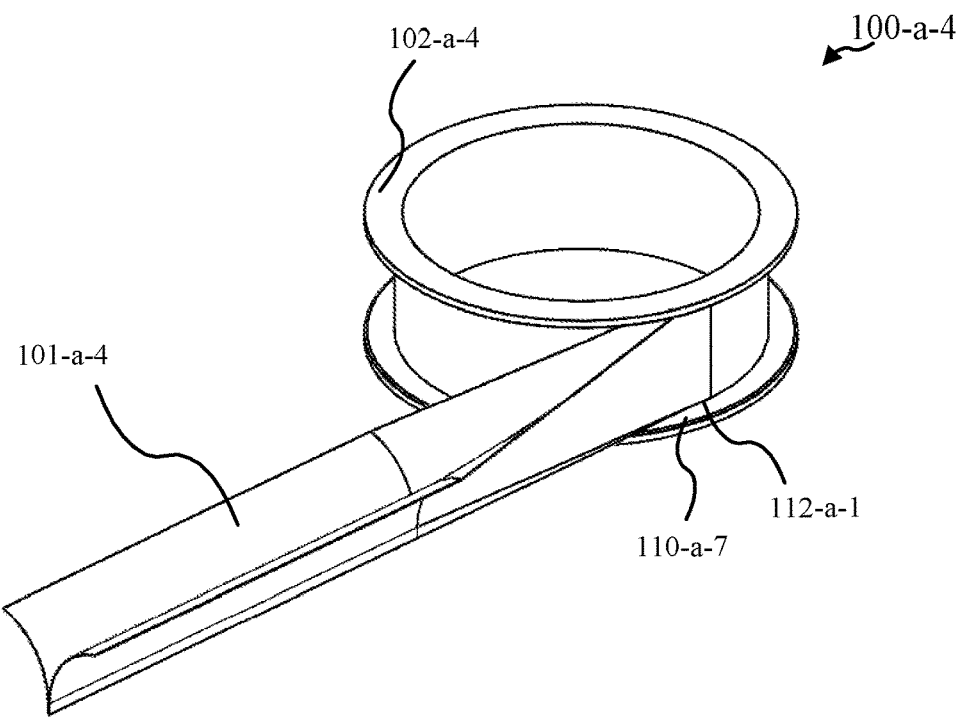
Figure 2H:
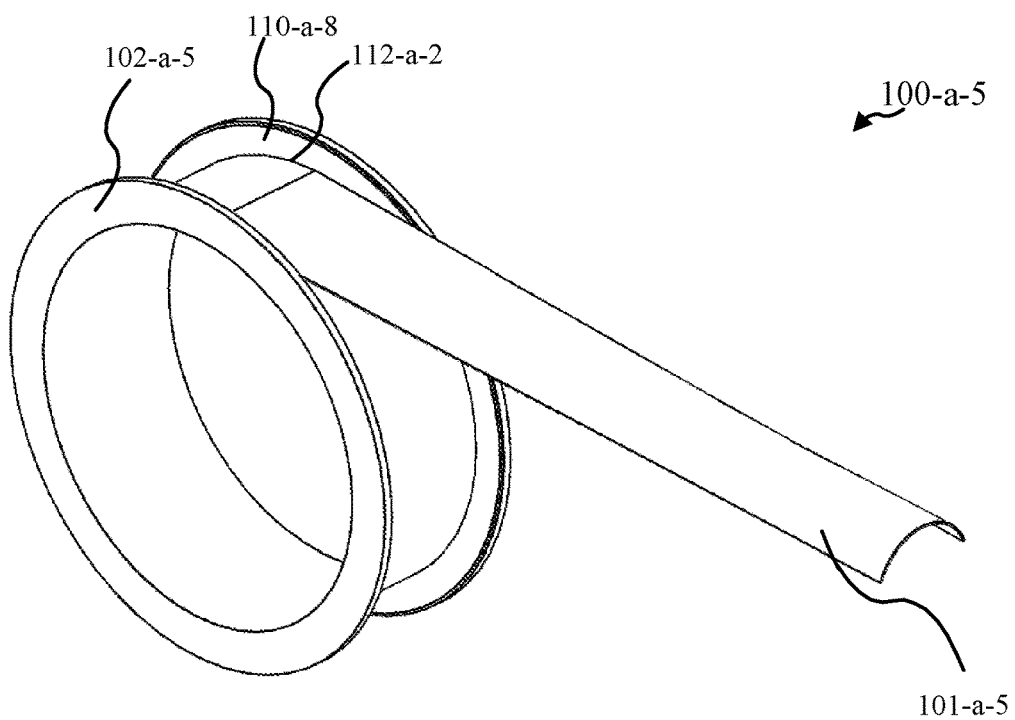

FIG. 2G and FIG. 2H show other examples of systems 100-*a*-4 and 100-*a*-5, respectively, in accordance with various embodiments, which may be examples of aspects of system 100 of FIG. 1 and/or 100-*a* of FIG. 2A. System 100-*a*-4 and 100-*a*-5 may include boom spools 102-*a*-4 and 102-*a*-5, respectively, one or more compliant components 110-*a*-7 and 110-*a*-8, respectively, and furlable booms 101-*a*-4 and 101-*a*-5, respectively. In particular, system 100-*a*-4 of FIG. 2G shows an example with a triangular rollable and collapsible boom with one or more edges 112-*a*-1 of the boom 101-*a*-4 engaging the compliant component 110-*a*-7. FIG. 2H shows an example of the use of a tape spring 101-*a*-5 that may have one or more edges 112-*a*-2 engage the compliant components 101-*a*-8 coupled with the boom spool 102-*a*-5. Other engaged edges with respect to compliant components may be obscured from view.

Figure 3A:
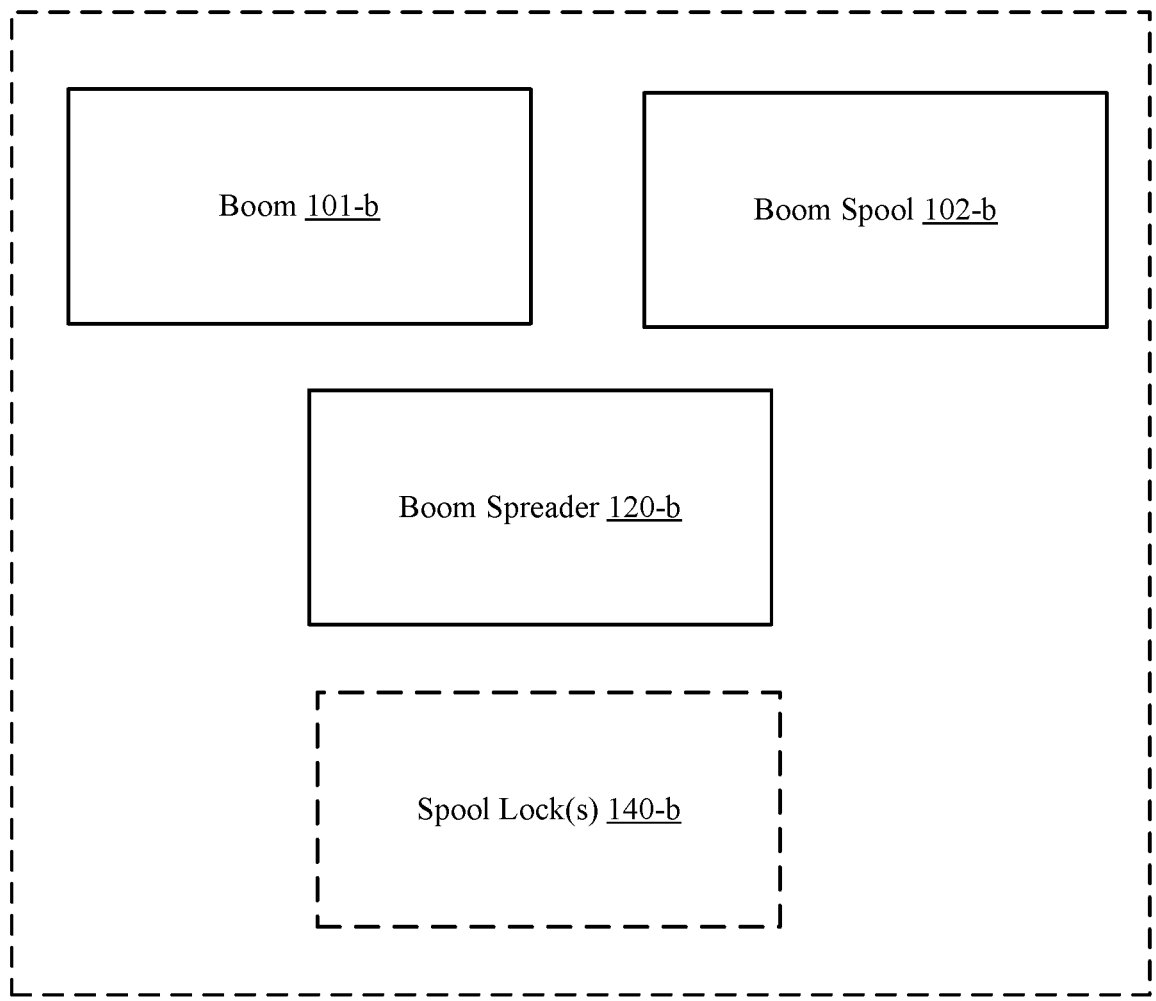
FIG. 3A, FIG. 3B, FIG. 3C, FIG. 3D, FIG. 3E, FIG. 3F, FIG. 3G, FIG. 3H, FIG. 3I, FIG. 3J, FIG. 3K, FIG. 3L, FIG. 3M, FIG. 3N, FIG. 3O, FIG. 3P, FIG. 3Q, FIG. 3R, and FIG. 3S show systems and/or devices in accordance with various embodiments.

Turning now to FIG. 3A, a system 100-*b* in accordance with various embodiments is provided. System 100-*b* may be an example of aspects of system 100 of FIG. 1. System 100-*b* may include a boom 101-*b*, such as a furlable boom, a boom spool 102-*b*, and a boom spreader 120-*b* that may spread at least a portion of the furlable boom 101-*b* as the furlable boom 101-*b* is stowed on the boom spool 102-*b*.

In some embodiments of system 100-*b*, the boom spreader 120-*b* includes a root plug. In some embodiments, the root plug includes a rotating root plug. The rotating root plug may rotate from a first orientation to a second orientation to spread at least the portion of the furlable boom 101-*b*. The rotating root plug may rotate back to the first orientation such that the rotating root plug matches a shape of the furlable boom 101-*b* in the deployed state of the furlable boom 101-*b*.

In some embodiments, the boom spreader 102-*b* includes a spreader arm mechanism that includes one or more spreader arms that spread out from a stowed state to spread a portion of the furlable boom 101-*b* onto the boom spool 102-*b* through contacting an inner surface of the furlable boom 101-*b*. Some embodiments include one or more paddles coupled with the one or more spreader arms. In some embodiments, at least one or more spreader arms or one or more paddles push the furlable boom 101-*b* away from a root plug coupled with the spread arm mechanism.

Some embodiments of system 100-*b* include a guide rod positioned such that the furlable boom 101-*b* is pushed against the guide rod as the one or more spreader arms spreads the portion of the furlable boom 101-*b*. In some embodiments, one or more spreader arms retract to a stowed state after spreading the portion of the furlable boom 101-*b* onto the boom spool 102-*b*.

Some embodiments of system 100-*b* include a spool lock 140-*b* that may be configured such that a disengagement lever coupled with the spool lock 140-*b* and the spreader arm mechanism such that the spool lock 140-*b* is disengaged as the one or more spreader arms spread the portion the furlable boom 101-*b*.

In some embodiments of system 100-*b*, the root plug includes one or more protrusions that engage one or more apertures of the furlable boom 101-*b* in the deployed state of the furlable boom 101-*b*. In some embodiments, the furlable boom 101-*b* includes a slit-tube boom.

Figure 3B:
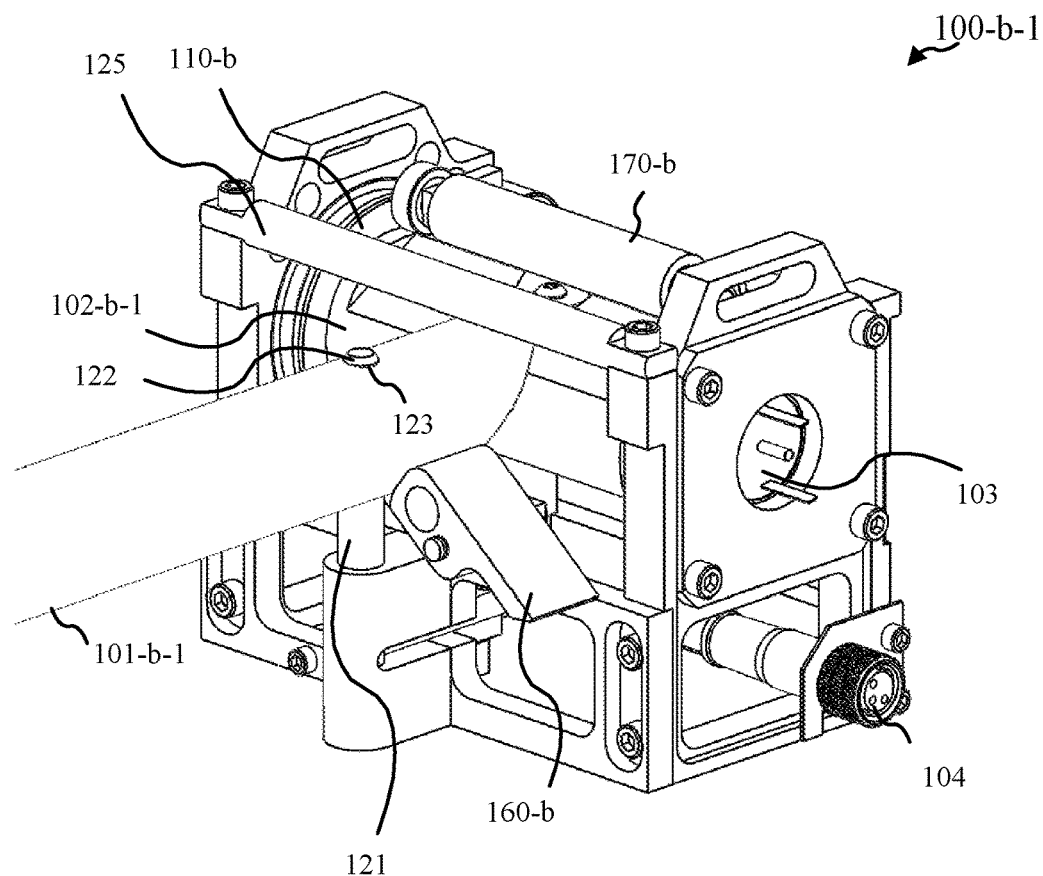
Figure 3C:
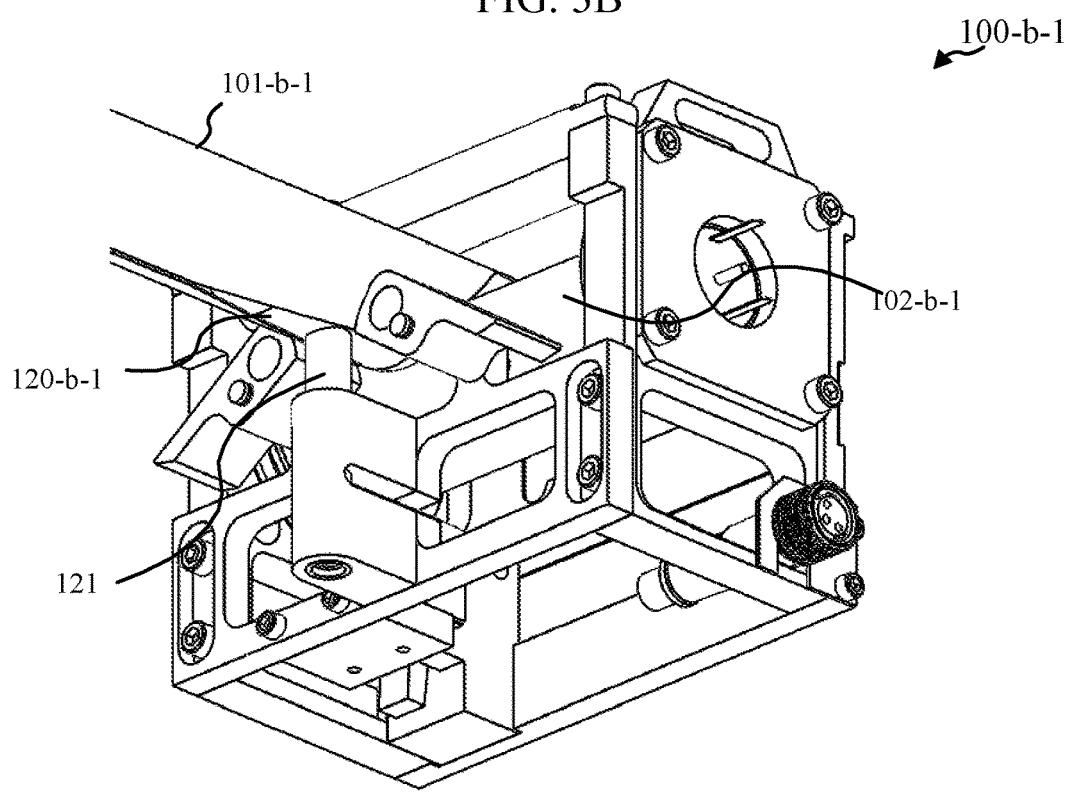

FIG. 3B and FIG. 3C show two perspectives on a system 100-*b*-1 in accordance with various embodiments. System 100-*b*-1 may be an example of aspects of system 100 of FIG. 1 and/or system 100-*b* of FIG. 3A. Aspects of system 100-*b*-1 may reflect aspects of systems 100-*a*-2 of FIG. 2E.

System 100-*b*-1 may show a boom 101-*b*-1 in a deployed state. The furlable boom 101-*b*-1 is shown as a slit-tube boom. A root end of the boom 101-*b*-1 may fit around a root plug 120-*b*-1 (seen from below in FIG. 3C) that may be coupled with root plug post 121. The root plug 120-*b*-1 may be an example of a rotating root plug configured as a boom spreader. System 100-*b*-1 may include a root clamping 160-*b*, shown as root lock component pressed against an outer side of the boom 101-*b*-1 against the root plug 120-*b*-1. The deploy boom 101-*b*-1 may be coupled with boom spool 102-*b*-1; the boom spool 102-*b*-1 may be driven by drive motor 103. Drive motor 103 may be utilized for deployment of boom 101-*b*-1 and/or stowage of boom 101-*b*-1.

System 100-*b*-1 may also show compliant component 110-*b*-1; system 100-*b*-1 may include additional compliant component(s) that may be obscured from view. System 100-*b*-1 may also show a single consolidation roller 170-*b*-1; the single consolidation roller 170-*b*-1 may be positioned at a Boom to Spool (BTS) point where the boom 101-*b*-1 may become flat as it begins to roll onto the boom spool 102-*b*-1. System 100-*b*-1 may also show a controller connector 104. System 101-*b*-1 may also show a guide rod 125.

Root plug 120-*b*-1 may include one or more protrusions 122 that may engage one or more apertures 123 of the furlable boom 101-*b*-1 in the deployed state of the furlable boom 101-*b*-1. The one or more protrusions 122 may act as locking pins, which may facilitate controlling the deployed boom 101-*b*-1.

Figure 3D:
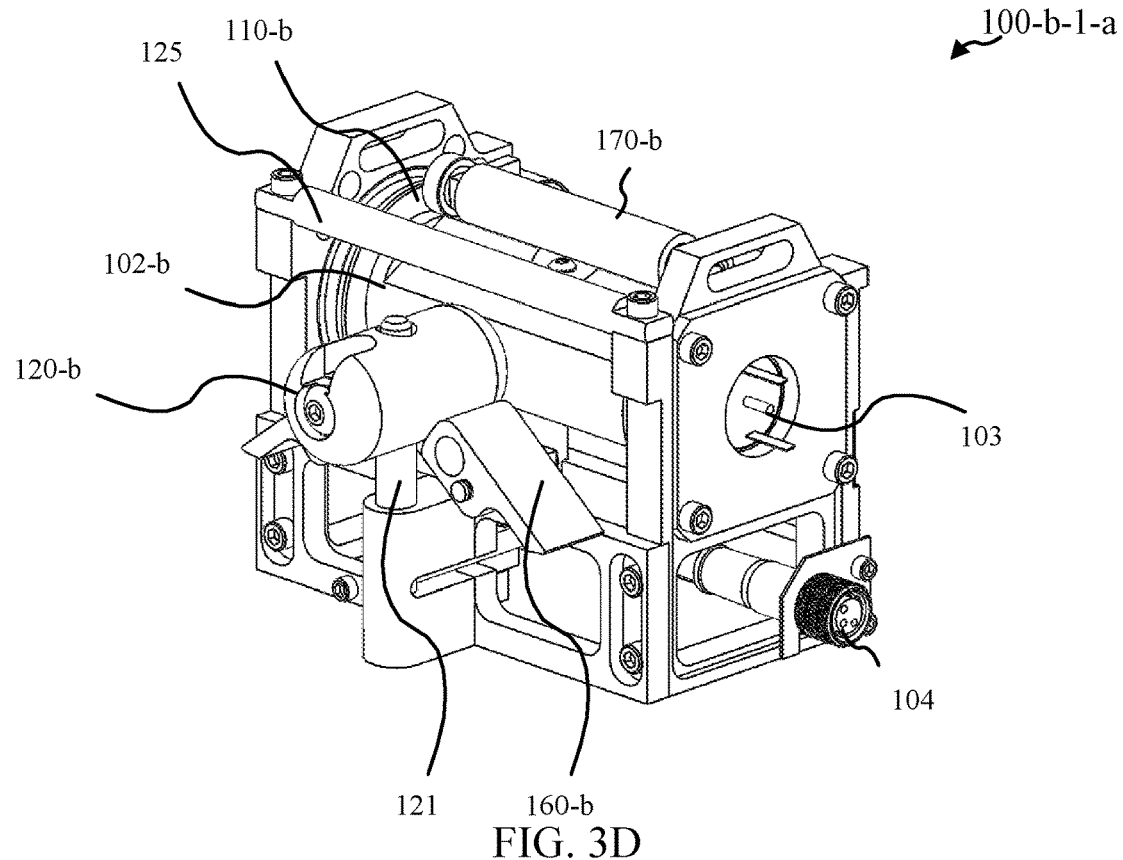
Figure 3E:
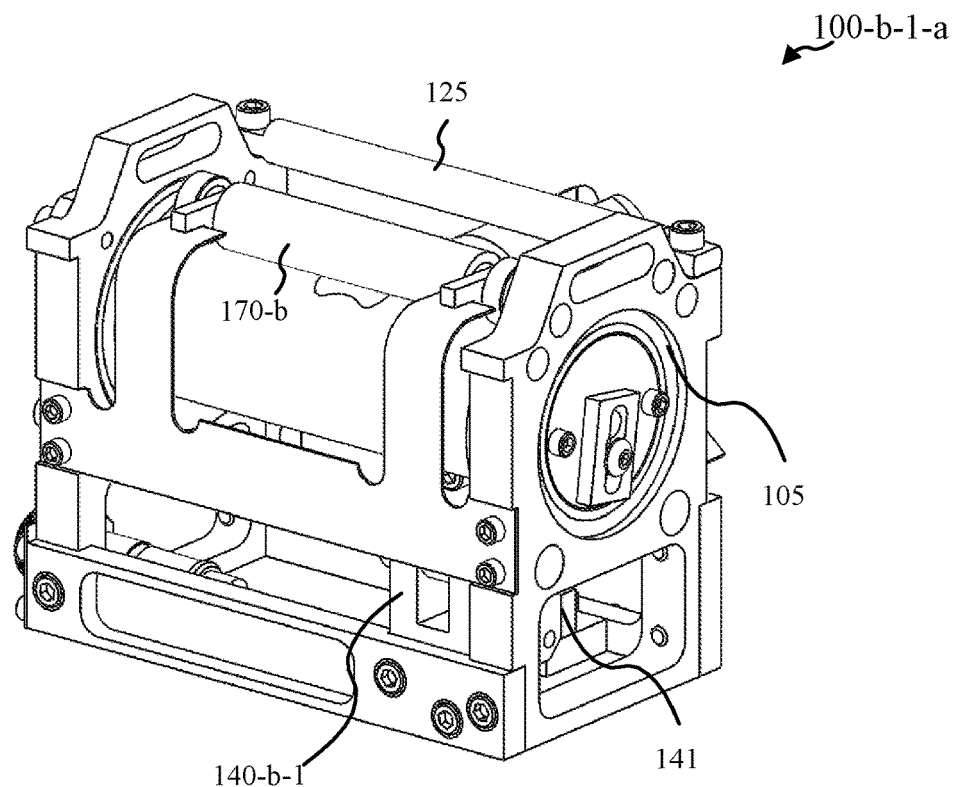
Figure 3F:
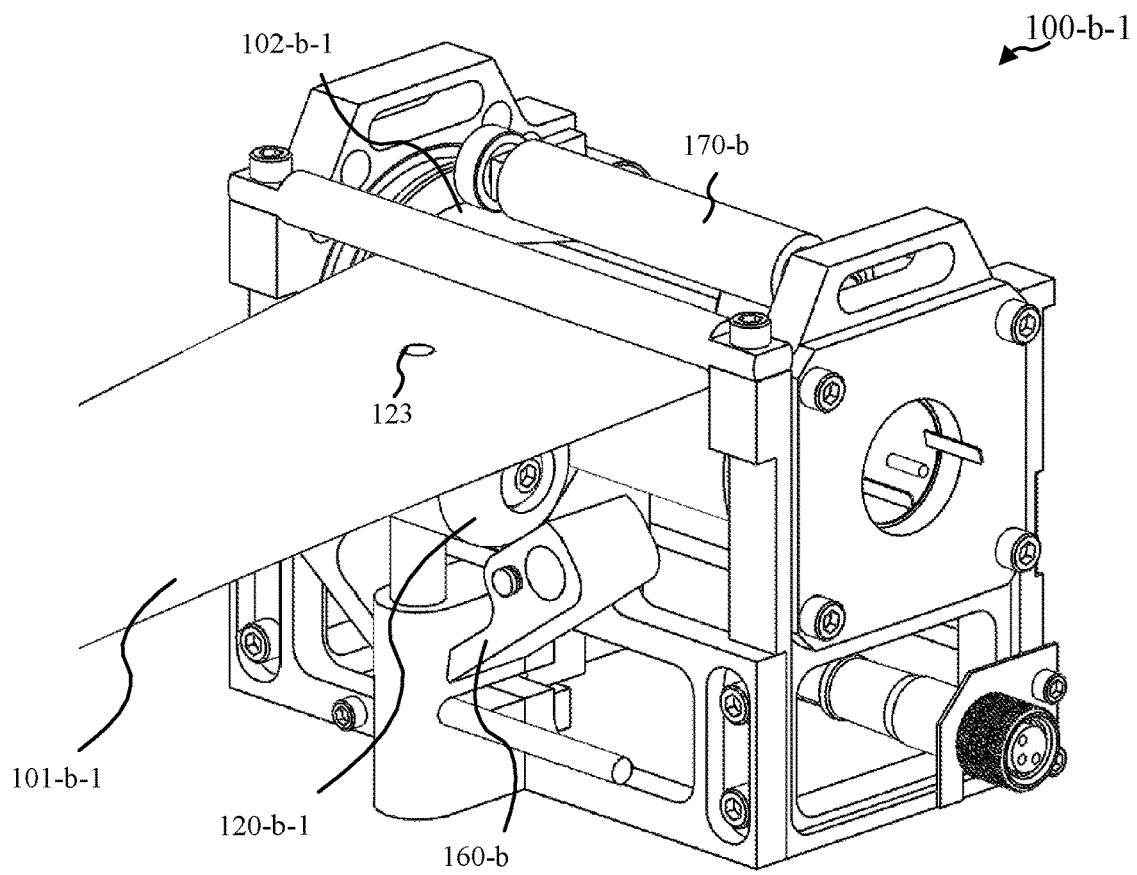
Figure 3G:
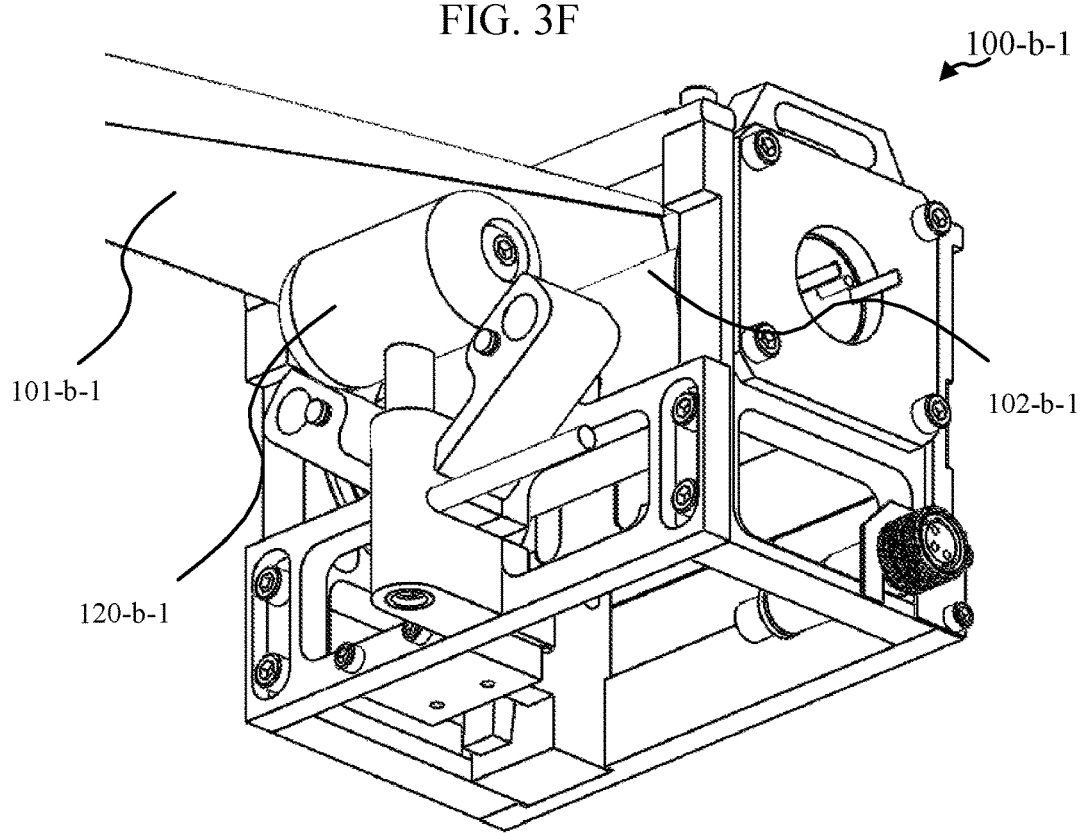

FIG. 3D and FIG. 3E show two perspectives of a system 100-*b*-1-*a* reflecting aspects of system 100-*b*-1 of FIGS. 3B and 3C in accordance with various embodiments; boom 101-*b*-1 has been removed in order to better show aspects of the system 100-*b*-1.

System 100-*b*-1-*a* may show the root plug 120-*b*, which may be configured as a rotating root plug, with root plug post 121. System 100-*b*-1-*a* may include the root clamp 160-*b*, shown as root lock component that may be pressed against an outer side of a boom against the root plug 120-*b*. System 100-*b*-1-*a* may include the boom spool 102-*b*, which may be driven by drive motor 103. The root plug 120-*b* may be referred to as being in its first orientation, which may match the shape of a deployed boom.

System 100-*b*-1-*a* may also show compliant component 110-*b*. System 100-*b*-1-*a* may also show single consolidation roller 170-*b*; the single consolidation roller 170-*b* may be positioned at a Boom to Spool (BTS) point where a boom may become flat as it begins to roll onto the boom spool 102-*b*. System 100-*b*-1-*a* may also show a controller connector 104. System 100-*b*-1-*a* may also include aspects of a spool lock 140-*b*-1. System 100-*b*-1-*a* may include a switch 141, such as a micro switch, which may turn off the drive motor 103 when the spool lock 140-*b*-1 engages with a spool lock slot (not shown). System 100-*b*-1-*a* may also show a bearing 105 and guide rod 125.

FIG. 3F, FIG. 3G, FIG. 3H and FIG. 3I show two states of aspects of system 100-*b*-1 in accordance with various embodiments. These figures may highlight how a rotating root plug 120-*b*-1 may be utilized. For example, FIG. 3F and FIG. 3G may show an initial stowage process where the rotating root plug 120-*b*-1 may rotate to a second orientation to spread the boom 101-*b*-1. Once the boom 101-*b*-1 may have been spooled enough with respect to boom spool 102-*b*-1 such that the BTS may be fully formed, the rotating root plug 120-*b*-1 may be rotated back to a first orientation as may be shown in FIG. 3H and FIG. 3I. These figures also show root clamping mechanism 160-*b* in a disengaged state.

In general, the rotating root plug 120-*b*-1 may rotate from the first orientation to the second orientation to spread at least the portion of the furlable boom 101-*b*-1. The rotating root plug 120-*b*-1 may rotate back to the first orientation such that the rotating root plug 120-*b*-1 matches a shape of the furlable boom 101-*b*-1 in the deployed state of the furlable boom 101-*b*-1.

Figure 3H:
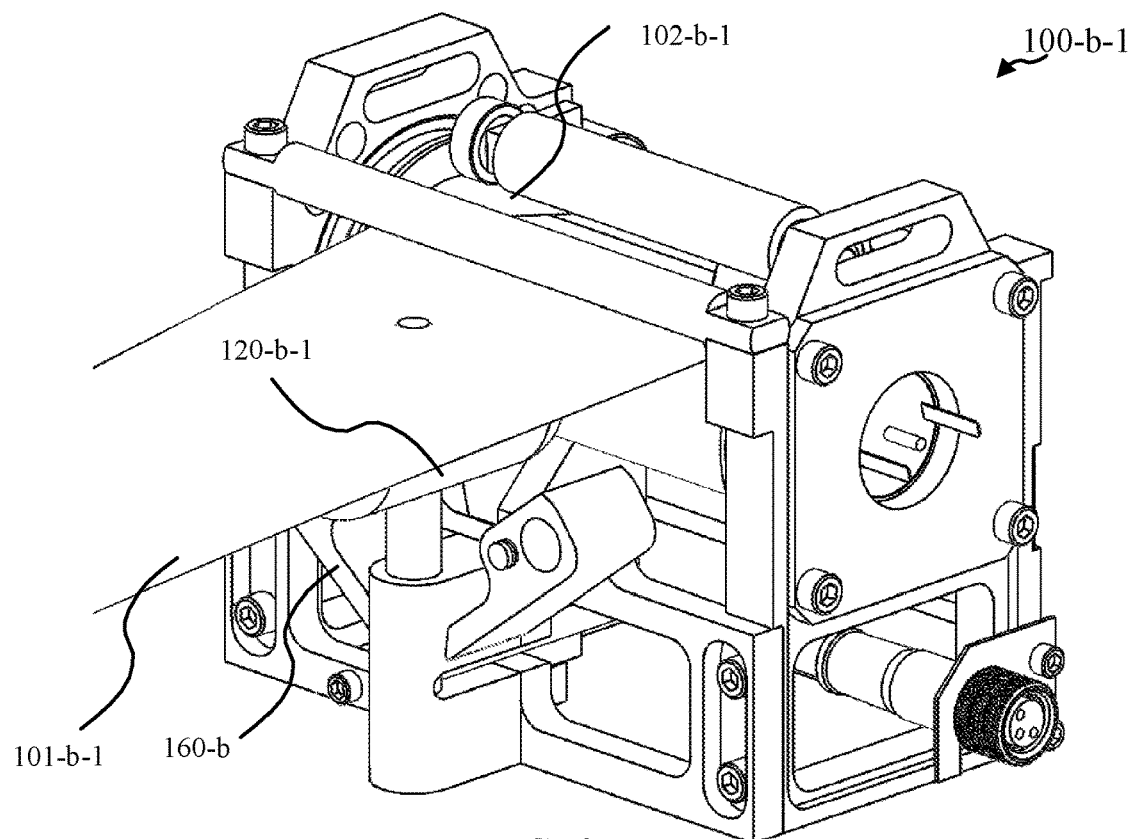
Figure 3I:
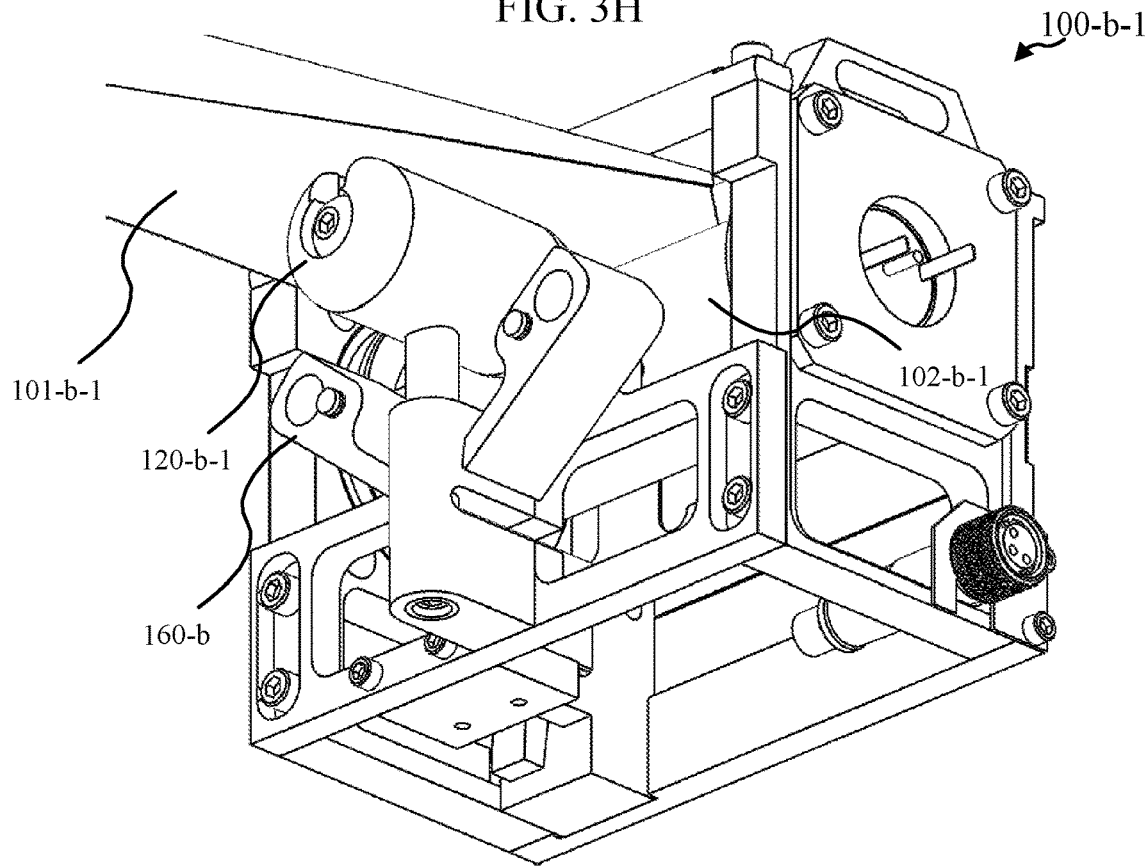

From the second orientation (see FIG. 3F and FIG. 3G), the rotating root plug 120-*b*-1 may spread the boom 101-*b*-1 for stowage. For example, for a stowage process, the rotating root plug 120-*b*-1 may rotate to spread the boom 101-*b*-1. Once the boom 101-*b*-1 has been spooled enough such that the boom to spool (BTS) point (where the boom 101-*b*-1 becomes flat as it begins to roll onto the boom spool 102-*b*-1) is fully formed, the rotating root plug 120-*b*-1 may be rotated back to a normal position (i.e., the first orientation, as shown in FIG. 3H and FIG. 3I) where it may act as a root plug for the boom 101-*b*-1. The rotating root plug 120-*b*-1 may ease the boom transition so that the boom 101-*b*-1 may be stowed and/or restowed. For example, the rotating root plug 120-*b*-1 may facilitate resetting the boom 101-*b*-1 during orbit. The rotating root plug 120-*b*-1 may be rotated during orbit to facilitate flattening the boom 101-*b*-1 for retraction and stowage on the boom spool 102-*b*-1. During deployment or after deployment, the rotating root plug 120-*b*-1 may be rotated such that the rotating root plug 120-*b*-1 may provide support for the root end of the boom 101-*b*-1 as the root end wraps around the rotating root plug 120-*b*-1 in some embodiments (see FIG. 3B and FIG. 3C, for example).

Figure 3J:
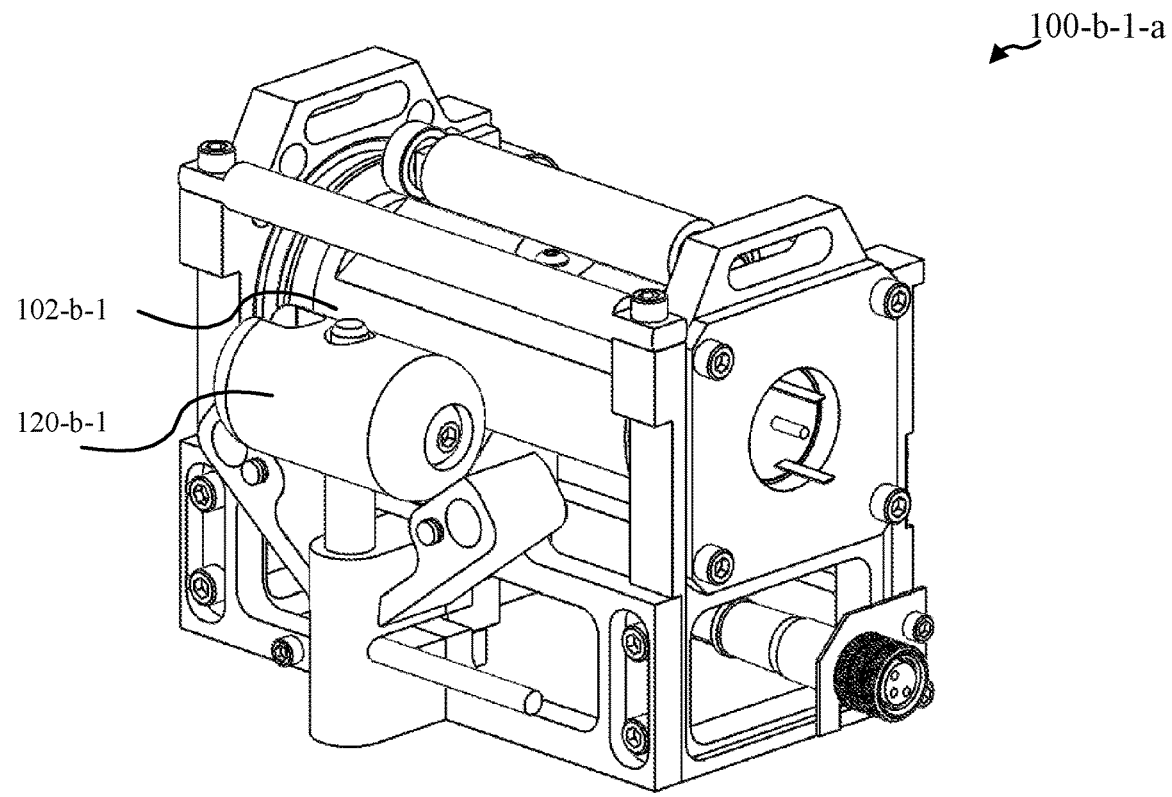
Figure 3K:
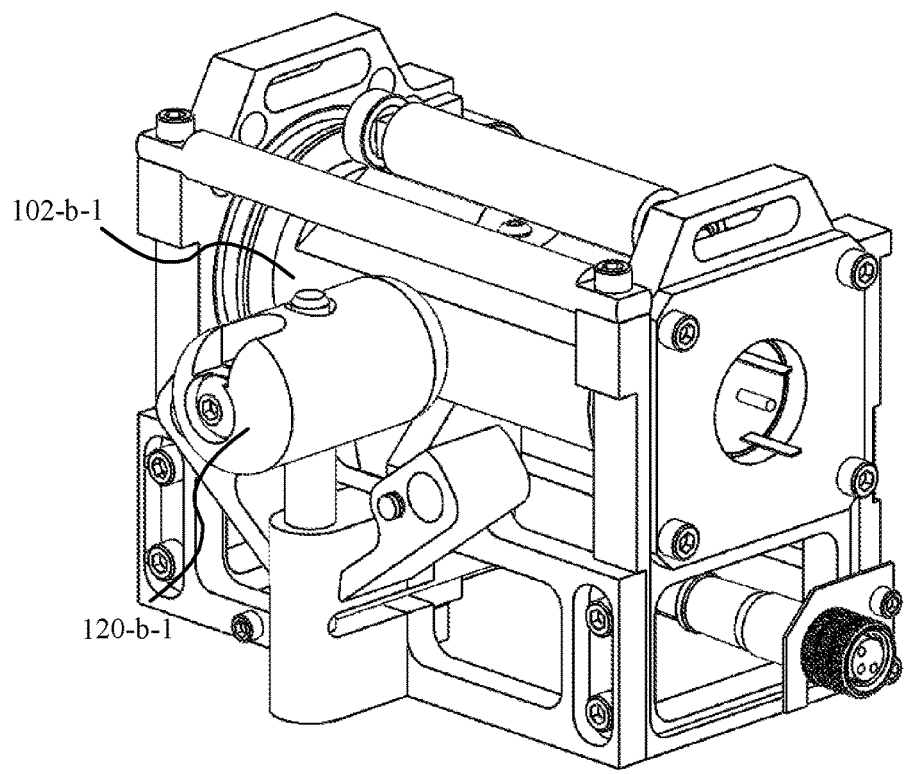

FIG. 3J and FIG. 3K are also provided that show system 100-*b*-1-*a* with the boom removed to better show aspects of this system 100-*b*-1. In particular, FIG. 3J shows the boom spreader as the rotating root pug 120-*b*-1 in the second orientation to spread a boom, while FIG. 3K shows the rotating root plug 120-*b*-1 in the first orientation, which may be utilized after the boom has begun to spread onto the boom spool 102-*b*-1 and/or when the boom is in a deployed state such that the rotating root plug 120-*b*-1 matches a shape of the deployed boom. See also FIG. 3D and FIG. 3E.

Figure 3L:
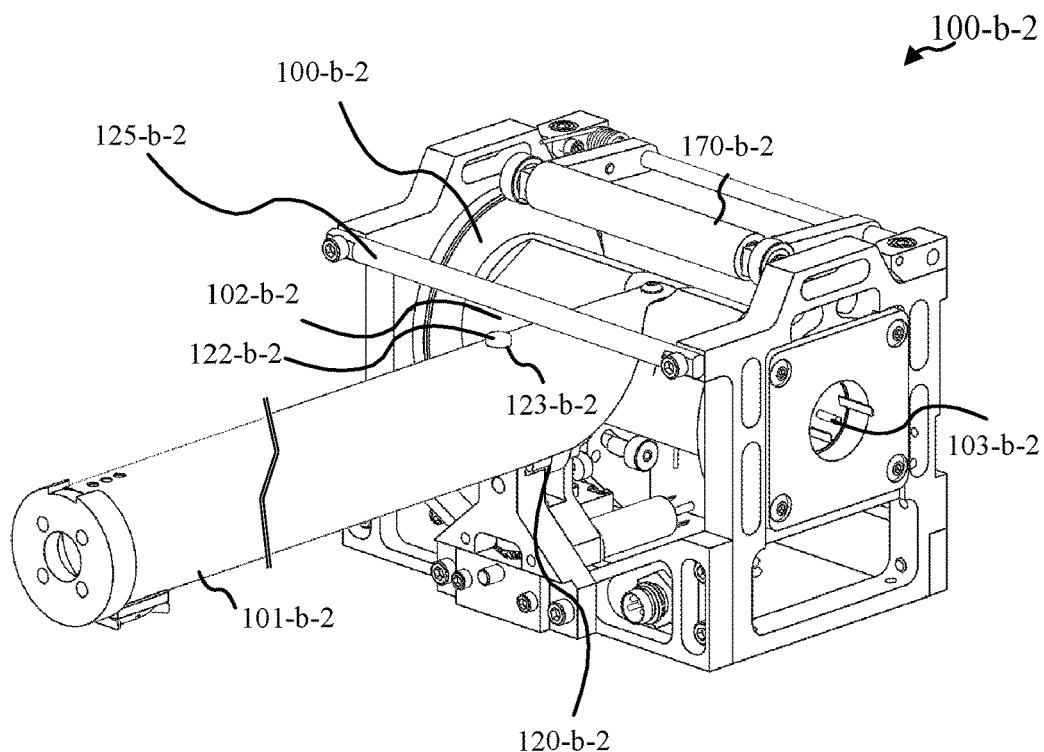
Figure 3M:
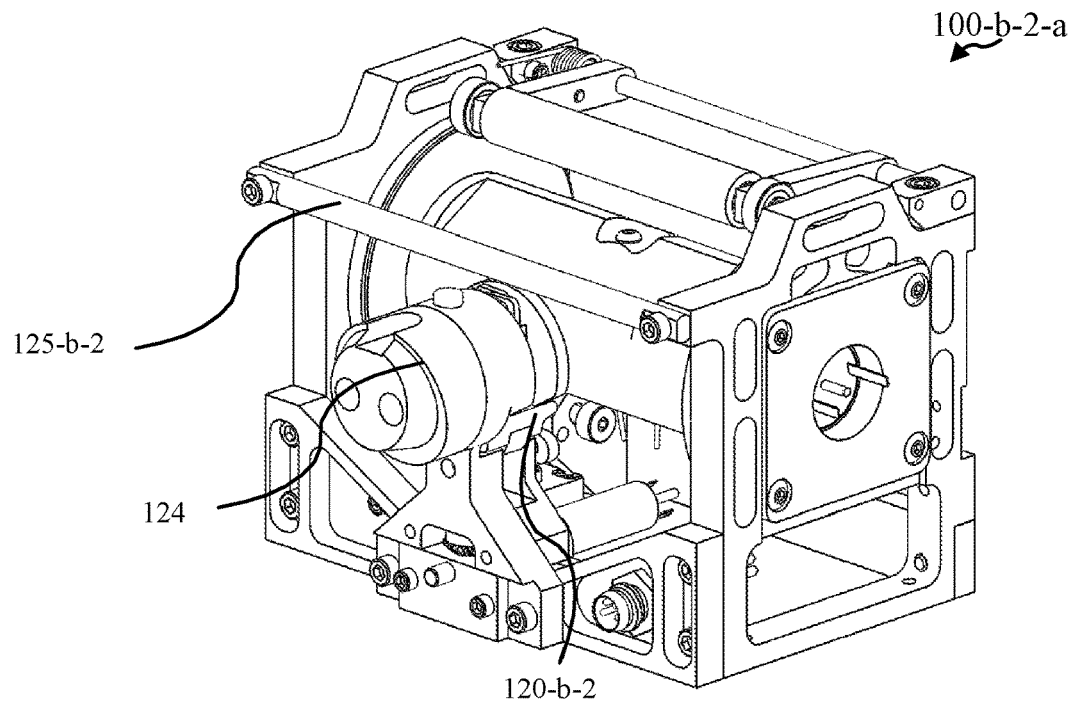

Turning now to FIG. 3L, a system 100-*b*-2 is provided in accordance with various embodiments; FIG. 3M shows a system 100-*b*-2-*a* that may reflect system 100-*b*-2 of FIG. 3L with a boom 102-*b*-2 removed to show boom spreader 120-*b*-2 and other components (such as root plug 124) in more detail. System 100-*b*-2 and/or system 100-*b*-2-*a* may be an example of aspects of system 100 of FIG. 1, system 100-*a*-3 of FIG. 2F, and/or system 100-*b* of FIG. 3A.

System 100-*b*-2 may show a boom 101-*b*-2 in a deployed state. The furlable boom 101-*b*-2 is shown as a slit-tube boom. A root end of the boom 101-*b*-2 may fit around a root plug 124 that may be coupled with boom spreader 120-*b*-2. The deployed boom 101-*b*-2 may be coupled with boom spool 102-*b*-2; the boom spool 102-*b*-2 may be driven by drive motor 103-*b*-2. Drive motor 103-*b*-2 may be utilized for deployment of boom 101-*b*-2 and/or stowage of boom 101-*b*-2.

System 100-*b*-2 may also show compliant component 110-*b*-2; system 100-*b*-2 may include additional compliant component(s) that may be obscured from view. System 100-*b*-2 may also show a single consolidation roller 170-*b*-2; the single consolidation roller 170-*b*-2 may be positioned at a Boom to Spool (BTS) point where the boom 101-*b*-2 may become flat as it begins to roll onto the boom spool 102-*b*-2.

Root plug 124 may include one or more protrusions 122-*b*-2 that may engage one or more apertures 123-*b*-2 of the furlable boom 101-*b*-2 in the deployed state of the furlable boom 101-*b*-2. The protrusion 122-*b*-2 may act as a locating pin to help facilitate precise locking of the boom around the root plug 124 and boom spreader 120-b-2.

The boom spreader 102-b-2 may include a spreader arm mechanism that includes one or more spreader arms that spread out from a stowed state to spread a portion of the furlable boom 101-b-2 onto the boom spool 102-b-1 through contacting an inner surface of the furlable boom 101-b-2. Some embodiments include one or more paddles coupled with the one or more spreader arms. In some embodiments, at least one or more spreader arms or one or more paddles push the furlable boom 101-b-2 away from a root plug coupled with the spread arm mechanism. These components are called out in more detail with respect to subsequent figures.

Some embodiments of system 100-b-2 include a guide rod 125-b-2 positioned such that the furlable boom 101-b-2 may be pushed against the guide rod 125 as the one or more spreader arms spreads the portion of the furlable boom 101-b-2. In some embodiments, one or more spreader arms retract to a stowed state after spreading the portion of the furlable boom 101-b-2 onto the boom spool 102-b-2. In the stowed state, the booms spreader 120-b-2 may match the shape of the deployed boom 101-b-2.

Figure 3N:
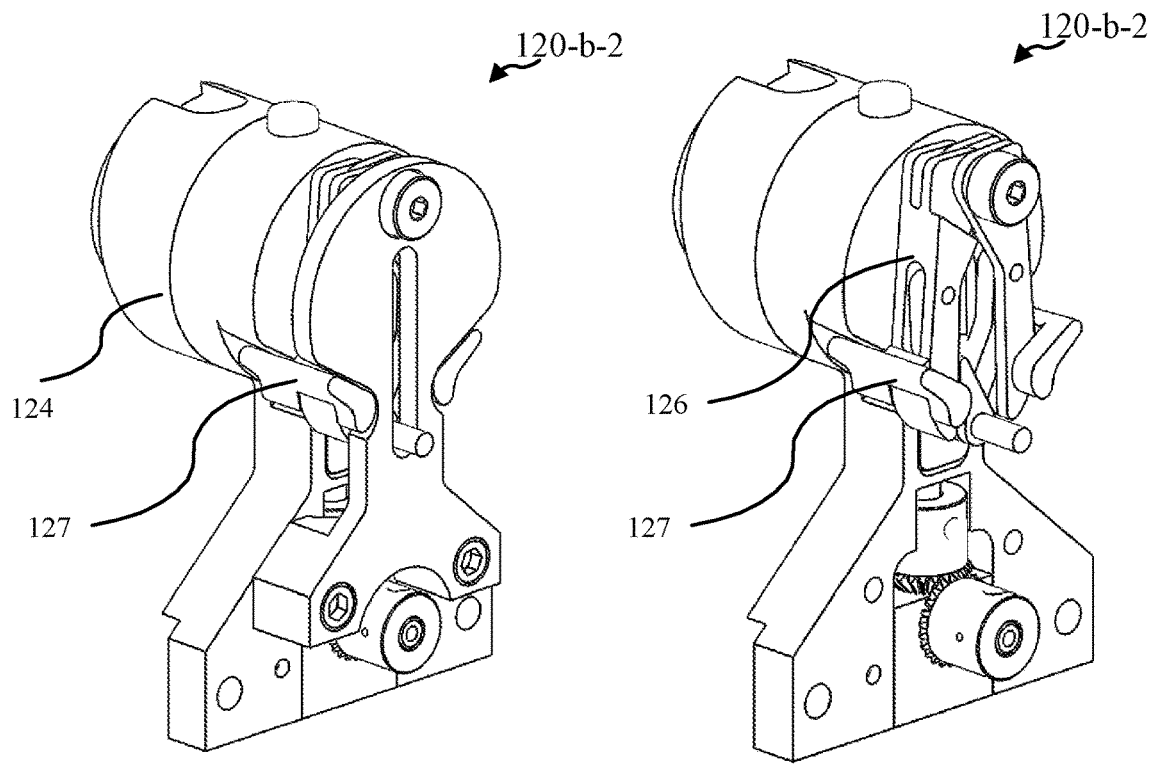
Figure 3O:
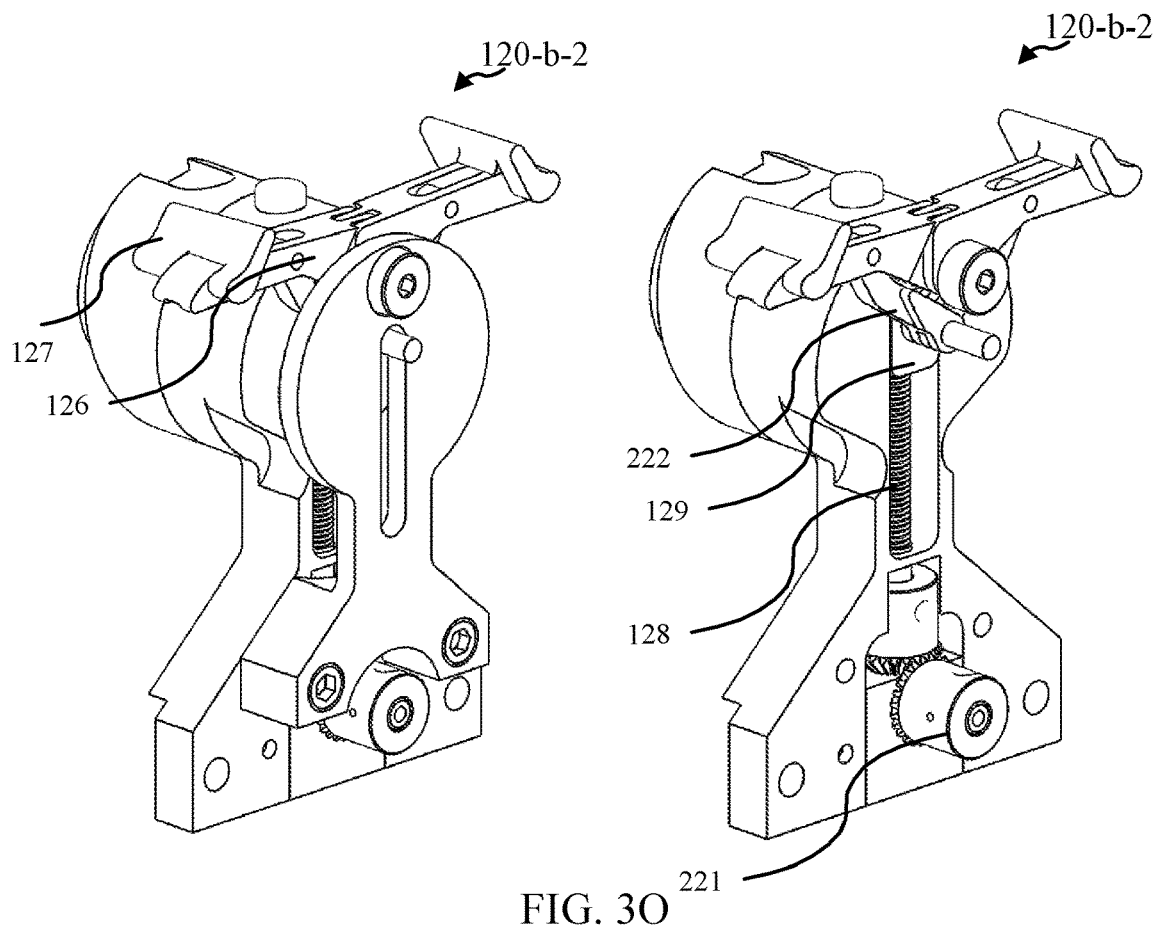

FIG. 3N and FIG. 3O provide examples of the boom spreader 120-b-2 in stowed state (FIG. 3N) and a deployed or spread state (FIG. 3O). A portion of the boom spreader 120-b-2 has been removed from the right-sided images to show some components in more detail.

The boom spreader 120-b-2 may configured as a spreader arm mechanism that includes one or more spreader arms 126 that spread out from a stowed state to spread a portion of a furlable boom onto a boom spool through contacting an inner surface of the furlable boom. Some embodiments include one or more paddles 127 coupled with the one or more spreader arms 126. In some embodiments, at least one or more spreader arms 126 or one or more paddles 127 push the furlable boom away from a root plug 124 coupled with the spread arm mechanism. In some embodiments, the root plug 124 may remain rigid. The boom spreader 120-b-2 may be configured to be reversible.

The boom spreader 120-b-2 may be motor-driven. A threaded shaft 128 may provide for high force linear travel coupled with a drive nut 129. Bevel gear(s) and input shaft 221 may be provided to facilitate motor position. One or more linkages 122 may also be provided, which may allow for full arm travel from a stowed state to a spread state and may increase force to meet increasing resistance from a boom.

The use of a spreader arm mechanism utilizing spreader arms 126 with or without paddles 127 may facilitate non-twisting and may keep the boom centered when it is spooled back onto a boom spool.

Figure 3P:
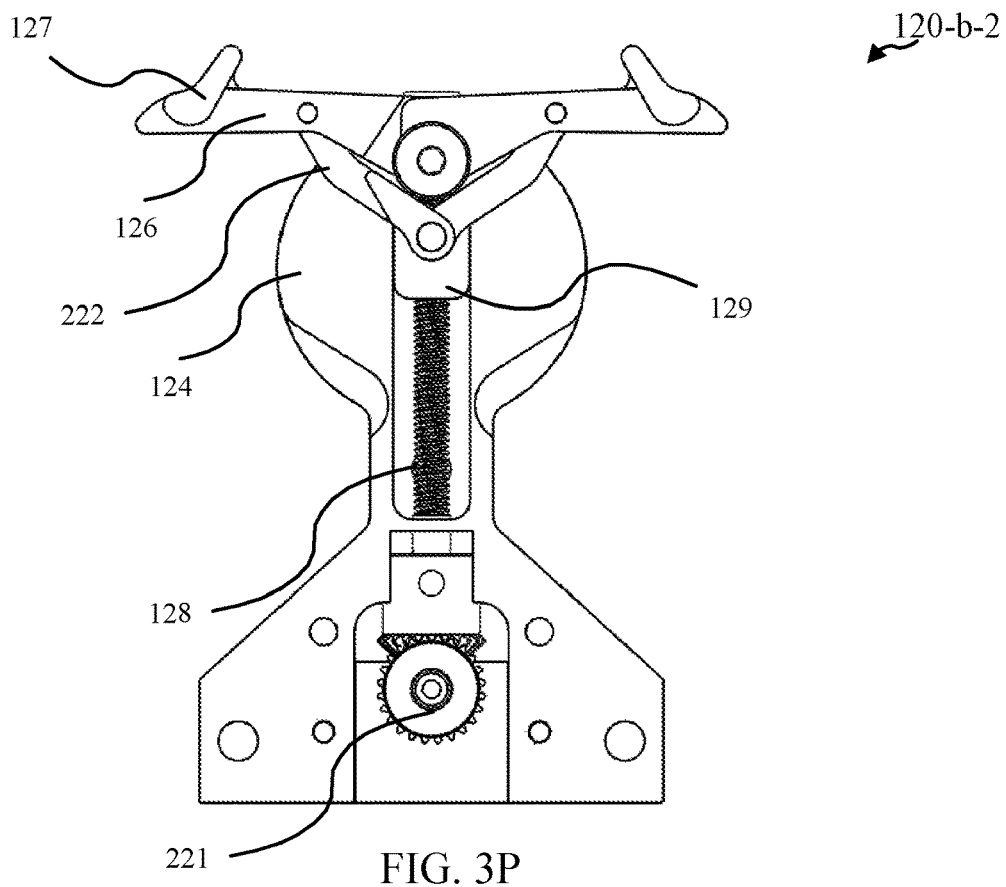
Figure 3Q:
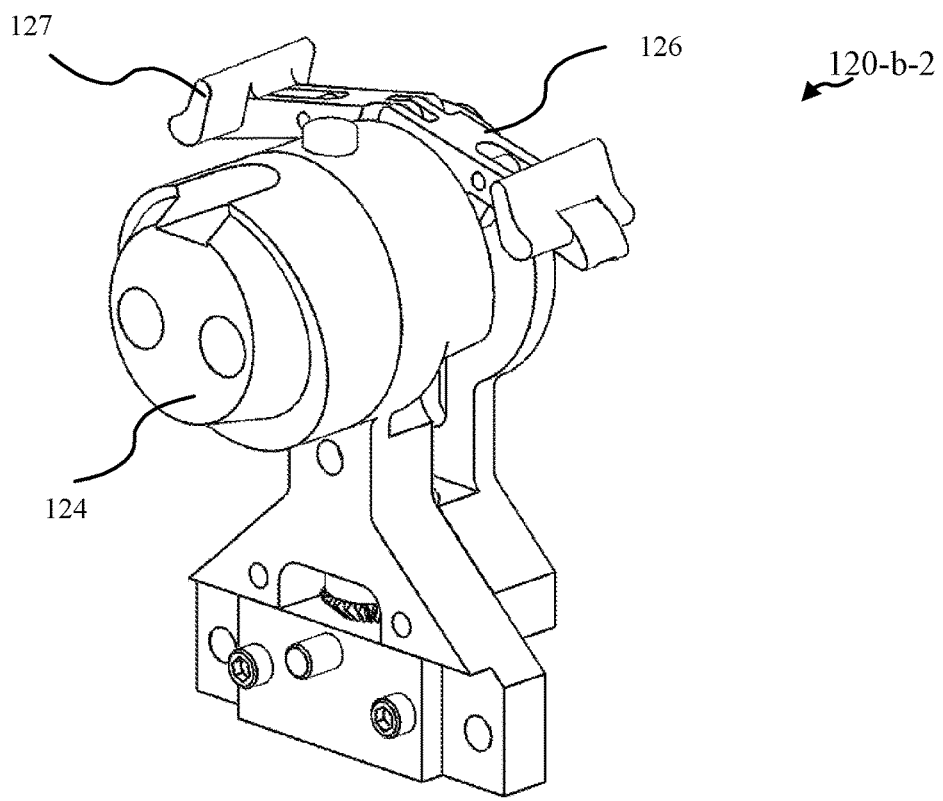

FIG. 3P and FIG. 3Q provide additional perspectives on boom spreader 120-b-2 in a spread state. One may note that the shape of the spreader arms 126 may facilitate damage free spreading. The arm length may be short enough that it does not contact an edge of the boom. The use of contoured paddles 127 may help facilitate distributing the load to the inside of the boom.

Figure 3R:
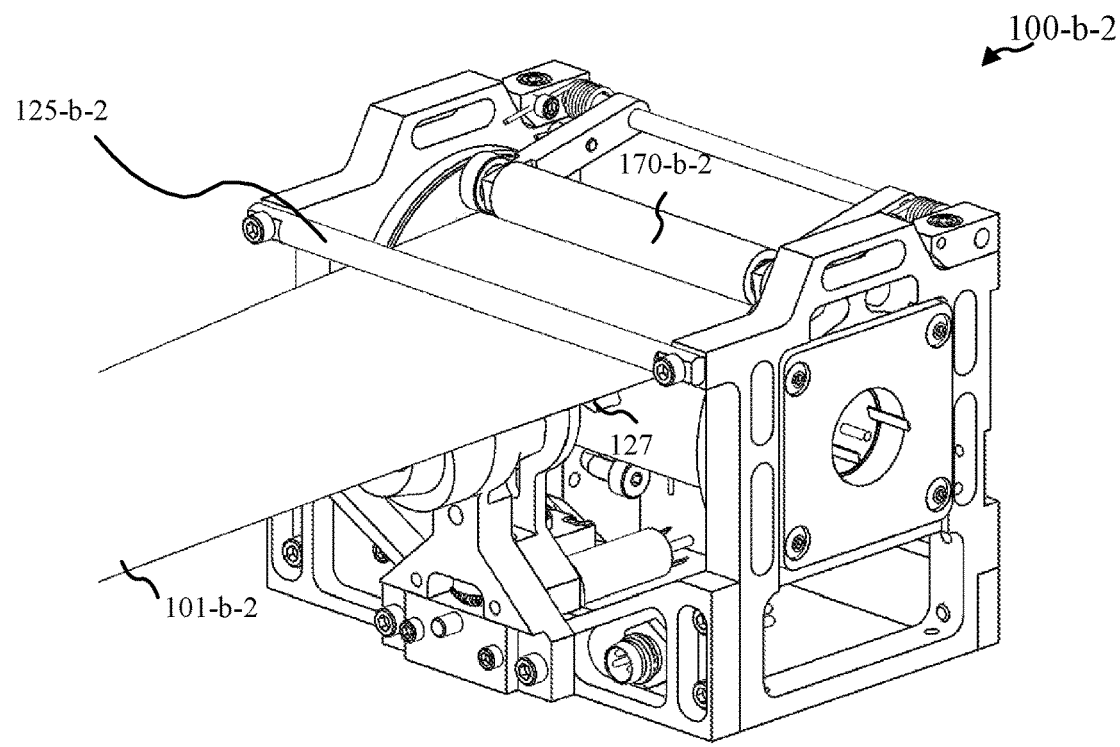
Figure 3S:
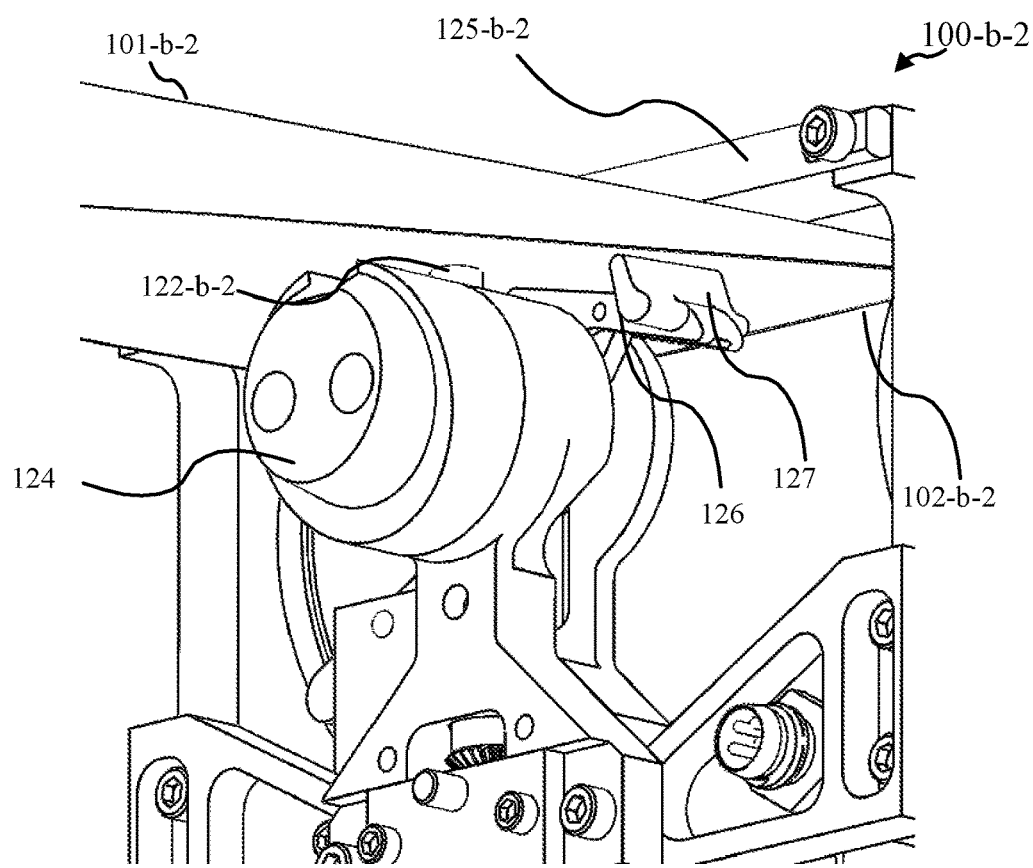

FIG. 3R and FIG. 3S show aspects of boom spreader 120-b-2 in operation within system 100-b-2. As the spreader arms 126 move upward, the arms 126 and/or paddles 127 may contact the inside of boom 101-b-2 and push it up and outward. The upward force may eventually push the boom 101-b-2 off the locking pin 122-b-2 and up against guide rod 125-b-2. The spreader arms 126 may continue until the boom 101-b-2 is spread sufficiently to spool by itself when the boom spool 102-b-2 is rotated. After the boom 101-b-2 is spooled sufficiently (e.g., at least one revolution), the spreader arms 126 may be retracted. FIG. 3R may also show the single consolidation roller 170-b-2; the single consolidation roller 170-b-2 may be positioned at a Boom to Spool (BTS) point where the boom 101-b-2 may become flat as it begins to roll onto the boom spool 102-b-2.

Figure 4A:
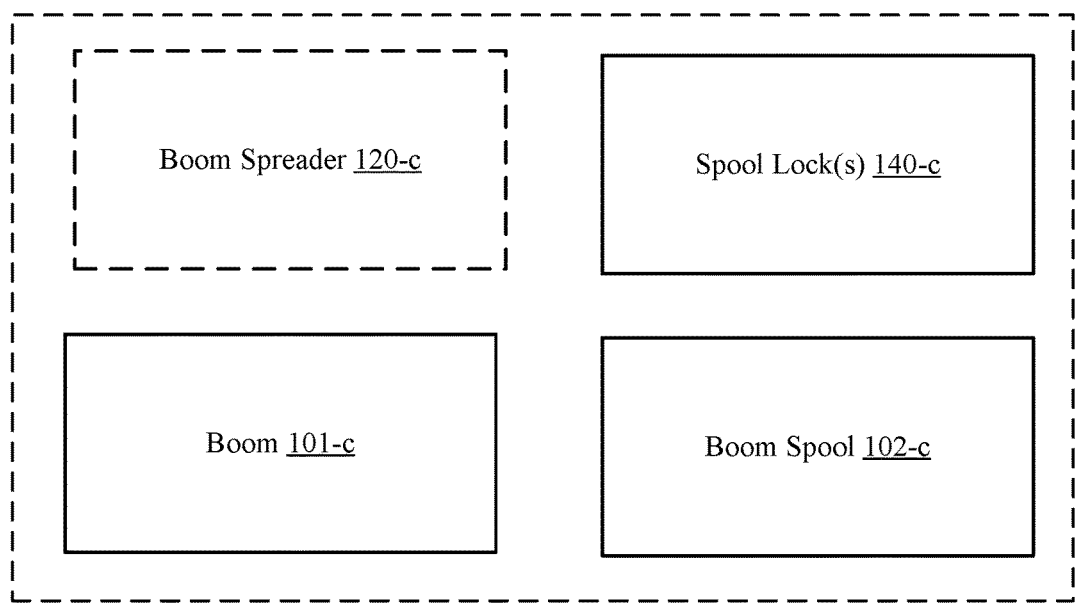
FIG. 4A, FIG. 4B, FIG. 4C, FIG. 4D, FIG. 4E, FIG. 4F, FIG. 4G, FIG. 4H, and FIG. 4I show systems and/or devices in accordance with various embodiments.
Figure 4C:
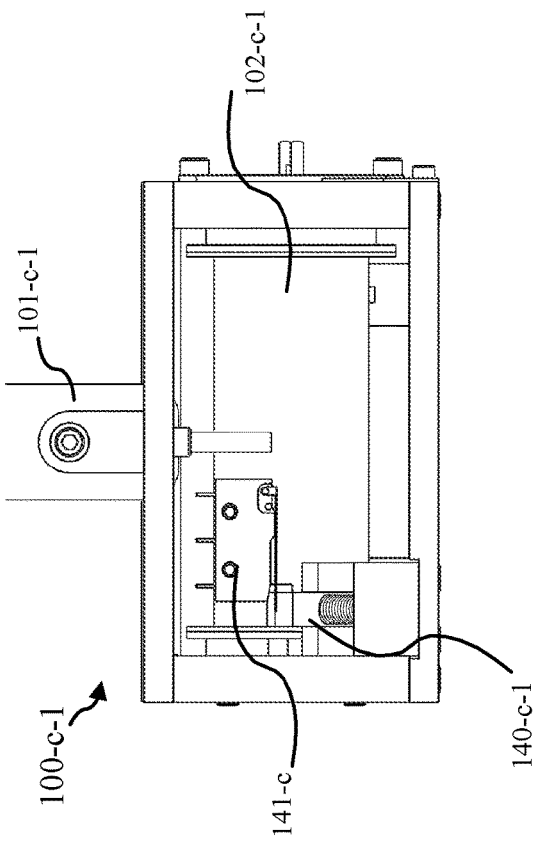
Figure 4E:
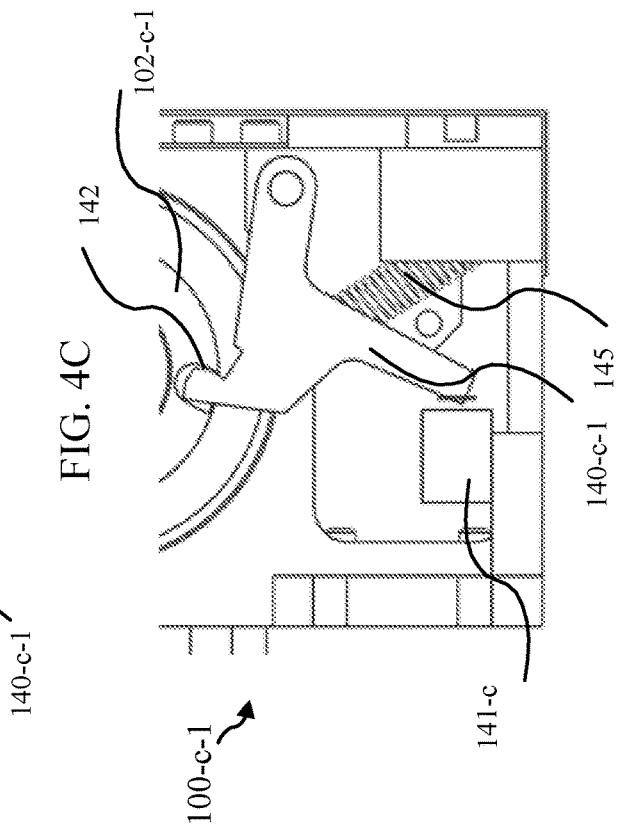
Figure 4B:
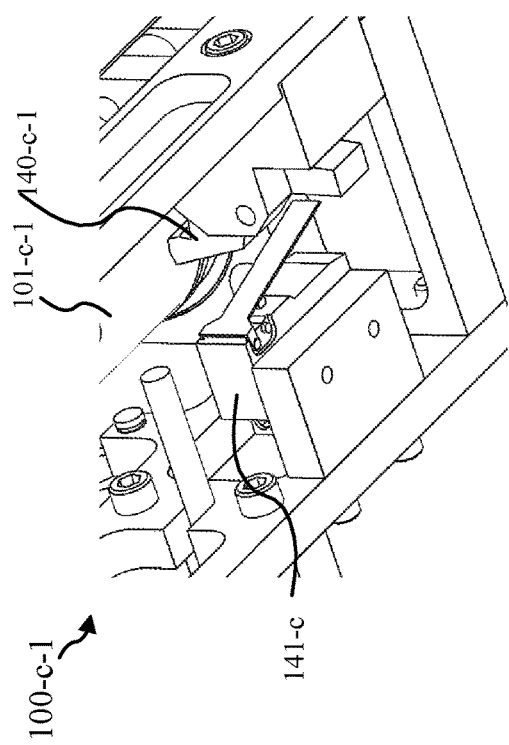
Figure 4D:
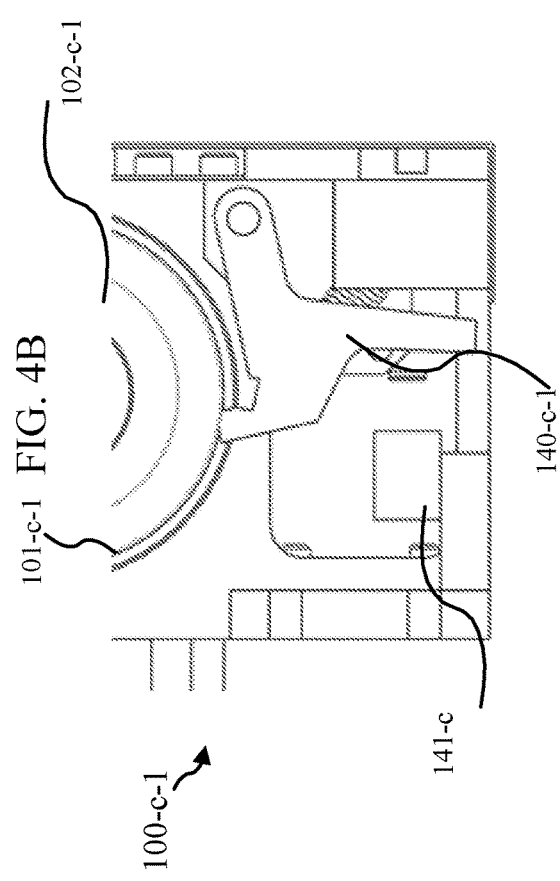

Turning now to FIG. 4A, a system 100-c is provided in accordance with various embodiments. System 100-c may be an example of aspects of system 100 of FIG. 1. System 100-c may include a boom spool 102-c and a boom 101-c, such as a furlable boom, coupled with the boom spool 102-c. System 100-c may also include spool lock 140-c that may contact a surface of the furlable boom 101-c between a stowed state of the furlable boom 101-c and a deployed state of the furlable boom 101-c and that engages a feature of the boom spool 102-c in the deployed state of the furlable boom 101-c. In some embodiments, the spool lock 140-c stops the boom spool 102-c from further rotation through the spool lock 140-c engaging the feature of the boom spool 102-c. Some embodiments include a boom spool motor coupled with the boom spool 140-c, where the spool lock 140-c may trigger a shut off of the boom spool motor through the spool lock 140-c engaging the feature of the boom spool 102-c. In some embodiments, the spool lock 140-c triggers an engagement of a root clamp with respect to the furlable boom 102-c through the spool lock 140-c engaging the feature of the boom spool 102-c. Some embodiments include a disengagement lever coupled with the spool lock 140-c. In some embodiments, the disengagement lever is coupled with a boom spreader 120-c such that the disengagement lever disengages the spool lock 140-c from the feature of the boom spool 102-c as the boom spreader 120-c spreads at least a portion of the furlable boom 101-c onto the boom spool 102-c.

When the boom 101-c may be on the boom spool 102-c, the spool lock 140-c may ride on a surface of the boom 101-c. When the boom 101-c is full deployed off the boom spool 102-c, the spool lock 140-c may drop into a pocket or other feature of the boom spool 102-c, which may lock the boom spool 102-c from further rotation. As a result, it may not be required to determine how many rotations may be made by the boom spool 102-c to achieve full deployment. The dropping of spool lock 140-c into the boom spool feature may trigger a variety of events as noted. For example, in some embodiments, a switch state may be changed such as to turn off a boom spool motor. In some embodiments, it may be utilized to trigger a root clamp.

The use of spool lock 140-c may be useful for motor driven deployment and/or strain energy drive deployment. In motor driven deployment, for example, the use of spool lock 140-c may be utilized to turn off a boom spool motor, which may prevent over rotation of the boom spool 102-c. In a strain energy driven deployment, the spool lock 140-c may also be utilized to prevent over rotation of the boom spool 102-c. This may help avoid damaging the boom 101-c, for example. The use of spool lock 140-c may also facilitate precision deployment of the boom 101-c. The spool lock 140-c may be configured in a variety of ways, such as a tooth or arm that may engage a feature of the boom spool 102-c, such as a pocket or slot formed in the boom spool 102-c.

FIG. 4B, FIG. 4C, FIG. 4D, and FIG. 4E show aspects of a system 100-c-1 in accordance with various embodiments. System 100-c may provide an example of aspects of system 100 of FIG. 1, system 100-b-1 of FIG. 3, system 100-b-2 of FIG. 4, and/or system 100-c of FIG. 4A. Aspects of system 100-c-1 may be described in greater detail elsewhere herein.

System 100-c-1 may show aspects of a spool lock and switch. For example, system 100-c-1 may include a spool lock 140-c-1, shown as a spool lock arm. While deploying, the spool lock arm 140-c-1 may ride on a spooled boom 101-c-1, as may be shown in FIG. 4D, for example. When deployed, the spool lock arm 140-c-1 may drop into a slot 142 on boom spool 102-c-1, which may lock the boom spool 102-c-1 in place, as may be shown in FIG. 4E. In some embodiments, a switch 141-c, such as a micro-switch, may be engaged by the spool lock arm 140-c-1 to turn off a drive motor (such as motor 103 of FIG. 3). Some embodiments may include a spring 145 that may facilitate pressing the spool lock arm 140-c-1 against the boom and/or into the slot 142.

Figure 4F:
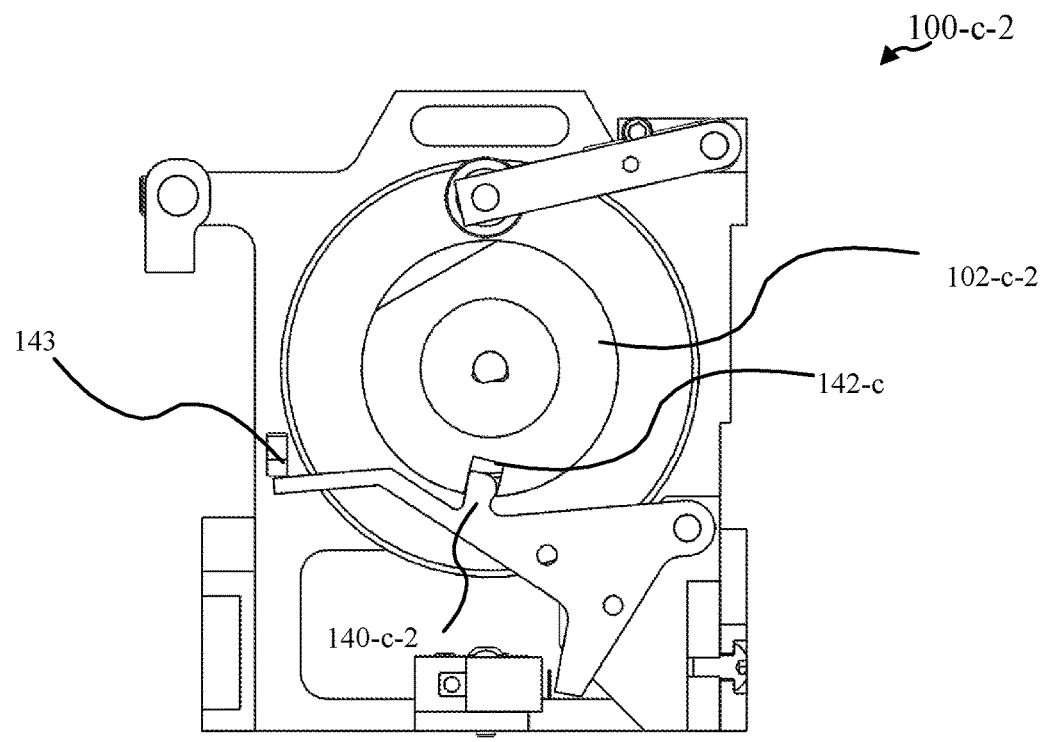
Figure 4G:
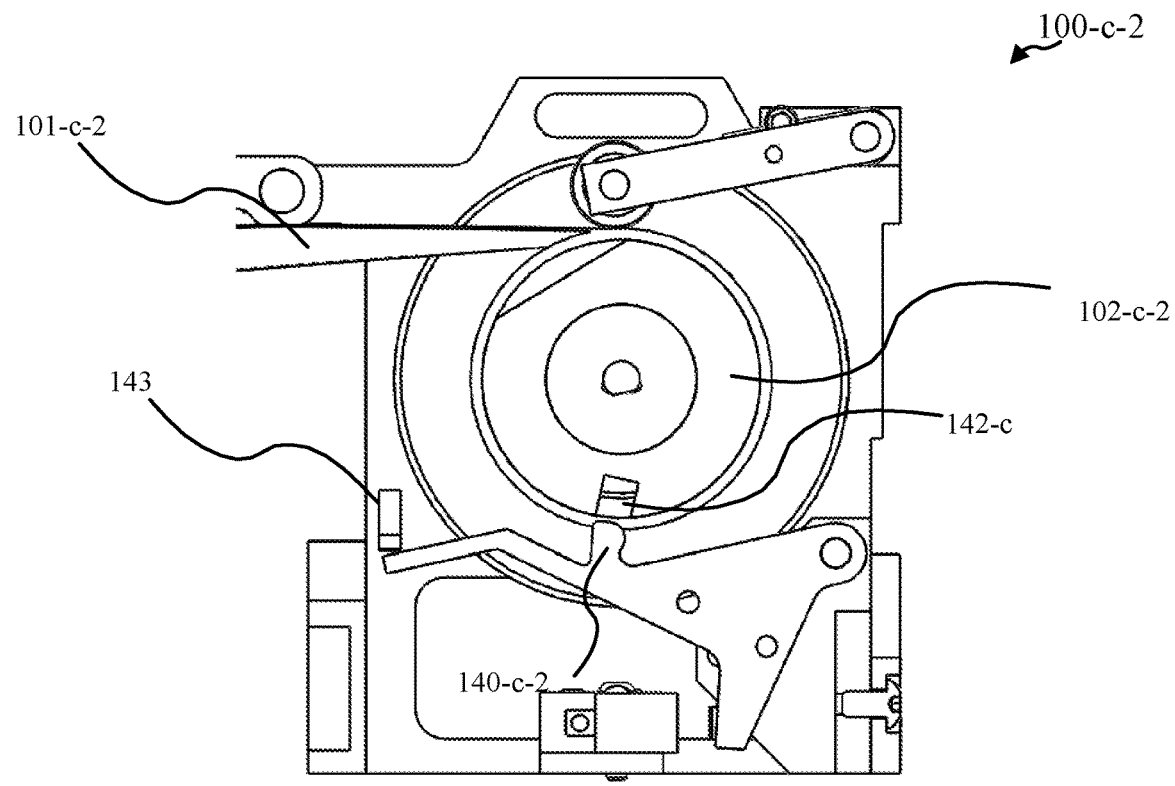

Turning now to FIG. 4F and FIG. 4G, aspects of a system 100-c-2 are provided in accordance with various embodiments. System 100-c-2 may provide an example of aspects of system 100 of FIG. 1 and/or system 100-c of FIG. 4A. System 100-c-2 may also show aspects of system 100-c-1 of FIGS. 4B-4E. System 100-c-2 may include a spool lock 140-c-2 that may be coupled with a disengagement lever 143. The disengagement lever 143 may disengage the spool lock 140-c-2 from the feature 142-c of the boom spool 102-c-2. For example, the disengagement lever 143 may disengage the spool lock 140-c-2 when a boom spreader spreads at least a portion of the furlable boom 101-c-2 onto the boom spool 102-c-2. FIG. 4F shows when the spool lock 140-c-2 has engaged the feature 142-c of the boom spool 102-c-2. FIG. 4G shows the disengagement lever 143 disengaging the spool lock 140-c-2.

Figure 4H:
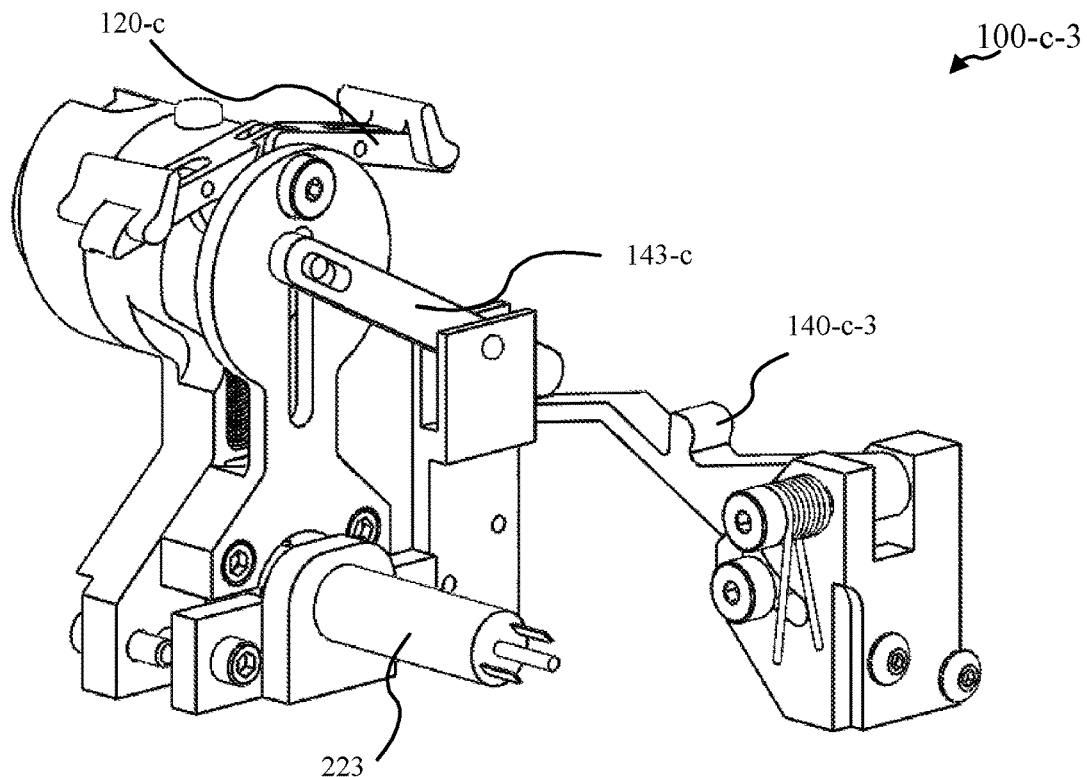
Figure 4I:
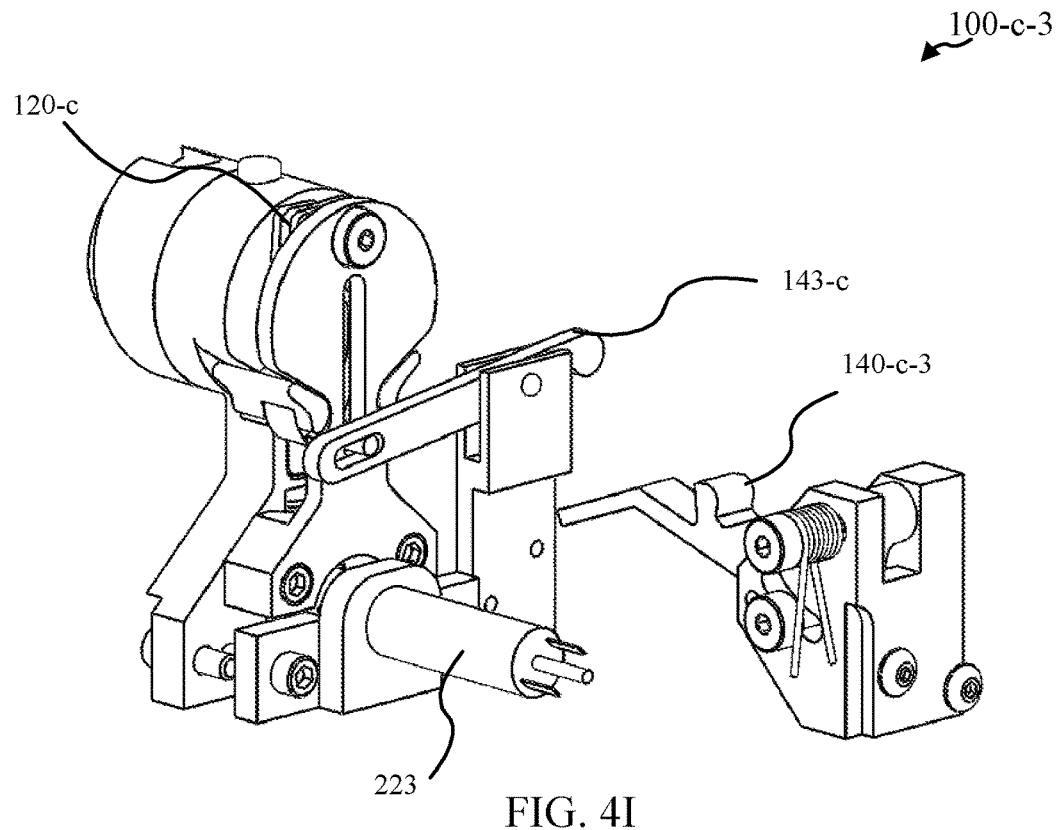

In some embodiments, the disengagement lever may be coupled with a boom spreader. FIG. 4H and FIG. 4I provide an example of one such configuration 100-c-3. This example shows a boom spreader 120-c configured as a spreader arm mechanism, though other boom spreader mechanisms may be utilized. Boom spreader 120-c may be an example of boom spreader 120-b-2 of FIG. 3, for example. The disengagement lever 143-c is shown in FIG. 4H where it has disengaged the spool lock 140-c-3. The spreader arm mechanism 120-c and spool lock 140-c-3 may be shown in a reset state in FIG. 4I.

In general, prior to re-spooling (i.e., stowage), a boom may be spread and the spool lock disengaged. A spreader motor 223 may be energized, which may move a drive lug up that spreads the boom. When fully spread, the disengagement lever 143 may have pushed the spool lock 143-c down enough to disengage the lock. The boom may begin to re-spool. The boom spreader 120-c may be reset at a certain point (such as after one revolution of the boom spool), which may free up the spool lock 140-c-3 as it now rides on a surface of the boom.

Figure 5A:
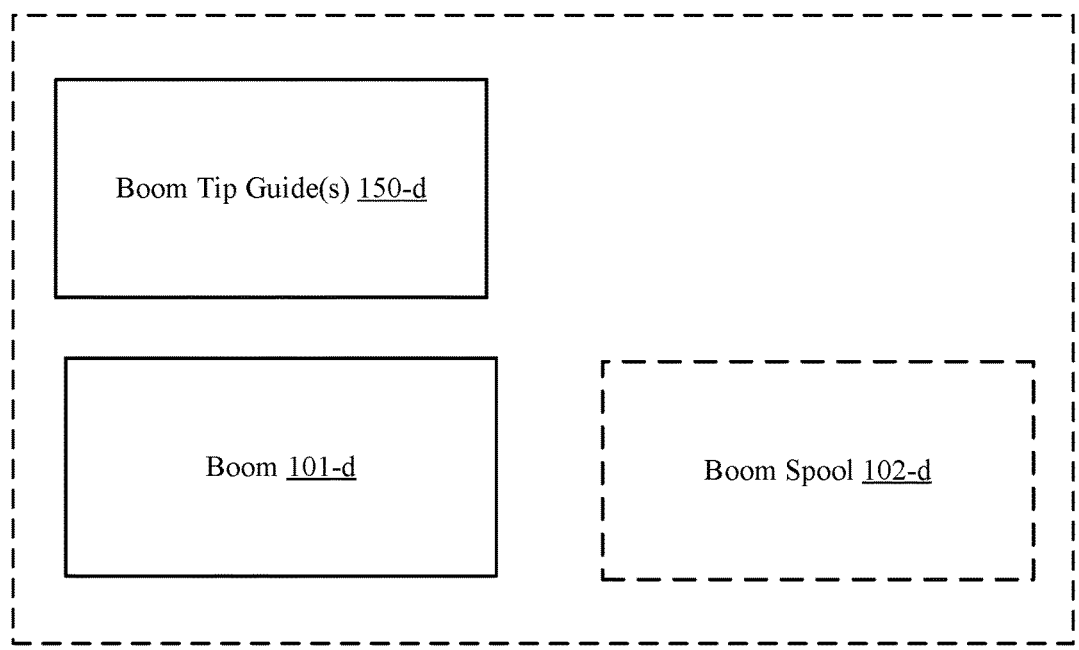
FIG. 5A, FIG. 5B, FIG. 5C, and FIG. 5D show systems and/or devices in accordance with various embodiments.

Turning to FIG. 5A, a system 100-d is provided in accordance with various embodiments. System 100-d may be an example of aspects of system 100 of FIG. 1. System 100-d may include a boom 100-d, such as a furlable boom, coupled with one or more boom tip guides 150-d. In some embodiments, system 100-d may include a boom spool 102-d.

In some embodiments, the one or more boom tip guides 150-d include a first tip guide 150-d coupled with a first portion of a section of the furlable boom 101-d and a second tip guide 150-d coupled with a second portion of the section of the furlable boom 101-d such that the first tip guide 150-d and the second tip guide 150-d engage each other in a deployed state of the furlable boom 101-d. In some embodiments, the section of the furlable boom 101-d includes an end section of the furlable boom 101-d; the end section of the furlable boom 101-d may include the section of the furlable boom 101-d distal from the boom spool 102-d. In some embodiments, the furlable boom 101-d includes a slit-tube boom. In some embodiments, the first tip guide 150-d and the second tip guide 150-d provide torsional rigidity to the furlable boom 101-d when the first tip guide 150-d and the second tip guide 150-d engage each other. In some embodiments, the first tip guide 150-d includes a first prong and the second tip guide 150-d includes a second prong and a third prong such that the first prong is guided between the second prong and the third prong to engage the first tip guide 150-d and the second tip guide 150-d with each other in the deployed state of the furlable boom 101-d. In some embodiments, the first tip guide 150-d and the second tip guide 150-d are disengaged from each other in a stowed state of the furlable boom 101-d. In some embodiments, a first slit edge of an end section of the furlable boom and a second slit edge of the end section of the furlable boom move towards each other as the slit-tube boom deploys.

The one or more boom tip guides 150-d may be coupled with a distal end of the boom 101-d, for example. The tip guides 150-d may be referred to as torsion teeth and/or prongs in some embodiments. The boom tip guides 150-d may help prevent torsion; the boom tip guides 150-d may give the boom 101-d torsional rigidity upon full deployment. The boom tip guides 150-d may help keep the boom 101-d straight as it is being deployed and/or stowed.

Figure 5B:
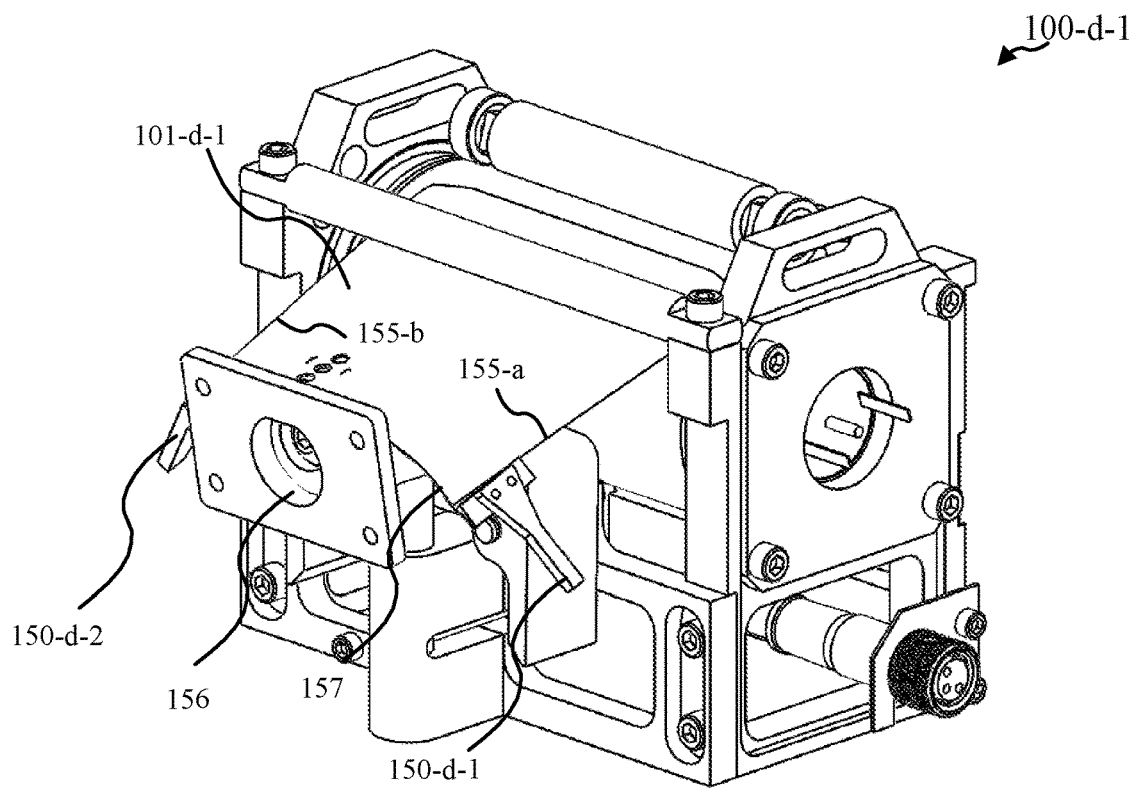
Figure 5C:
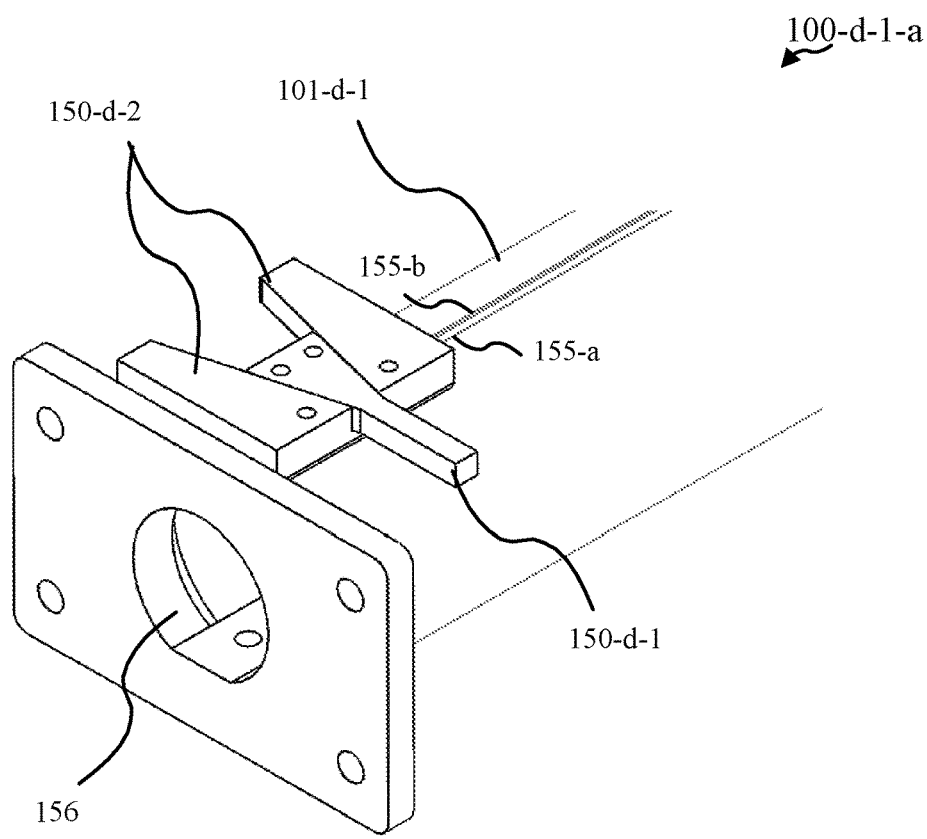
Figure 5D:
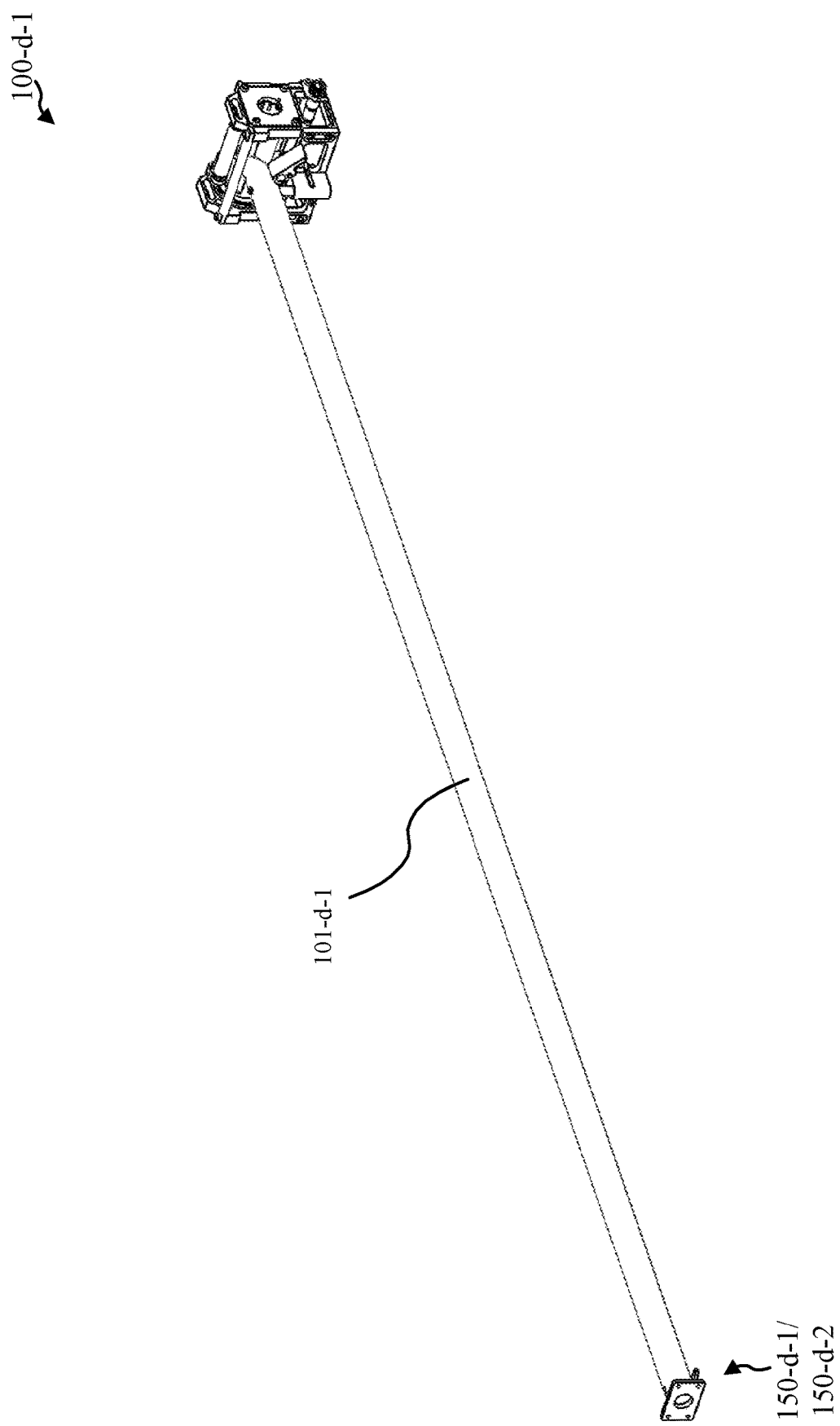

FIG. 5B show aspects of a system 100-d-1 in accordance with various embodiments. System 100-d-1 may provide an example of aspects of system 100 of FIG. 1 and/or system 100-d of FIG. 5A. System 100-d-a may be an example of system 100-a-2 of FIG. 2E. Some aspects of system 100-d-1 may be described in greater detail elsewhere herein. System 100-d-1 may show aspects of boom tip guides 150-d-1, 150-d-2, for example. FIG. 5B may show system 100-d-1 in a stowed state. When stowed, the boom tip guides 150-d-1, 150-d-2 may reside out of the way and disengaged from each other. During deployment, the boom tip guides 150-d-1, 150-d-2 may begin to mesh, which may in turn keep boom 101-d-1 from twisting. When deployed, as may be shown in FIG. 5C as system portion 100-d-1-a highlighting the end section of boom 101-d-1, the boom tip guides 150-d-1, 150-d-2 may become fully meshed, which may provide an anti-torsion lock for the boom 101-d-1. As shown, first tip guide 150-d-1 may include a first prong and the second tip guide 150-d-2 may include a second prong and a third prong such that the first prong is guided between the second prong and the third prong to engage the first tip guide 150-d-1 and the second tip guide 150-d-2 with each other in the deployed state of the furlable boom 101-d-1. A first slit edge 155-a of an end section of the slit-tube boom 101-d-1 and a second slit edge 155-b of the end section of the slit-tube boom 101-d-1 move towards each other as the slit-tube boom 101-d-1 deploys. FIG. 5D may show system 100-d-1 in a deployed state with the boom 100-d-1 full extended and the boom tip guides 150-d-1 and 150-d-2 engaged with each other.

System 100-d-1 and/or system 100-d-1-a may also include an end fitting 156 that may include an interface plate. The interface plate, which may be referred to as a spacecraft interface in some embodiments, may be placed coincident with the inner wall of a bus, such as a spacecraft bus. The interface plate of the end fitting 156 may provide an attachment feature for instruments or other components.

One or more portions of the end fitting 156 and/or tip guides 150-d-1, 150-d-2 may constrain one or more end portions of the furlable boom 101-d-1 (such as the distal end 157 of the boom 101-*d*-1). End fitting 156 and/or tip guides 150-*d*-1, 150-*d*2 may help prevent relative shear between different aspects of the end of the boom 101-*d*-1, such as two free edges 155-*a*, 155-*b* or end segment of the boom 101-*d*-1. Ending fitting 156 and/or tip guides 150-*d*-1, 150-*d*-2 may help to bring the end section of the boom 101-*d*-1 to a known position with repeatability.

The use of the end fitting 156 and/or the tip guides 150-*d*-1, 150-*d*-2 may allow for flattening of the cross section of boom 101-*d*-1 in the stowed state (as may be seen in FIG. 5B) but also provide rigid and stable boundary conditions in the deployed state (as may be seen in FIG. 5C) that may be involved for the utilization of a slit-tube or other furlable boom as a precision deployable structure. In some embodiments, for example, the slit tube boom's interfaces and supports may begin at the distal end of the boom. The end fitting 156 and/or tip guides 150-*d*-1, 150-*d*-2 in accordance with various embodiments may allow the furlable boom cross-section to open and deform, which may enable compact furling but may also take advantage of the boom end-motion during deployment to guide the furlable boom 101-*d*-1 into an end boundary condition during deployment. The boundary condition provided within the end fitting 106 and/or tip guides 150-*d*-1, 150-*d*-2 may prevent warping and deformation of the slit-tube boom cross section, which may be involved for the slit-tube booms, or other furlable booms, to be used in various embodiments.

Figure 6A:
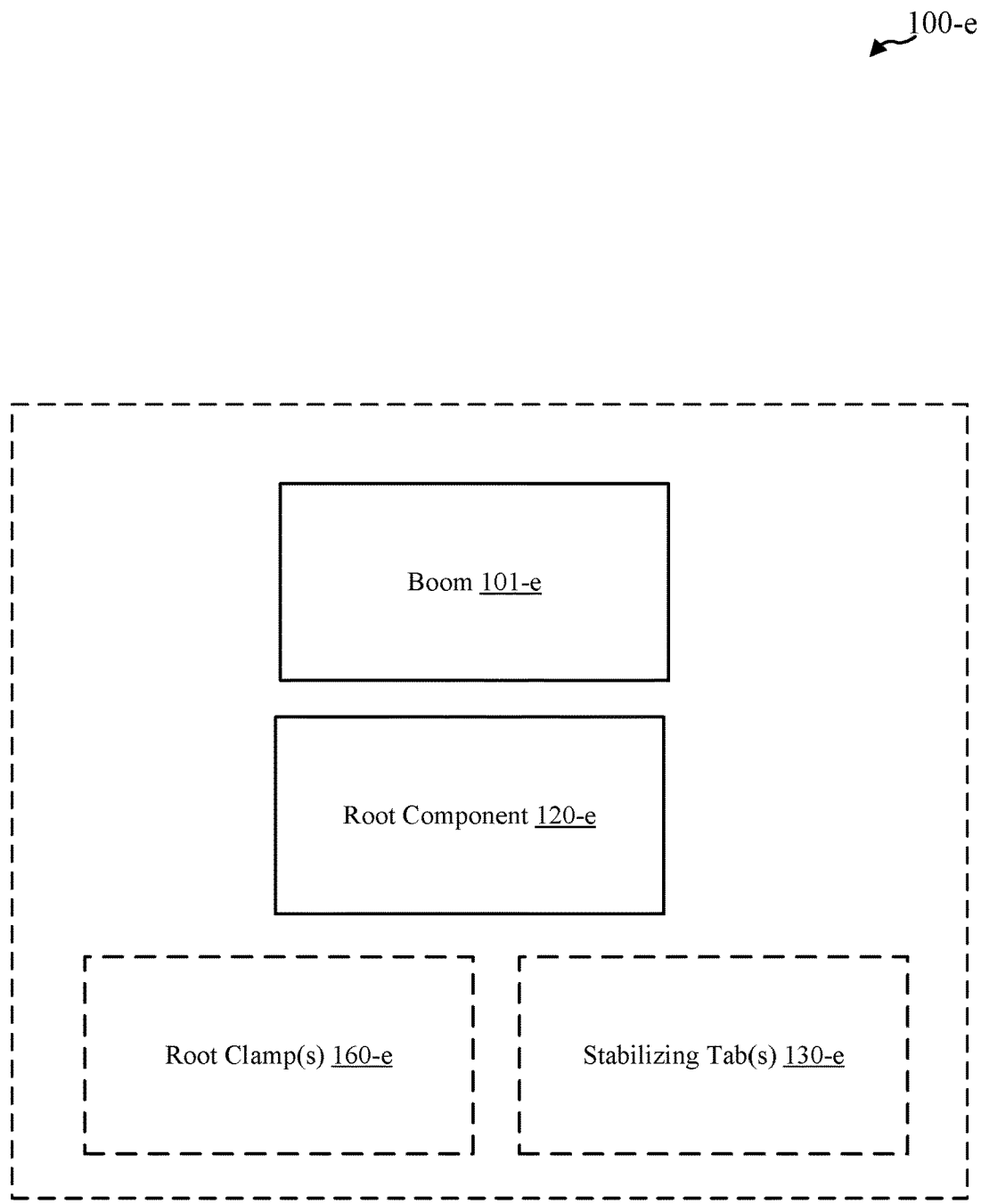
FIG. 6A, FIG. 6B, FIG. 6C, FIG. 6D, FIG. 6E, FIG. 6F, FIG. 6G, FIG. 6H, FIG. 6I, FIG. 6J, and FIG. 6K show systems and/or devices in accordance with various embodiments.

Turning to FIG. 6A, a system 100-*e* is provided in accordance with various embodiments. System 100-*e* may be an example of aspects of system 100 of FIG. 1. System 101-*e* may include a boom 101-*e*, such as a furlable boom, and one or more root components 120-*e*. The root component 120-*e* may include a root plug, for example.

Some embodiments of system 100-*e* include one or more root clamps 160-*e* that clamp at least a portion of the furlable boom 101-*e* against the root component 120-*e*. The root clamp(s) 160-*e* may improve root stiffness or rigidity of the boom 101-*e*. In some embodiments, the root component 120-*e* includes a rotating root plug or a static root plug. In some embodiments, the root component 120-*e* includes a spreader arm mechanism. In some embodiments, the one or more root clamps 160-*e* include one or more locking arms. In some embodiments, the one or more root clamps 160-*e* include one or more spring plungers. In some embodiments, the one or more root clamps 160-*e* include one or more mechanical linkages. In some embodiments, the one or more root clamps 160-*e* include one or more bands coupled with the boom 101-*e*, such as one or more steel spring bands. In some embodiments, the one or more root clamps 160-*e* include a narrowed diameter portion of the boom 101-*e*, which may provide for a clamping action when coupled around the root component 120-*e*. In some embodiments, one or more root clamps 160-*e* contact an outer surface of the furlable boom 101-*e* and the root component 120-*e* contacts an inner surface of the furlable boom 101-*e*. In some embodiments, the furlable boom 101-*e* includes a slit-tube boom.

Some embodiments of system 100-*e* include one of more stabilizing tabs 130-*e* coupled within an inner surface of the furlable boom 101-*e*; the one or more stabilizing tabs 103-*e* may engage one or more features of the root component 120-*e* in a deployed state of the furlable boom 101-*e*. In some embodiments, the root component 120-*e* includes the one or more features that engage the one or more stabilizing tabs 130-*e*. In some embodiments, the root component 120-*e* includes one or more guiding features that guide the one or more stabilizing tabs 130-*e* into the one or more features of the root component 120-*e*. The stabilizing tab(s) 130-*e* may prevent torsion of the root end of the boom 101-*e* after deployment. In some embodiments, the one or more stabilizing tabs 130-*e* may be referred to as internal shear locking tabs. The one or more stabilizing tabs 130-*e* may be configured for directional dependence. In some embodiments, the stabilizing tab(s) 130 may lock the boom 101-*e* in shear, increase torsional rigidity, and/or increase boom deployment precision. In some embodiments, the one or more root clamps 160-*e* may clamp around a portion of the boom 101-*e* that corresponds to the location of the one or more stabilizing tabs 103-*e*.

Figure 6B:
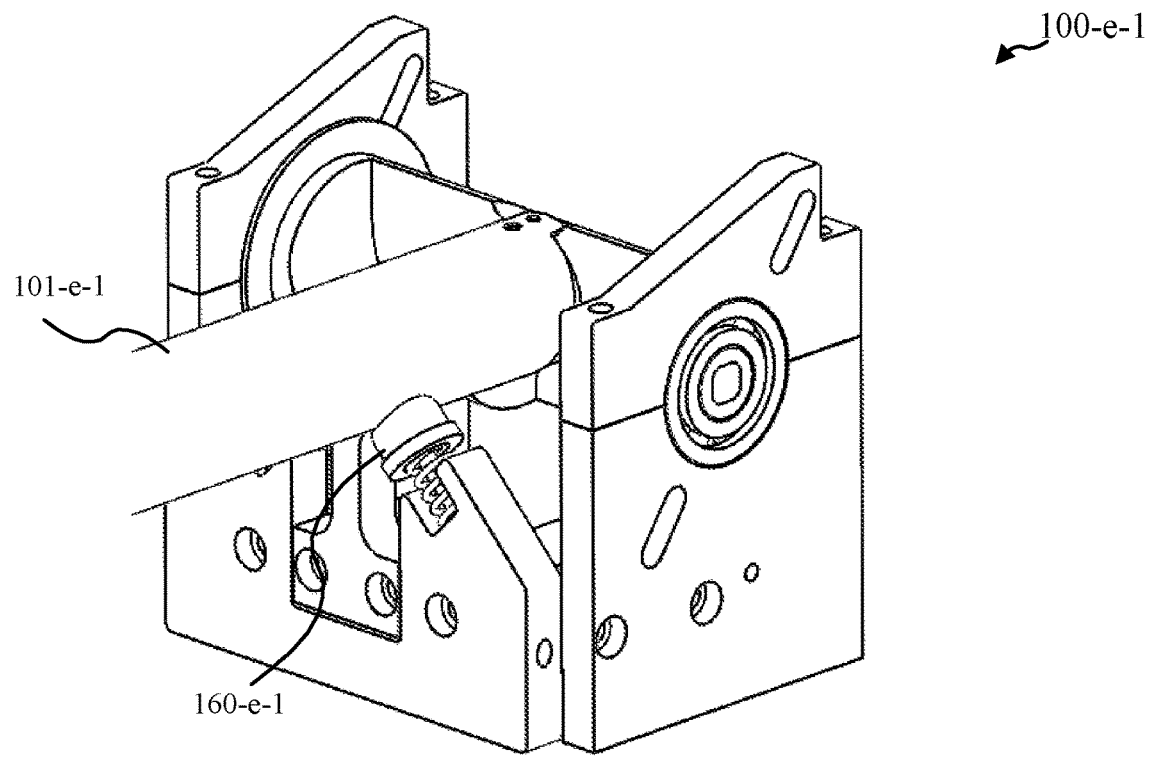
Figure 6C:
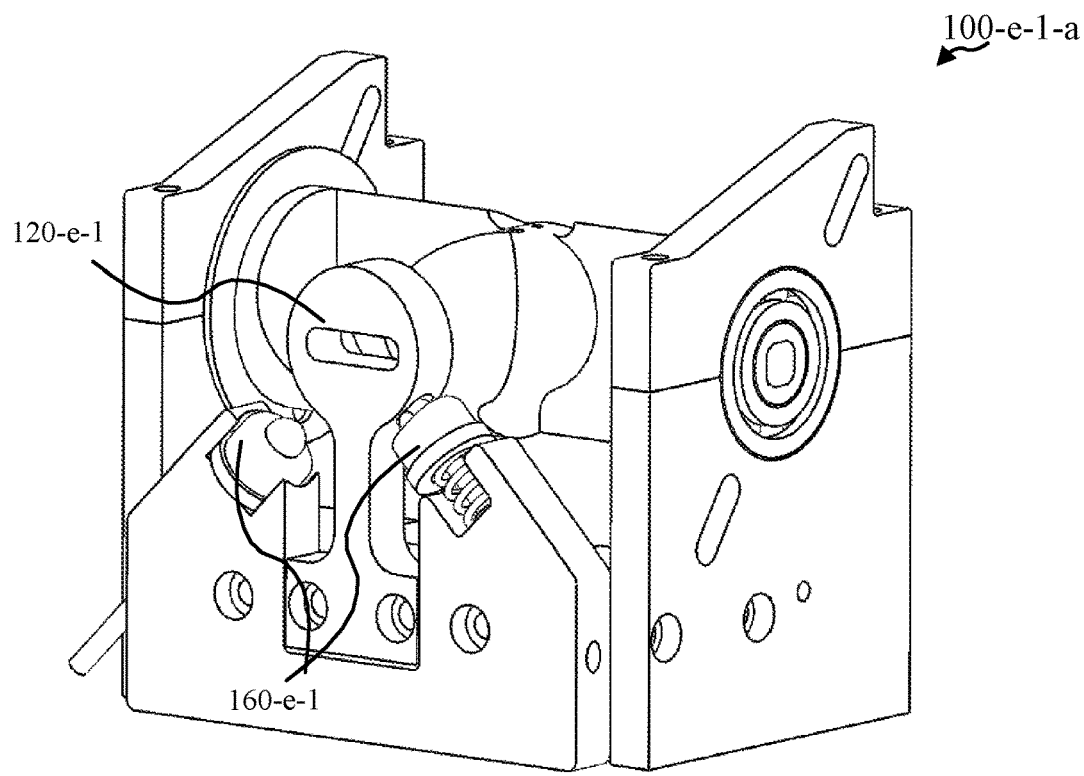

FIG. 6B and FIG. 6C show examples of systems 100-*e*-1 and 100-*e*-1-*a* in accordance of various embodiments that may be examples of system 100-*e* of FIG. 6A and/or aspects of system 100 of FIG. 1; FIG. 6B shows a configuration 100-*e*-1-*a* with a boom removed from system 100-*e*-1 to facilitate seeing other components, such as root plug 120-*e*-1. The root clamp 160-*e*-1 may clamp the boom 101-*e*-1 against a root plug 120-*e*-1. The root clamp 160-*e*-1 may be configured as a spring-plunger type root clamping mechanism. The root clamp 160-*e*-1 may engage after boom deployment. As may be seen in FIG. 6C, two separate spring plunger type root clamps 160-*e*-1 may clamp on opposite sides with respect to a root plug 120-*e*-1; this may improve root stiffness of boom 101-*e*-1 for example. In some embodiments, a spool lock may trigger the root clamp 160-*e*-1 to clamp against the boom 101-*e*-1.

Figure 6D:
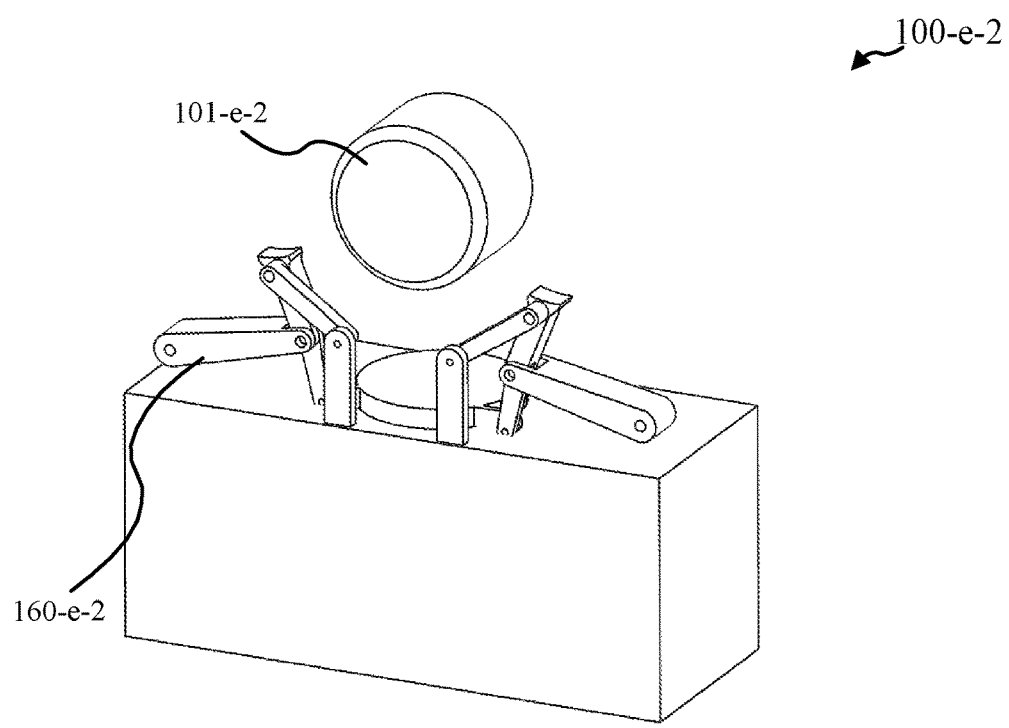
Figure 6E:
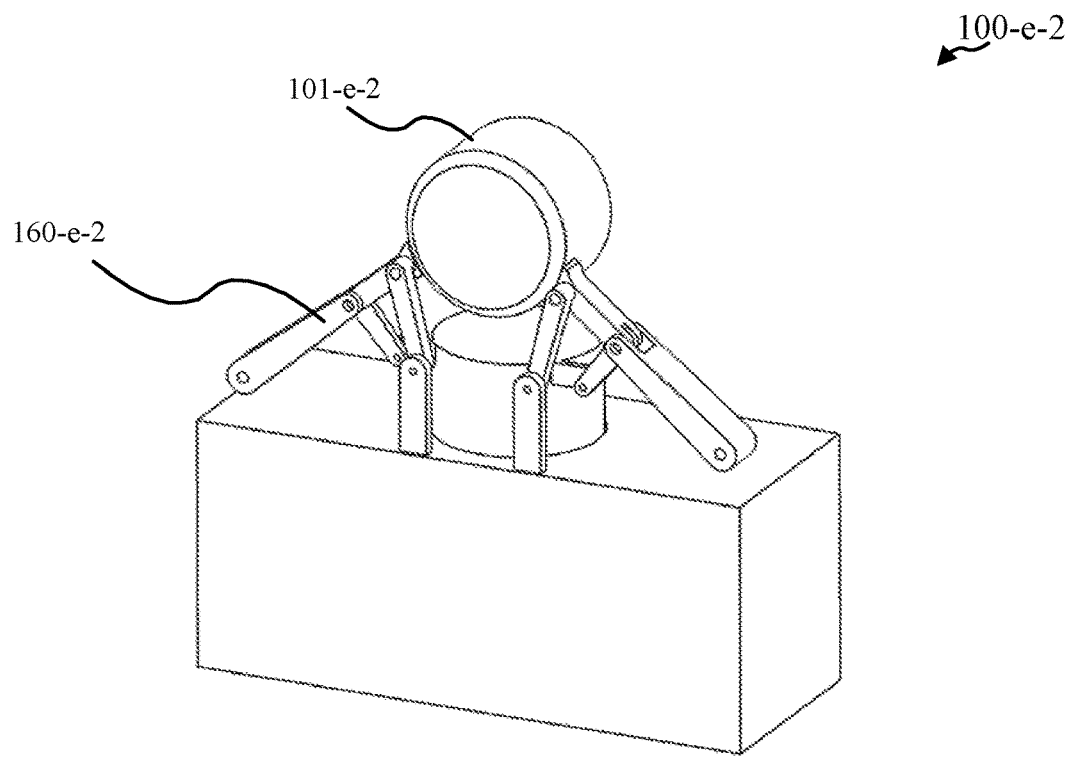

FIG. 6D and FIG. 6E show examples of a system 100-*e*-2 with root clamps 160-*e*-2 configured as one or more mechanical linkages that may increase the clamping force using mechanical advantage. FIG. 6D shows the mechanical linkage 160-*e*-2 retracted during deployment of boom 101-*e*-2. FIG. 6E shows the mechanical linkage 160-*e*-2 extended upon full deployment of the boom 101-*e*-2 to brace the boom 100-*e*-2 against a root plug, for example. System 100-*e*-2 may be an example of aspects of system 100 of FIG. 1 and/or system 100-*e* of FIG. 6A.

Figure 6F:
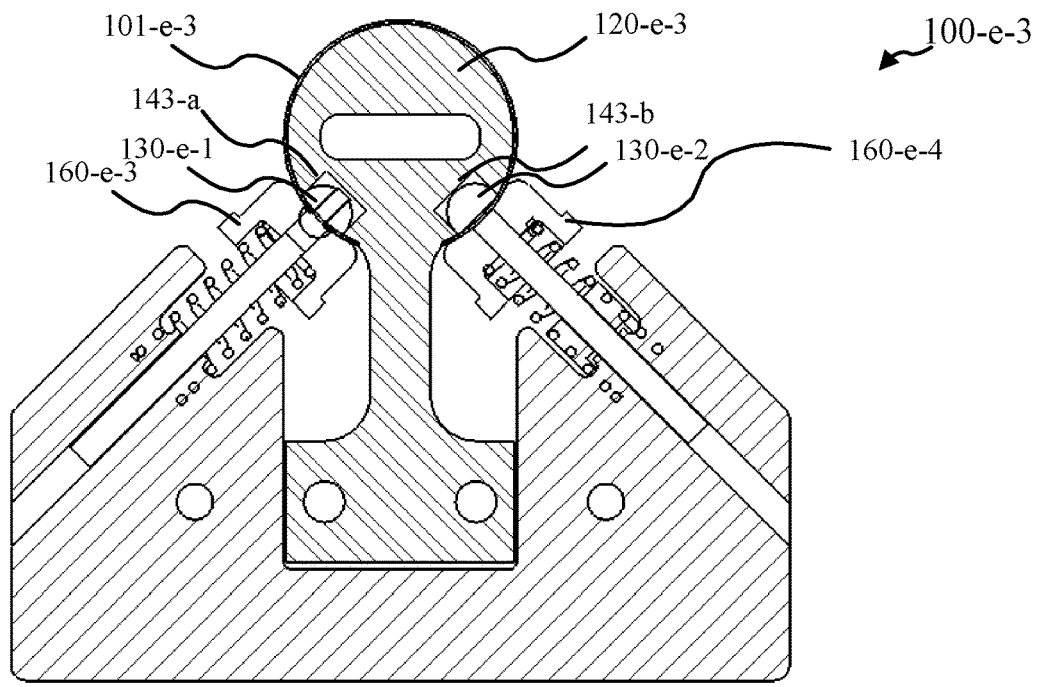
Figure 6G:
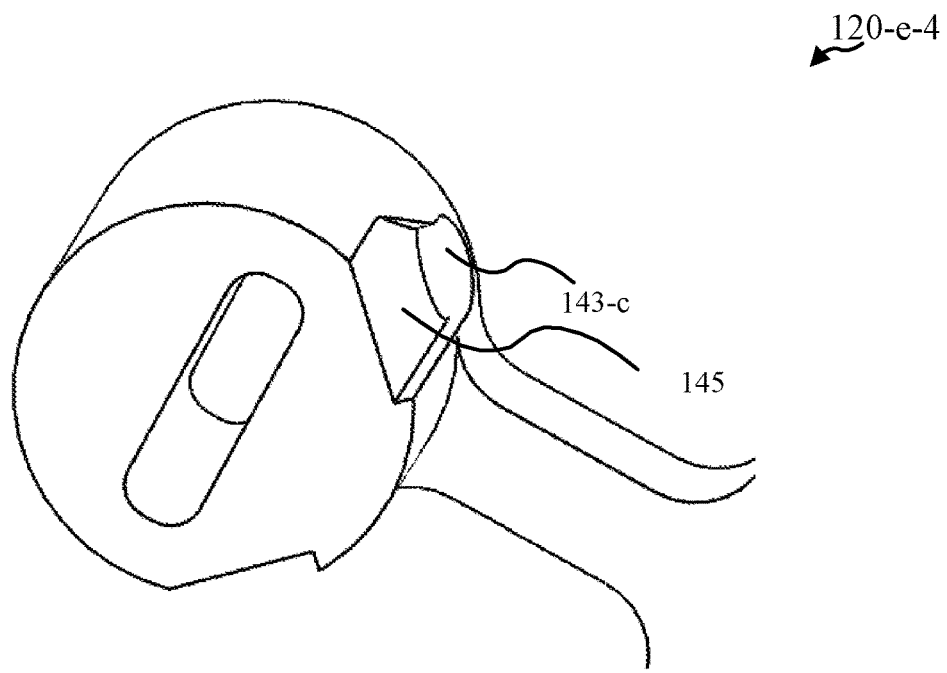

FIG. 6F shows an example of a system 100-*e*-3 that may include one or more stabilizing tabs 130-*e*-1, 130-*e*-2. System 100-*e*-3 may be an example of aspects of system 100 of FIG. 1, system 100-*e* of FIG. 6A, system 100-*e*-1 of FIG. 6B, and/or system 100-*e*-1-*a* of FIG. 6C. Stabilizing tabs 130-*e*-1, 130-*e*-2 may be may bonded to an inside surface of a boom 101-*e*-3. The stabilizing tab(s) 130-*e*-1, 130-*e*-2 may fit within features, such as pockets 143-*a*, 143-*b*, of a root plug 120-*e*-3, which may be configured as a rotating root plug or a static plug in some embodiments. System 100-*e*-3 also shows root clamps 160-*e*-3, 160-*e*-4 configured as spring plungers. FIG. 6G highlights an example of a root plug 120-*e*-4 with a pocket 143-*c*. FIG. 6G may also show the root plug 120-*e*-4 with a guide slot 145, which may facilitate a stabilizing tab being directed to the pocket 143-*c*. Root plug 120-*e*-4 may be an example of aspects of system 100-*e* of FIG. 6A.

Figure 6H:
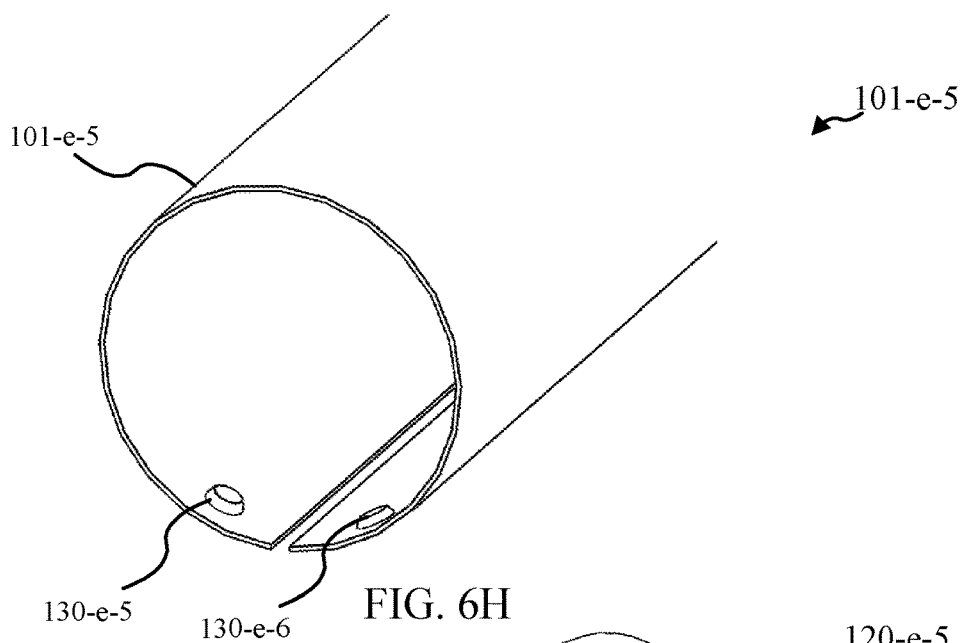
Figure 6I:
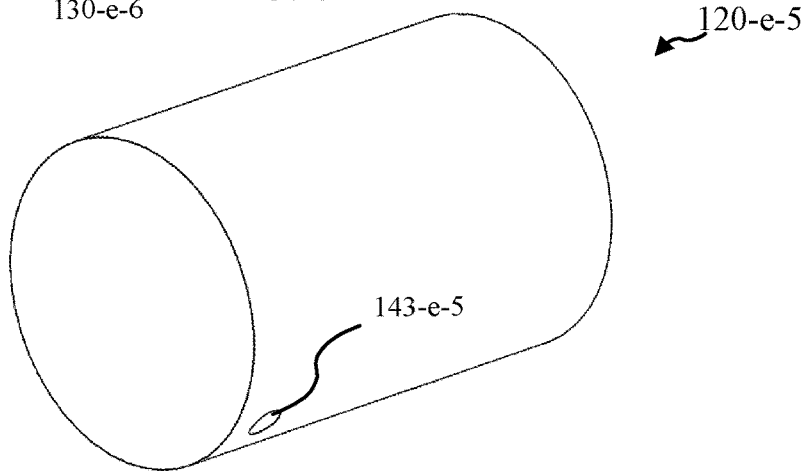
Figure 6J:
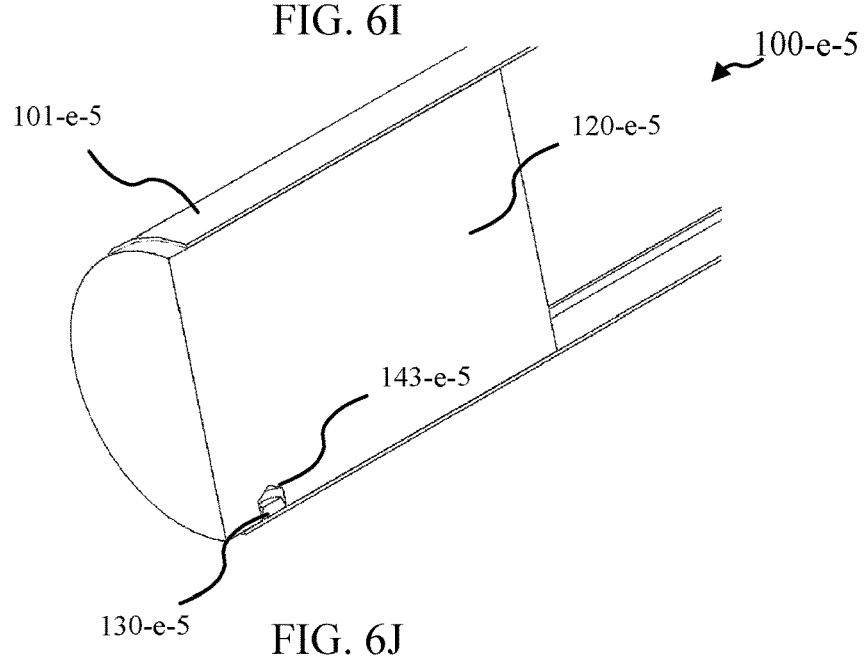

FIG. 6H shows an example of a boom 101-*e*-5 in accordance with various embodiments. Boom 101-*e*-5 may be configured as a furlable boom, such as a slit-tube boom. Stabilizing tabs 130-*e*-5, 130-*e*-6 may be bonded to an inner surface of the boom 101-*e*-5 and may fit within features of a root plug, such as the root plug 120-*e*-5 with feature 143-*e*-5 of FIG. 6I. Root plug 120-*e*-5 may be configured as a static or a rotating root plug in some embodiments. FIG. 6J shows a system 100-*e*-5 that may show boom 101-*e*-5 with stabilizing tab 130-*e*-5 engaging feature 143-*e*-5 of root plug 120-e-5. These systems and/or devices may be examples of aspects of system 100 of FIG. 1 and/or system 100-e of FIG. 6A.

Figure 6K:
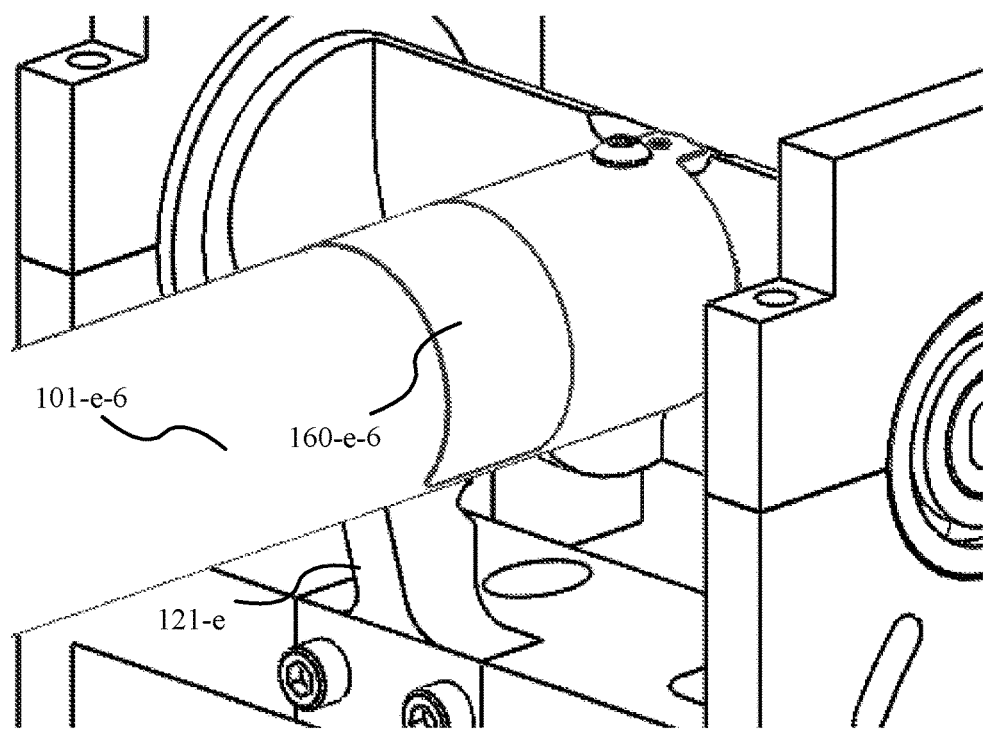

FIG. 6K shows an example of a system 100-e-6 in accordance with various embodiments. System 100-e-6 may be an example of aspects of system 100 of FIG. 1 and/or system 100-e of FIG. 6A. System 100-e-6 may include a boom 101-e-6 and root clamp 160-e-6. Root clamp 160-e-6 may be configured as a band clamp, such as a spring steel band clamp. The root clamp 160-e-6 may be coupled with the boom 101-e-6. The root clamp 160-e-6 may clamp the boom 101-e-6 around a root plug (obscured from view), which may be coupled with root plug post 121-e, as the boom 101-e-6 is deployed.

One may note in general that the variety of root clamps 160-e and stabilizing tabs 130-e as provide with respect to FIG. 6A, FIG. 6B, FIG. 6C, FIG. 6D, FIG. 6E, FIG. 6F, FIG. 6G, FIG. 6H, FIG. 6I, FIG. 6J, and/or FIG. 6K may be utilized separately and/or in a variety of combinations with each other, for example, that may generally include a system with a boom, one or more clamps, one or more stabilizing tabs, and one or more plugs. Furthermore, the variety of root clamps, root components, and/or stabilizing tabs provided may also be utilized with respect to other portions of a boom besides a root portion, such as a distal portion or intermediate portion of the boom.

Figure 7A:
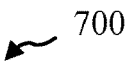
Figure 7A:

Turning now to FIG. 7A, a flow diagram of a method 700 is shown in accordance with various embodiments. Method 700 may be implemented utilizing a variety of systems and/or devices such as those shown and/or described with respect to FIG. 1, FIG. 2A, FIG. 2B, FIG. 2C, FIG. 2D, FIG. 2E, FIG. 2F, FIG. 2G, and/or FIG. 2H. Method 700 may also be implemented in some cases utilizing the variety of systems and/or devices shown and/or described with respect to FIGS. 3-6.

At block 710, one or more edges of a furlable boom may be engaged with one or more compliant components coupled with one or more lateral end portions of a boom spool. Engaging the one or more edges of the furlable boom with the one or more compliant components may hinder blooming of the furlable boom as the furlable boom deploys from the boom spool. Engaging the one or more edges of the furlable boom with the one or more compliant components may include engaging the one or more edges of the furlable boom with the one or more compliant components as the furlable boom is furled onto the boom spool. Some embodiments include flattening a portion of the furlable boom between the boom spool and a single consolidation roller. The single consolidation roller may be positioned at a boom to spool point. The furlable boom may include a slit-tube boom, though other furlable booms may be utilized such as triangular rollable and collapsible booms and/or tape spring booms. The one or more compliant components may include an elastomeric material, including, but not limited to, silicone.

Figure 7B:
Figure 7B:

FIG. 7B shows a flow diagram of a method 701 in accordance with various embodiments. Method 701 may be implemented utilizing a variety of systems and/or devices such as those shown and/or described with respect to FIG. 1, FIG. 3A, FIG. 3B, FIG. 3C, FIG. 3D, FIG. 3E, FIG. 3F, FIG. 3G, FIG. 3H, FIG. 3I, FIG. 3J, FIG. 3K, FIG. 3L, FIG. 3M, FIG. 3N, FIG. 3O, FIG. 3P, FIG. 3Q, FIG. 3R, and/or FIG. 3S. Method 701 may also be implemented in some cases utilizing the variety of systems and/or devices shown and/or described with respect to FIGS. 2, 4, 5, and/or 6.

At block 720, a portion of a furlable boom may be spread onto a boom spool utilizing a boom spreader. In some embodiments, utilizing the boom spreader includes rotating a root plug from a first orientation where the portion of the furlable boom wraps around the root plug to a second orientation to spread the portion of the furlable boom. Some embodiments include rotating the root plug back to the first orientation such that the root plug matches a shape of the furlable boom in the deployed state of the furlable boom.

In some embodiments of the method 701 utilizing the boom spreader includes extending one or more spreader arms from a stowed state to spread the portion of the furlable boom onto the boom spool through contacting an inner surface of the furlable boom. Some embodiments include contacting one or more paddles coupled with the one or more spreader arms with the inner surface of the furlable boom. In some embodiments, at least one or more spreader arms or one or more paddles push the furlable boom away from a root plug.

Some embodiments of the method 701 include pushing the portion of the furlable boom against a guide rod as the one or more spreader arms spreads the portion of the furlable boom.

Some embodiments of method 701 include retracting the one or more spreader arms to the stowed state after spreading the portion of the furlable boom onto the boom spool. Some embodiments include disengaging a spool lock as the portion of the furlable boom is spread onto the boom spool utilizing the boom spreader.

Figure 7C:
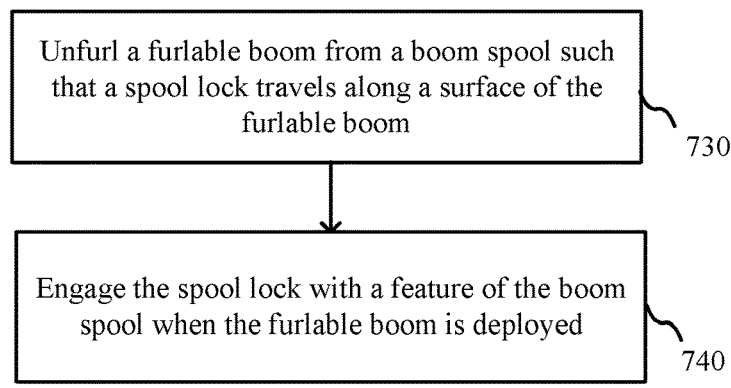

FIG. 7C shows a flow diagram of a method 702 in accordance with various embodiments. Method 702 may be implemented utilizing a variety of systems and/or devices such as those shown and/or described with respect to FIG. 1, FIG. 4A, FIG. 4B, FIG. 4C, FIG. 4D, FIG. 4E, FIG. 4F, FIG. 4G, FIG. 4H, and/or FIG. 4I. Method 702 may also be implemented in some cases utilizing the variety of systems and/or devices shown and/or described with respect to FIGS. 2, 3, 5, and/or 6.

At block 730, a furlable boom may be unfurled from a boom spool such that a spool lock travels along a surface of the furlable boom. At block 740, the spool lock may engage with a feature of the boom spool when the furlable boom is deployed. In some embodiments, engaging the spool lock with the feature of the boom spool stops the boom spool from further rotation. Some embodiments include shutting off a boom spool motor coupled with the boom spool when the spool lock engages with the feature of the boom spool. Some embodiments include engaging a root clamp with respect to the furlable boom when the spool lock engages with the feature of the boom spool. Some embodiments include disengaging the spool lock such that the furlable boom furls back onto the boom spool. In some embodiments, disengaging the spool lock includes utilizing a disengagement lever coupled with a boom spreader mechanism such that the disengagement lever disengages the spool lock as the boom spreader mechanism spreads a portion of the furlable boom back onto the boom spool.

Figure 7D:
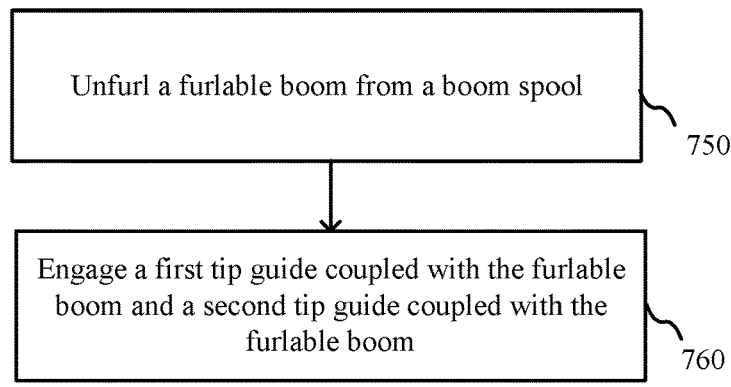

FIG. 7D shows a flow diagram of a method 703 in accordance with various embodiments. Method 703 may be implemented utilizing a variety of systems and/or devices such as those shown and/or described with respect to FIG. 1, FIG. 5A, FIG. 5B, FIG. 5C, and/or FIG. 5D. Method 703 may also be implemented in some cases utilizing the variety of systems and/or devices shown and/or described with respect to FIGS. 2, 3, 4, and/or 6.

At block 750, a furlable boom may be unfurled from a boom spool. At block 760, a first tip guide coupled with the furlable boom may engage a second tip guide coupled with the furlable boom. In some embodiments, engaging the first tip guide coupled with the furlable boom and the second tip guide coupled with the furlable boom includes slotting a first prong of the first tip guide between a first prong of the second tip guide and a second prong of the second tip guide. In some embodiments, a first edge of the furlable boom proximal to the first tip guide moves towards a second edge of the furlable boom proximal to the second tip guide. Some embodiments include disengaging the first tip guide from the second tip guide as the furlable boom is retracted back onto the boom spool.

FIG. 7E shows a flow diagram of a method 704 in accordance with various embodiments. Method 704 may be implemented utilizing a variety of systems and/or devices such as those shown and/or described with respect to FIG. 1, FIG. 6A, FIG. 6B, FIG. 6C, FIG. 6D, FIG. 6E, FIG. 6F, FIG. 6G, FIG. 6H, FIG. 6I, FIG. 6J, and/or FIG. 6K. Method 704 may also be implemented in some cases utilizing the variety of systems and/or devices shown and/or described with respect to FIGS. 2, 3, 4, and/or 5.

At block 770, a portion of a furlable boom may be clamped against a root plug in a deployed state of the furlable boom. Some embodiments include disengaging the clamping of the portion of the furlable boom against the root plug to stow the furlable boom onto a boom spool. In some embodiments, the root plug includes a rotating root plug. In some embodiments, the root plug includes a spreader arm mechanism. In some embodiments, clamping the portion of the furlable boom against the root plug in the deployed state of the furlable boom utilizes one or more locking arms. In some embodiments, clamping the portion of the furlable boom against the root plug in the deployed state of the furlable boom utilizes one or more spring plungers. In some embodiments, clamping the portion of the furlable boom against the root plug in the deployed state of the furlable boom utilizes one or more mechanical linkages. In some embodiments, clamping the portion of the furlable boom against the root plug in the deployed state of the furlable boom includes the one or more root clamps contacting an outer surface of the furlable boom and the root plug contacting an inner surface of the furlable boom. In some embodiments, the furlable boom includes a slit-tube boom.

FIG. 7F shows a flow diagram of a method 704 in accordance with various embodiments. Method 705 may be implemented utilizing a variety of systems and/or devices such as those shown and/or described with respect to FIG. 1, FIG. 6A, FIG. 6B, FIG. 6C, FIG. 6D, FIG. 6E, FIG. 6F, FIG. 6G, FIG. 6H, FIG. 6I, FIG. 6J, and/or FIG. 6K. Method 705 may also be implemented in some cases utilizing the variety of systems and/or devices shown and/or described with respect to FIGS. 2, 3, 4, and/or 5. In particular, the method 703 of FIG. 7E may be combined with the method 704 of FIG. 7F.

At block 780, one or more stabilizing tabs coupled with a furlable boom may engage with one or more features of a root plug. Some embodiments include guiding the one or more stabilizing tabs into the one or more features of the root plug utilizing one or more guide features of the root plug. Some embodiments include disengaging the one or more stabilizing tabs coupled with the furlable boom from the one or more features of a root plug. In some embodiments, the stabilizing tabs may be utilized with respect to another component, such as a distal component rather than a root component or plug.

Figure 8A:
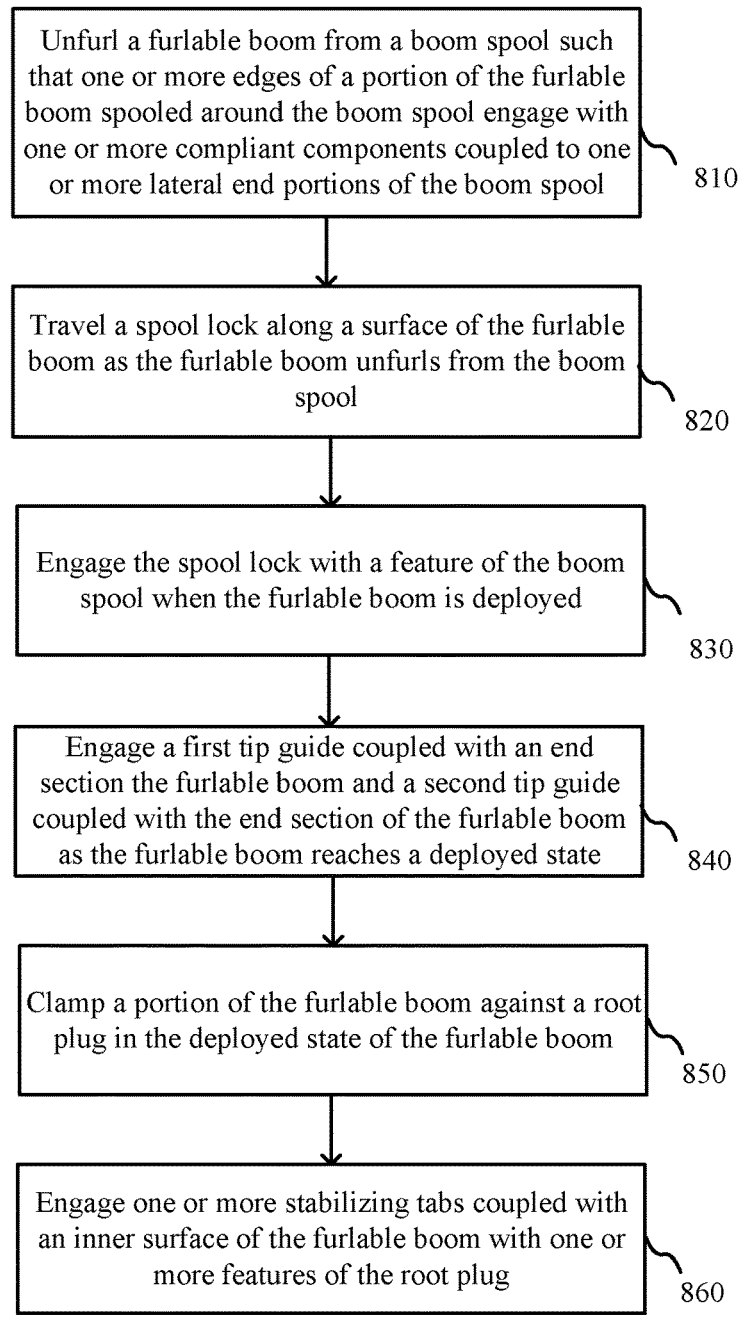
FIG. 8A and FIG. 8B show flow diagrams of methods in accordance with various embodiments.

Turning now to FIG. 8A, a flow diagram of a boom deployment method 800 is shown in accordance with various embodiments. Method 800 may be implemented utilizing a variety of systems and/or devices such as those shown and/or described with respect to FIG. 1, FIG. 2A, FIG. 2B, FIG. 2C, FIG. 2D, FIG. 2E, FIG. 2F, FIG. 2G, FIG. 2H, FIG. 3A, FIG. 3B, FIG. 3C, FIG. 3D, FIG. 3E, FIG. 3F, FIG. 3G, FIG. 3H, FIG. 3I, FIG. 3J, FIG. 3K, FIG. 3L, FIG. 3M, FIG. 3N, FIG. 3O, FIG. 3P, FIG. 3Q, FIG. 3R, FIG. 3S, FIG. 4A, FIG. 4B, FIG. 4C, FIG. 4D, FIG. 4E, FIG. 4F, FIG. 4G, FIG. 4H, FIG. 4I, FIG. 5A, FIG. 5B, FIG. 5C, FIG. 5D, FIG. 6A, FIG. 6B, FIG. 6C, FIG. 6D, FIG. 6E, FIG. 6F, FIG. 6G, FIG. 6H, FIG. 6I, FIG. 6J, and/or FIG. 6K.

At block 810, a furlable boom may be unfurled from a boom spool such that one or more edges of a portion of the furlable boom spooled around the boom spool engage with one or more compliant components coupled with one or more lateral end portions of the boom spool. In some embodiments, engaging the one or more edges of the portion of the furlable boom with the one or more compliant components hinders blooming of the furlable boom as the furlable boom deploys from the boom spool. At block 820, a spool lock may travel along a surface of the furlable boom as the furlable boom unfurls from the boom spool. At block 830, the spool lock may engage with a feature of the boom spool when the furlable boom is deployed. At block 840 a first tip guide coupled with an end section the furlable boom and a second tip guide coupled with the end section of the furlable boom may engage each other as the furlable boom reaches a deployed state. At block 850, a portion of the furlable boom may be clamped against a root plug in the deployed state of the furlable boom. At block 860, one or more stabilizing tabs coupled with an inner surface of the furlable boom may engage with one or more features of the root plug.

Figure 8B:
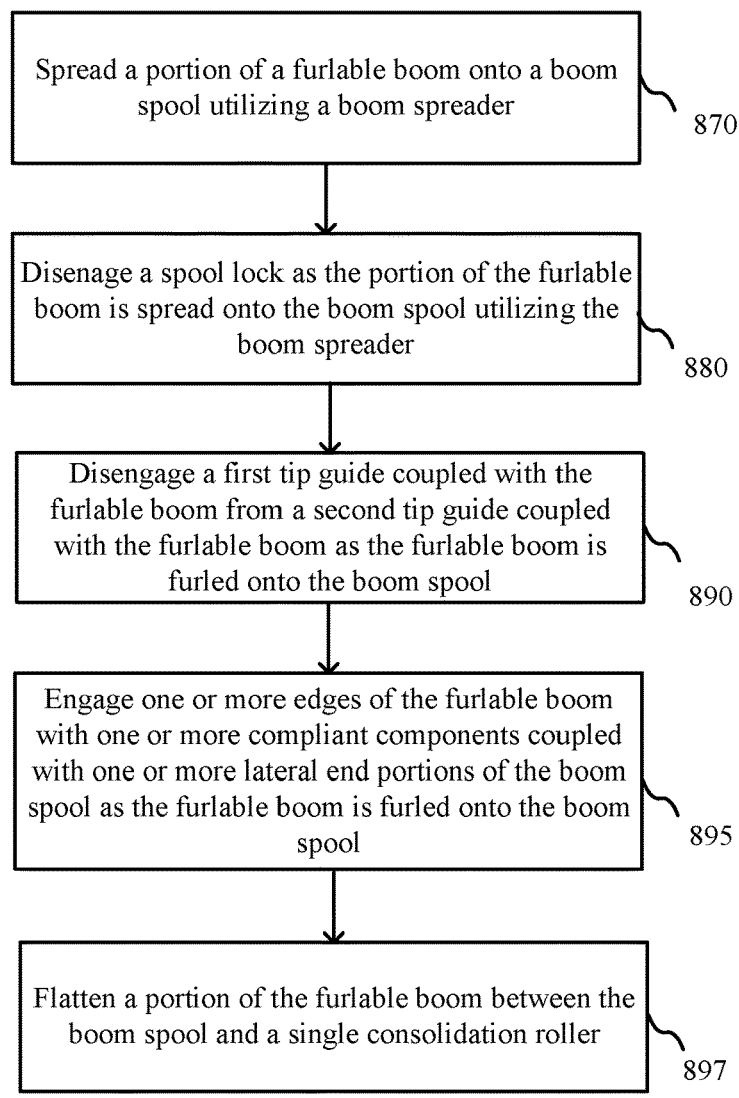

FIG. 8B shows a flow diagram of a boom stowage method 801 in accordance with various embodiments. Method 801 may be implemented utilizing a variety of systems and/or devices such as those shown and/or described with respect to FIG. 1, FIG. 2A, FIG. 2B, FIG. 2C, FIG. 2D, FIG. 2E, FIG. 2F, FIG. 2G, FIG. 2H, FIG. 3A, FIG. 3B, FIG. 3C, FIG. 3D, FIG. 3E, FIG. 3F, FIG. 3G, FIG. 3H, FIG. 3I, FIG. 3J, FIG. 3K, FIG. 3L, FIG. 3M, FIG. 3N, FIG. 3O, FIG. 3P, FIG. 3Q, FIG. 3R, FIG. 3S, FIG. 4A, FIG. 4B, FIG. 4C, FIG. 4D, FIG. 4E, FIG. 4F, FIG. 4G, FIG. 4H, FIG. 4I, FIG. 5A, FIG. 5B, FIG. 5C, FIG. 5D, FIG. 6A, FIG. 6B, FIG. 6C, FIG. 6D, FIG. 6E, FIG. 6F, FIG. 6G, FIG. 6H, FIG. 6I, FIG. 6J, and/or FIG. 6K.

At block 870, a portion of a furlable boom may be spread onto a boom spool utilizing a boom spreader. In some embodiments, utilizing the boom spreader includes rotating a root plug from a first orientation where the portion of the furlable boom wraps around the root plug to a second orientation to spread the portion of the furlable boom. Some embodiments include rotating the root plug back to the first orientation such that the root plug matches a shape of the furlable boom in the deployed state of the furlable boom. In some embodiments, utilizing the boom spreader includes extending one or more spreader arms from a stowed state to spread the portion of the furlable boom onto the boom spool through contacting an inner surface of the furlable boom. At block 880, a spool lock may be disengaged as the portion of the furlable boom is spread onto the boom spool utilizing the boom spreader. At block 890, a first tip guide coupled with the furlable boom may be disengaged from a second tip guide coupled with the furlable boom as the furlable boom is furled onto the boom spool. At block 895, engaging one or more edges of the furlable boom with one or more compliant components coupled with one or more lateral end portions of the boom spool as the furlable boom is furled onto the boom spool. At block 897, a portion of the furlable boom may be flattened between the boom spool and a single consolidation roller.

These embodiments may not capture the full extent of combination and permutations of materials and process equipment. However, they may demonstrate the range of applicability of the method, devices, and/or systems. The different embodiments may utilize more or less stages than those described.

It should be noted that the methods, systems and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various stages may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the embodiments.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which may be depicted as a flow diagram or block diagram or as stages. Although each may describe the operations as a sequential process, many of the operations can be performed in parallel or concurrently. In addition, the order of the operations may be rearranged. A process may have additional stages not included in the figure.

Having described several embodiments, it will be recognized by those of skill in the art that various modifications, alternative constructions, and equivalents may be used without departing from the spirit of the different embodiments. For example, the above elements may merely be a component of a larger system, wherein other rules may take precedence over or otherwise modify the application of the different embodiments. Also, a number of stages may be undertaken before, during, or after the above elements are considered. Accordingly, the above description should not be taken as limiting the scope of the different embodiments.

What is claimed is:

1. A boom deployment system comprising:
a boom spool;
one or more compliant components coupled with one or more lateral end portions of the boom spool, wherein the one or more compliant components includes an elastomeric material; and
a furlable boom coupled with the boom spool such that one or more edges of the furlable boom engage the elastomeric material of the one or more compliant components.

2. The boom deployment system of claim 1, wherein the furlable boom includes a slit-tube boom.

3. The boom deployment system of claim 1, wherein the elastomeric material includes silicone.

4. The boom deployment system of claim 1, wherein the one or more compliant components include one or more flat surfaces that the one or more edges of the furlable boom engage.

5. The boom deployment system of claim 1, wherein one or more compliant components include at least one or more textured surfaces, one or more roughened surfaces, or one or more grooved surfaces that the one or more edges of the furlable boom engage.

6. The boom deployment system of claim 1, wherein the furlable boom includes at least one or more textured edges or one or more roughened edges.

7. The boom deployment system of claim 1, wherein the one or more compliant components that include an elastomeric material are formed as one or more annular ring shapes and the one or more end portions of the boom spool include one or more end caps.

8. The boom deployment system of claim 1, wherein the one or more edges of the furlable boom engage the compliant components through friction.

9. The boom deployment system of claim 1, further comprising a single consolidation roller positioned such that the furlable boom flattens between the boom spool and the single consolidation roller.

10. The boom deployment system of claim 9, wherein the single consolidation roller is positioned at a boom to spool point.

11. The boom deployment system of claim 1, wherein the furlable boom includes a triangular rollable and collapsible boom.

12. The boom deployment system of claim 1, wherein the furlable boom includes a tape spring.

13. A method comprising:
engaging one or more edges of a furlable boom with one or more compliant components including an elastomeric material coupled with one or more lateral end portions of a boom spool.

14. The method of claim 13, wherein engaging the one or more edges of the furlable boom with the one or more compliant components hinders blooming of the furlable boom as the furlable boom deploys from the boom spool.

15. The method of claim 13, wherein engaging the one or more edges of the furlable boom with the one or more compliant components includes engaging the one or more edges of the furlable boom with the one or more compliant components as the furlable boom is furled onto the boom spool.

16. The method of claim 13, further comprising flattening a portion of the furlable boom between the boom spool and a single consolidation roller.

17. The method of claim 16, wherein the single consolidation roller is positioned at a boom to spool point.

18. The method of claim 13, wherein the furlable boom includes a slit-tube boom.

19. The method of claim 13, wherein the one or more compliant components that include an elastomeric material are formed as one or more annular ring shapes and the one or more lateral portions of the boom spool include one or more end caps.

* * * * *